United States Patent
Watanabe et al.

(10) Patent No.: US 7,248,958 B2
(45) Date of Patent: Jul. 24, 2007

(54) ROAD SURFACE STATE ESTIMATING APPARATUS, ROAD SURFACE FRICTION STATE ESTIMATING APPARATUS, ROAD SURFACE STATE PHYSICAL QUANTITY CALCULATING APPARATUS, AND ROAD SURFACE STATE ANNOUNCING APPARATUS

(75) Inventors: Yoshitoshi Watanabe, Aichi-ken (JP); Katsuhiro Asano, Toyoake (JP); Takaji Umeno, Nisshin (JP); Shu Asami, Nagoya (JP); Masaru Sugai, Aichi-ken (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 397 days.

(21) Appl. No.: 10/702,492

(22) Filed: Nov. 7, 2003

(65) Prior Publication Data
US 2004/0138831 A1    Jul. 15, 2004

(30) Foreign Application Priority Data
Nov. 8, 2002 (JP) .............................. 2002-325397
Oct. 14, 2003 (JP) .............................. 2003-353579

(51) Int. Cl.
*G06F 19/00* (2006.01)
(52) U.S. Cl. .............................. 701/70; 701/1; 701/36; 701/73; 702/33; 702/145
(58) Field of Classification Search ................ 701/70, 701/1, 36, 73; 702/33, 145
See application file for complete search history.

(56) References Cited

U.S. PATENT DOCUMENTS

| | | | | |
|---|---|---|---|---|
| 5,521,594 A | * | 5/1996 | Fukushima | 340/901 |
| 5,586,028 A | * | 12/1996 | Sekine et al. | 701/1 |
| 5,852,243 A | * | 12/1998 | Chang et al. | 73/659 |
| 5,932,801 A | * | 8/1999 | Akishita et al. | 73/116 |
| 6,954,146 B2 | * | 10/2005 | Bhagavathula et al. | 340/566 |

FOREIGN PATENT DOCUMENTS

| | | |
|---|---|---|
| JP | 03-110408 | 5/1991 |
| JP | 8-298613 | 11/1996 |
| JP | 11-211659 | 8/1999 |
| JP | 2001-73317 | 3/2001 |
| JP | 2002-160598 | 6/2002 |

* cited by examiner

*Primary Examiner*—Thomas Black
*Assistant Examiner*—Marie A Weiskopf
(74) *Attorney, Agent, or Firm*—Oblon, Spivak, McClelland, Maier & Neustadt, P.C.

(57) ABSTRACT

A tire-generated sound detection sensor detects a tire-generated sound that is generated from a tire while the vehicle is running. A wheel rotation sensor detects a wheel rotation speed. A preprocessor calculates feature quantities corresponding to a road surface state and tire-generated sound sources. A feature vector generator generates a feature vector having, as components, the feature quantities calculated by the preprocessor and the detected wheel rotation speed. A judgment processor estimates a state of a road surface on which the vehicle is running on the basis of the feature vector generated by the feature vector generator and feature vectors that are stored in a judgment map memory so as to be correlated with a plurality of road surface states, respectively, and each of which corresponds to a road surface state and tire-generated sound sources.

26 Claims, 29 Drawing Sheets

TIME(S)

DRY ASPHALT
ROAD SURFACE

SAMPLING k

WET ASPHALT
ROAD SURFACE

SAMPLING k

FIG.4A
ICE-PLATE ROAD SURFACE
FIG.4B
COMPACTED-SNOW ROAD SURFACE
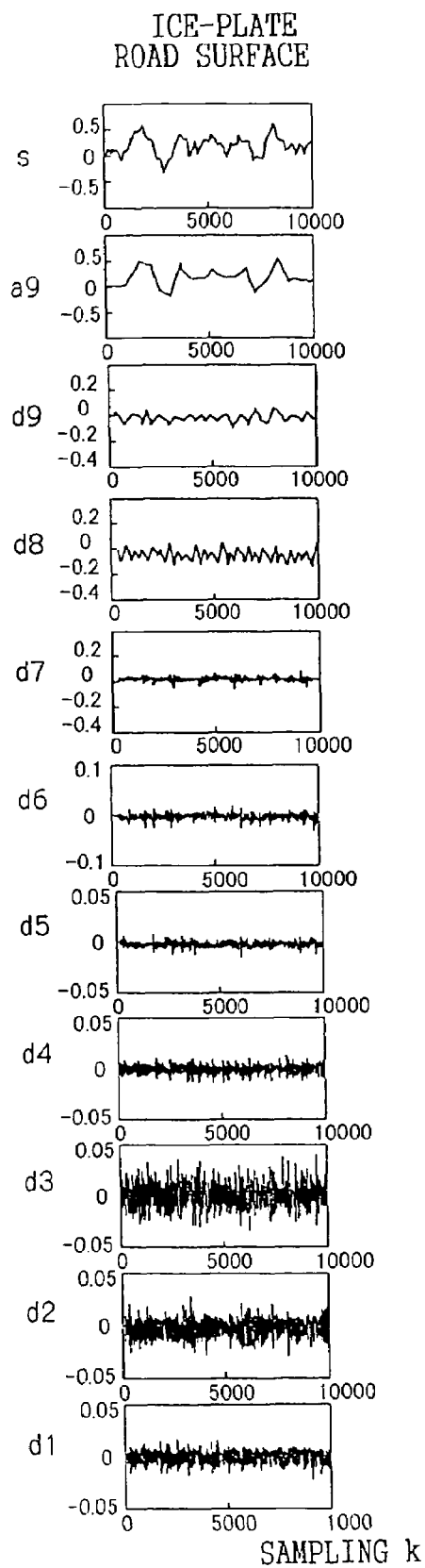
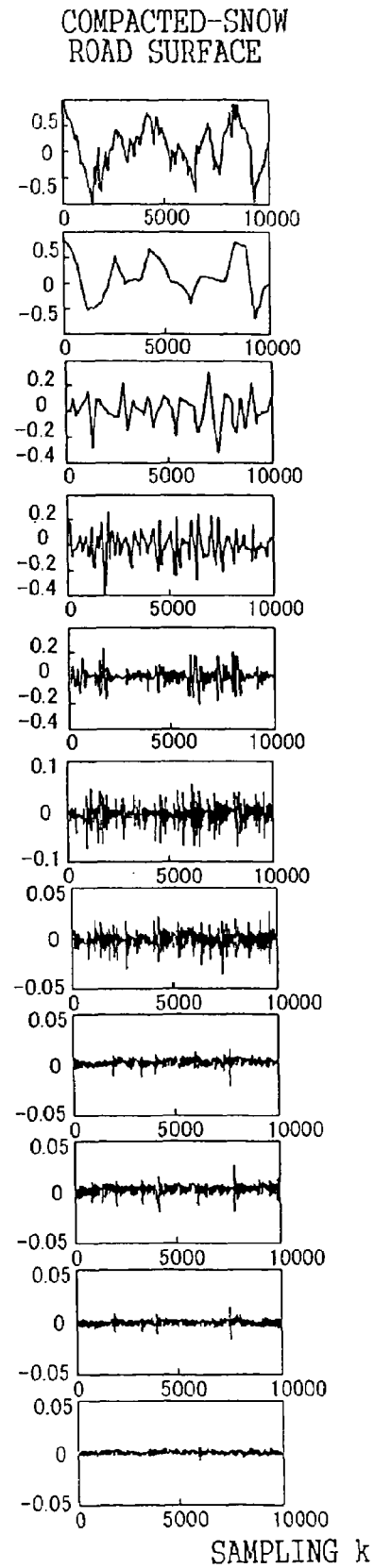

FIG.5A  s
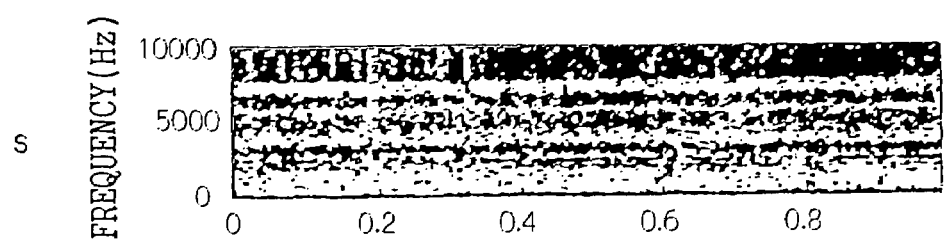
FIG.5B  d5∼d9
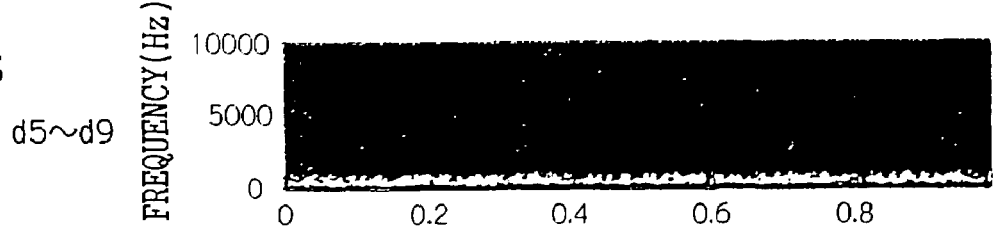
FIG.5C  d4
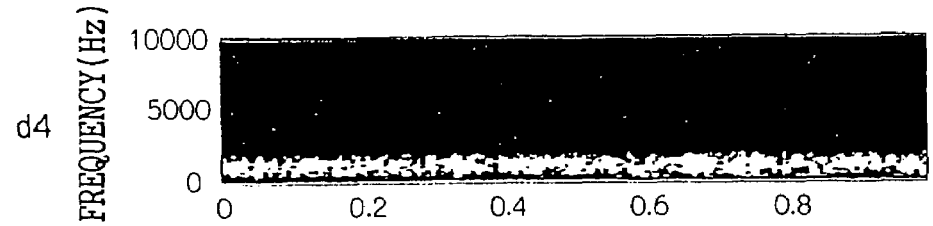
FIG.5D  d3
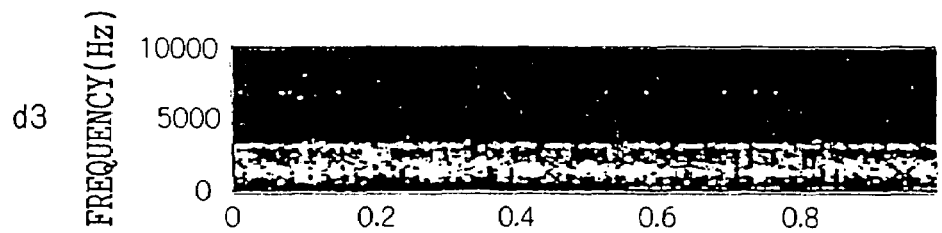
FIG.5E  d2
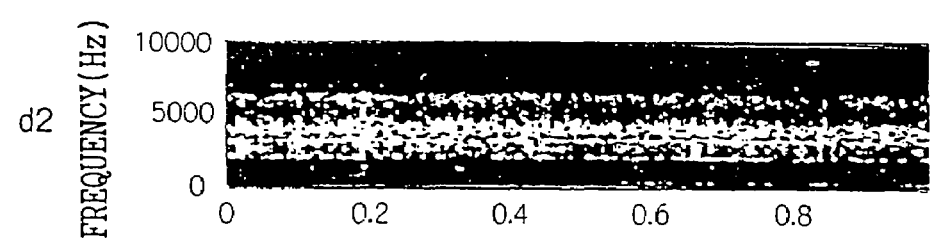
FIG.5F  d1
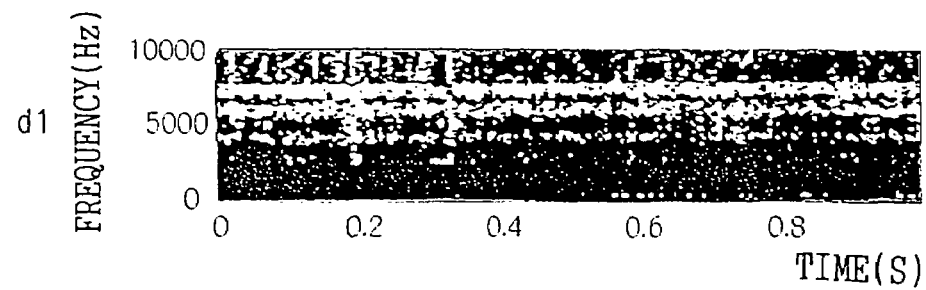
TIME(S)

S(i):DRY ROAD SURFACE

S(i):WET ROAD SURFACE

ROAD SURFACE STATE ESTIMATING APPARATUS, ROAD SURFACE FRICTION STATE ESTIMATING APPARATUS, ROAD SURFACE STATE PHYSICAL QUANTITY CALCULATING APPARATUS, AND ROAD SURFACE STATE ANNOUNCING APPARATUS

CROSS-REFERENCE TO RELATED APPLICATION

This application claims priority under 35USC 119 from Japanese Patent Applications No. 2002-325397 and 2003-353579 the disclosure of which is incorporated by reference herein.

BACKGROUND OF THE INVENTION

1. Field of the Invention

The present invention relates to a road surface state estimating apparatus, a road surface friction state estimating apparatus, a road surface state physical quantity calculating apparatus, and a road surface state announcing apparatus. In particular, the invention relates to a road surface state estimating apparatus for estimating a road surface state on the basis of a sound that is generated by a tire while a vehicle is running, road surface luminance information, and other information and a road surface friction state estimating apparatus, a road surface state physical quantity calculating apparatus, and a road surface state announcing apparatus that relate to the above road surface state estimating apparatus.

2. Description of the Related Art

Apparatus for estimating a road surface state using a sound that is generated by a tire were proposed (JP-A-6-138018 and JP-A-7-156782). These apparatus estimate a road surface state using a neural network by FFT-analyzing a sound that is generated by a tire and employing resulting frequency components of the tire-generated sound as inputs.

An apparatus was proposed in JP-A-8-327530 in which feature quantities representing road surface states such as power spectrum distributions of horizontal and vertical polarization images of images obtained by shooting road surfaces with a camera are detected and road surface friction coefficients, that is, coefficients of friction between a road surface and a tire, are stored in advance so as to be correlated with plural sets of feature quantities that represent different road surface states. A road surface friction coefficient is estimated on the basis of detected feature quantities representing a road surface state and the road surface friction coefficients that are stored so as to be correlated with the plural sets of feature quantities representing the different road surface states.

However, in the former apparatus, since a tire-generated sound is FFT-analyzed and resulting frequency components are used as inputs, the input frequency components cover a wide frequency range, as a result of which a long calculation time is needed and a considerable number of errors occur. Therefore, even if these apparatus are mounted on a vehicle actually, it is difficult for them to satisfy requirements.

In the apparatus disclosed in JP-A-8-327530, road surface friction coefficients are stored in advance so as to be correlated with plural sets of feature quantities representing different road surface states and a road surface friction coefficient is estimated on the basis of detected feature quantities representing a road surface state and the road surface friction coefficients that are stored so as to be correlated with the plural sets of feature quantities representing the different road surface states. As a result, a road surface friction coefficient can be estimated only within the confines of the stored road surface states and feature quantities. Therefore, a road surface friction coefficient cannot be estimated accurately if the stored road surface states and feature quantities are incorrect.

SUMMARY OF THE INVENTION

The present invention has been made in view of the above facts, and an object of the invention is therefore to provide a road surface state estimating apparatus capable of estimating a road surface state accurately and a road surface friction state estimating apparatus, a road surface state physical quantity calculating apparatus, and a road surface state announcing apparatus that relate to the above road surface state estimating apparatus.

To attain the above object, a road surface state estimating apparatus according to a first aspect of the invention comprises a tire-generated sound detector for detecting a tire-generated sound that is generated from a tire while a vehicle is running; a calculator for calculating at least one feature quantity corresponding to a road surface state and tire-generated sound sources from the tire-generated sound detected by the tire-generated sound detector; a storage device for storing feature quantities, each quantity corresponding to a road surface state and tire-generated sound sources, in such a manner that the feature quantities are correlated with a plurality of road surface states, respectively; and an estimating device for estimating a state of a road surface on which the vehicle is running on the basis of the feature quantity calculated by the calculator and the feature quantities stored in the storage device.

The tire-generated sound detector detects a tire-generated sound that is generated from a tire while a vehicle is running.

The calculator calculates at least one feature quantity corresponding to a road surface state and tire-generated sound sources from the tire-generated sound detected by the tire-generated sound detector.

The storage device stores feature quantities, each quantity corresponding to a road surface state and tire-generated sound sources, in such a manner that the feature quantities are correlated with a plurality of road surface states, respectively.

The estimating device estimates a state of a road surface on which the vehicle is running on the basis of the feature quantity calculated by the calculator and the sets of feature quantities stored in the storage device.

The above-mentioned tire-generated sound sources may include collision of objects with a tire. The principle of the invention will be described below for this exemplary case. The following description is just an example and the invention is not limited to it.

While a tire is rotating (i.e., the vehicle is running), small stones on the road surface, projections of the road surface itself, water on the road surface, etc. collide relatively with the tire, whereby a tire-generated sound is generated with such collisions as a sound source. Since water exists on a wet road surface or an ice-plate road surface, a rotating tire (the running vehicle) collides relatively with water on the road surface, feature quantities specific to at least collisions of objects relatively with the tire as a tire-generated sound source are obtained.

If it is judged that a feature quantity calculated by the calculator coincides with or is similar to the feature quantity specific to at least collisions of objects relatively with a tire as a tire-generated sound source, it can be estimated that the road surface is a wet road surface or an ice-plate road surface, i.e., at least a wet road surface.

As described above, at least one feature quantity corresponding to a road surface state and a tire-generated sound source is calculated on the basis of a tire-generated sound instead of handling the tire-generated sound itself, which makes it possible to reduce the amount of information that is necessary to estimate a road surface state. Since a state of a road surface on which the vehicle is running is estimated on the basis of calculated feature quantities and the feature quantities that are stored for respective road surface states and each of which corresponds to a road surface state and a tire-generated sound source, the road surface state can be estimated accurately.

Incidentally, the feature quantities depends on the wheel rotation speed.

In view of this, the road surface state estimating apparatus may be such as to further comprise a wheel rotation speed detector for detecting a wheel rotation speed, and such that the storage device stores the feature quantities in such a manner that the feature quantities are correlated with respective each of a plurality of road surface states and each of a plurality of wheel rotation speeds, and that the estimating device estimates a state of a road surface on which the vehicle is running on the basis of the feature quantity calculated by the calculator, the wheel rotation speed detected by the wheel rotation speed detector, and the feature quantities stored in the storage device.

Since the feature quantities are stored in such a manner as to be correlated with respective each of a plurality of road surface states and each of a plurality of wheel rotation speeds and that a state of a road surface on which the vehicle is running is estimated on the basis of the calculated feature quantity, the detected wheel rotation speed, and the stored the feature quantities, a road surface state can be estimated with a wheel rotation speed taken into consideration and hence can be estimated more accurately.

The calculator may calculate at least one feature quantity corresponding to a road surface state and tire-generated sound sources by calculating correlation values of a waveform of the tire-generated sound detected by the tire-generated sound detector and at least one fundamental waveform having a predetermined length. The calculator may use wavelet transform.

The calculator may calculate correlation values of a waveform of the tire-generated sound detected by the tire-generated sound detector and at least one wavelet fundamental waveform.

The fundamental waveform may have two first regions in which an amplitude of the wave is within a first range and a second region that is interposed between the two first regions and in which an amplitude of the wave is larger than in the two first regions and the value is within a second range that is wider than the first range.

The fundamental waveform may be Daubechie's, Symlet's, Coiflet's, or Mayer's wavelet function.

The calculator may calculate correlation values of a waveform of the tire-generated sound detected by the tire-generated sound detector and a fundamental waveform corresponding to at least one road surface state. In this case, the calculator sets the fundamental waveform by modifying a predetermined, original waveform so that it becomes suitable for the road surface states.

A road surface friction state estimating apparatus according to a second aspect of the invention comprises a detector for detecting a feature quantity indicating a road surface state; a storage device for storing road surface friction states that are friction states between road surfaces and a tire in such a manner that the road surface friction states are correlated with a plurality of feature quantities indicating different road surface states, respectively; an estimating device for estimating a road surface friction state of the road surface, the road surface corresponding to the feature quantity which is detected by the detector, on the basis of the feature quantities detected by the detector and the road surface friction states stored in the storage device; and a corrector for correcting a road surface friction state stored in the storage device on the basis of a pre-detected road surface friction state of the road surface, the road surface corresponding to the feature quantity which is detected by the detector, and the road surface friction state estimated by the estimating device.

The detector detects feature quantity indicating a road surface state. The storage device stores road surface friction states (i.e., physical quantities indicating road surface friction states such as road surface friction coefficients; this also applies to the following description) that are friction states between road surfaces and a tire in such a manner that the road surface friction states are correlated with a plurality of feature quantities indicating different road surface states, respectively. The estimating device estimates a road surface friction state of the road surface, the road surface corresponding to the feature quantity which is detected by the detector, on the basis of the feature quantities detected by the detector and the road surface friction states stored in the storage device.

The corrector corrects a road surface friction state stored in the storage device on the basis of a pre-detected road surface friction state of the road surface, the road surface corresponding to the feature quantity which is detected by the detector and the road surface friction state estimated by the estimating device.

Since a road surface friction state stored in the storage device is corrected on the basis of a pre-detected road surface friction state of the road surface, the road surface corresponding to the feature quantity which is detected by the detector and the road surface friction state estimated by the estimating device, the road surface friction states stored in the storage device can be corrected to proper values and hence a road surface friction state can be estimated accurately.

The detector may detect a feature quantity indicating a road surface state of a forward road surface. The detector may detect a feature quantity indicating a road surface state of a road surface on which a vehicle mounted with the road surface friction state estimating apparatus is running. The detector may be the road surface state estimating apparatus according to the first aspect of the invention.

A road surface friction state estimating apparatus according to a third aspect of the invention comprises a first detector for detecting a feature quantity indicating a road surface state of a road surface on which a vehicle mounted with the road surface friction state estimating apparatus is running; a second detector for detecting a feature quantity indicating a road surface state of a forward road surface; a synchronizer for synchronizing a feature quantity detected by the second detector with the feature quantities detected by the first detector of a road surface, the road surface corresponding to the feature quantity which was detected by the second detector; a storage device for storing road surface friction states that are friction states between road surfaces and a tire in such a manner that the road surface friction states are correlated with a plurality of feature quantities indicating different road surface states, respectively; and an estimating device for estimating a road surface friction state of the road surface, the road surface corresponding to the feature quantity which is detected by the first detector, on the basis of the feature quantity detected by the first detector, the feature quantity detected by the second detector and synchronized by the synchronizer, and the road surface friction states stored in the storage device.

The first detector detects a feature quantity indicating a road surface state of a road surface on which a vehicle mounted with the road surface friction state estimating apparatus is running. The first detector may be the road surface state estimating apparatus according to the first aspect of the invention. The second detector detects a feature quantity indicating a road surface state of a forward road surface. That is, whereas the subject of detection of feature quantities of the first detector is a road surface on which the vehicle is running, that of the second detector is a forward road surface. Therefore, a plurality of feature quantities detected by the two detectors is deviated from each other in time. The synchronizer synchronizes feature quantity detected by the second detector with the feature quantity detected by the first detector of a road surface, the road surface corresponding to the feature quantity which was detected by the second detector. For example, the feature quantity detected by the second detector and indicating a road surface state of a forward road surface may be delayed until the vehicle runs on that road surface.

The storage device stores road surface friction states that are friction states between road surfaces and a tire in such a manner that the road surface friction states are correlated with a plurality of feature quantities indicating different road surface states, respectively.

The estimating device estimates a road surface friction state of the road surface, the road surface corresponding to the feature quantity which is detected by the first detector, on the basis of the feature quantity detected by the first detector, the feature quantity detected by the second detector and synchronized by the synchronizer, and the road surface friction states stored in the storage device.

Since a road surface friction state of a road surface on which the vehicle is running is estimated by using feature quantity indicating a road surface state of a forward road surface in addition to feature quantity indicating a road surface state of the current road surface, the road surface friction state of the current road surface can be estimated on the basis of a larger amount of information and hence can be estimated more accurately.

The road surface friction state estimating apparatus may further comprise a corrector for correcting a corresponding road surface friction state stored in the storage device on the basis of a pre-detected road surface friction state of the road surface, the road surface corresponding to the feature quantity which is detected by the first detector and the road surface friction state estimated by the estimating device.

Since a road surface friction state stored in the storage device is corrected on the basis of a pre-detected road surface friction state of the road surface, the road surface corresponding the feature quantities which is detected by the first detector and the road surface friction state estimated by the estimating device, the road surface friction states stored in the storage device can be corrected to proper values and hence a road surface friction coefficient can be estimated accurately.

A road surface state physical quantity calculating apparatus according to a fourth aspect of the invention comprises a detector for detecting at least one of saturation information, luminance information, hue information, and intensity information of a forward road surface on which a vehicle mounted with the road surface state physical quantity calculating apparatus will run; and a calculator for correcting a parameter to be used for calculating a road surface state physical quantity indicating a road surface state on the basis of at least one of saturation information, luminance information, hue information, and intensity information of the forward road surface detected by the detector, and for calculating a road surface state physical quantity indicating a road surface state on the basis of a corrected parameter and at least one of saturation information, luminance information, hue information, and intensity information of the forward road surface detected by the detector.

That is, the second aspect of the invention is directed to a road surface state physical quantity calculating apparatus comprising a detector for detecting at least one of saturation information, luminance information, hue information, and intensity information of a forward road surface on which a vehicle mounted with the road surface state physical quantity calculating apparatus will run; and a calculator for calculating a road surface state physical quantity indicating a road surface state on the basis of at least one of saturation information, luminance information, hue information, and intensity information of the forward road surface detected by the detector and a parameter to be used for calculating a road surface state physical quantity indicating a road surface state.

Where a road surface state physical quantity is calculated on the basis of at least one of saturation information, luminance information, hue information, and intensity information of a forward road surface and the parameter to be used for calculating a road surface state physical quantity indicating a road surface state, at least one of saturation information, luminance information, hue information, and intensity information of the forward road surface varies depending on the environmental conditions and hence a road surface state physical quantity cannot be obtained accurately.

In view of this, in the fourth aspect of the invention, the calculator corrects the parameter on the basis of at least one of saturation information, luminance information, hue information, and intensity information of the forward road surface detected by the detector so that a road surface state physical quantity is calculated properly in accordance with the environmental conditions, and calculates a road surface state physical quantity indicating a road surface state on the basis of a corrected parameter and at least one of saturation information, luminance information, hue information, and intensity information of the forward road surface detected by the detector. As a result, the parameter is corrected when the environmental conditions have varied and a road surface state physical quantity can be obtained accurately.

In this case, the road surface state physical quantity calculating apparatus may be such that the detector divides an area of the forward road surface into a plurality of regions and detects pieces of at least one of saturation information, luminance information, hue information, and intensity information of the respective regions; that the parameter is a value to be used for classifying the detected pieces of at least one of saturation information, luminance information, hue information, and intensity information of the respective regions into classes corresponding to respective road surface states; and that the calculator calculates a road surface state physical quantity by classifying the detected pieces of at least one of saturation information, luminance information, hue information, and intensity information of the respective regions into the classes corresponding to the respective road surface states using the parameter. The road surface state physical quantity calculating apparatus may also be such that the detector divides an area of the forward road surface into a plurality of regions and detects pieces of at least one of saturation information, luminance information, hue information, and intensity information of the respective regions; that the parameter is a value that maximizes a probability that the detected pieces of at least one of saturation information, luminance information, hue information, and intensity information of the respective regions are obtained; and that the calculator calculates a road surface state physical quantity by calculating a probability maximized by the parameter.

A road surface state estimating apparatus according to a fifth aspect of the invention comprises a storage device for storing road surface state physical quantities determined on the basis of at least one of saturation information, luminance information, hue information, and intensity information and indicating road surface states of a plurality of road surfaces, respectively, in such a manner the road surface state physical quantities are correlated with the respective road surface states; a detector for detecting at least one of saturation information, luminance information, hue information, and intensity information of a forward road surface; and an estimating device for estimating a road surface state of the forward road surface on the basis of at least one of saturation information, luminance information, hue information, and intensity information of the forward road surface detected by the detector and the road surface state physical quantities stored in the storage device.

The storage device stores road surface state physical quantities determined on the basis of at least one of saturation information, luminance information, hue information, and intensity information and indicating road surface states of a plurality of road surfaces, respectively, in such a manner that the road surface state physical quantities are correlated with the respective road surface states. For example, the road surface state physical quantities determined on the basis of at least one of saturation information, luminance information, hue information, and intensity information are luminance distributions.

The detector detects at least one of saturation information, luminance information, hue information, and intensity information of a forward road surface.

The estimating device estimates a road surface state of the forward road surface on the basis of at least one of saturation information, luminance information, hue information, and intensity information of the forward road surface detected by the detector and the road surface state physical quantities stored in the storage device. For example, the estimating device determines a road surface state physical quantity on the basis of at least one of saturation information, luminance information, hue information, and intensity information of the forward road surface detected by the detector, and estimates a road surface state of the forward road surface on the basis of the determined road surface state physical quantity and the road surface state physical quantities stored in the storage device. That is, the estimating device determines a road surface state physical quantity that is closest to the road surface state physical quantity determined from at least one of saturation information, luminance information, hue information, and intensity information of the forward road surface detected by the detector among the road surface state physical quantities stored in the storage device, and estimates that a road surface state corresponding to the determined road surface state physical quantity is a road surface state of the forward road surface.

Since road surface state physical quantities are stored for a plurality of road surface states, respectively, and a road surface state of a forward road surface is estimated on the basis of detected at least one of saturation information, luminance information, hue information, and intensity information of the forward road surface and the road surface state physical quantities stored for the respective road surface states, the road surface state of the forward road surface can be estimated accurately.

The estimating device may calculate a road surface state physical quantity on the basis of at least one of saturation information, luminance information, hue information, and intensity information of the forward road surface detected by the detector and a parameter to be used for calculating a road surface state physical quantity, and estimate a road surface state of the forward road surface on the basis of the calculated road surface state physical quantity and the road surface state physical quantities stored in the storage device.

In this case, the estimating device may correct the parameter on the basis of at least one of saturation information, luminance information, hue information, and intensity information of the forward road surface detected by the detector, and calculate a road surface state physical quantity indicating a road surface state on the basis of the corrected parameter and at least one of saturation information, luminance information, hue information, and intensity information of the forward road surface detected by the detector.

The road surface state estimating apparatus may be such that the detector divides an area of the forward road surface into a plurality of regions and detects pieces of at least one of saturation information, luminance information, hue information, and intensity information of the respective regions; that the parameter is a value that maximizes a probability that the detected pieces of at least one of saturation information, luminance information, hue information, and intensity information of the respective regions are obtained; and that the estimating device calculates a road surface state physical quantity by calculating a probability maximized by the parameter.

The road surface state estimating apparatus may be such as to further comprise the road surface state estimating apparatus according to claim 1; and an updating device for updating the road surface state physical quantity that is stored in the storage device and corresponds to the road surface state estimated by the road surface state estimating apparatus, on the basis of the road surface state estimated by the road surface state estimating apparatus and at least one of saturation information, luminance information, hue information, and intensity information that was detected by the detector when the road surface state estimating apparatus estimated the road surface state.

Since the road surface state physical quantity that is stored in the storage device and corresponds to the road surface state estimated by the road surface state estimating apparatus is updated on the basis of the road surface state estimated by the road surface state estimating apparatus and at least one of saturation information, luminance information, hue information, and intensity information that was detected by the detector when the road surface state estimating apparatus estimated the road surface state, the road surface state of the forward road surface can be estimated more accurately.

A road surface state announcing apparatus according to a sixth aspect of the invention comprises a current road surface state detector for detecting a road surface state of a current road surface on which a vehicle mounted with the road surface state announcing apparatus is running; a forward road surface state detector for detecting a road surface state of a forward road surface; and an announcing device for comparing the road surface state of the current road surface detected by the current road surface state detector and the road surface state of the forward road surface detected by the forward road surface state detector, and for making an announcement about a post-variation road surface state if one of the road surface state of the current road surface and the road surface state of the forward road surface has varied.

The current road surface state detector detects a road surface state of a current road surface on which a vehicle mounted with the road surface state announcing apparatus is running. The forward road surface state detector detects a road surface state of a forward road surface on which the vehicle will run.

The announcing device compares the road surface state of the current road surface detected by the current road surface state detector and the road surface state of the forward road surface detected by the forward road surface state detector, and makes an announcement about a post-variation road surface state if one of the road surface state of the current road surface and the road surface state of the forward road surface has varied.

If the road surface state of the forward road surface has changed from the road surface state of the current road surface, for example, if the road surface state of the current road surface is a dry road surface and the road surface state of the forward road surface has changed from a dry road surface to a compacted-snow road surface, the announcing device makes an announcement about a post-variation road surface state, that is, the compacted-snow road surface. If the road surface state of the current road surface has thereafter changed from the dry road surface to a compacted-snow surface, the announcing device makes an announcement about a post-variation road surface state, that is, the compacted-snow road surface.

Since the road surface state of the current road surface detected by the current road surface state detector and the road surface state of the forward road surface detected by the forward road surface state detector are compared with each other and an announcement is made about a post-variation road surface state if one of the road surface state of the current road surface and the road surface state of the forward road surface has varied, the response speed of the announcement of a road surface state in response to a variation in the road surface state can be increased.

A road surface state announcing apparatus according to a seventh embodiment comprises a current road surface state detector for detecting a road surface state of a current road surface on which a vehicle mounted with the road surface state announcing apparatus is running; a forward road surface state detector for detecting a road surface state of a forward road surface; a synchronizer for synchronizing a road surface state of a forward road surface detected by the forward road surface state detector with the road surface state of the current road surface detected by the current road surface state detector; and an announcing device for making an announcement about a road surface state of the current road surface on the basis of the road surface state of the current road surface detected by the current road surface state detector and the road surface state of the forward road surface detected by the forward road surface state detector and synchronized by the synchronizer with the road surface state of the current road surface detected by the current road surface state detector.

The current road surface state detector detects a road surface state of a current road surface on which a vehicle mounted with the road surface state announcing apparatus is running. The forward road surface state detector detects a road surface state of a forward road surface.

The synchronizer synchronizes a road surface state of a forward road surface detected by the forward road surface state detector with the road surface state of the current road surface detected by the current road surface state detector.

The announcing device makes an announcement about a road surface state of the current road surface on the basis of the road surface state of the current road surface detected by the current road surface state detector and the road surface state of the forward road surface detected by the forward road surface state detector and synchronized by the synchronizer with the road surface state of the current road surface detected by the current road surface state detector.

Since an announcement is made about a road surface state of the current road surface on the basis of the detected road surface state of the current road surface and the detected and synchronized road surface state of the forward road surface, the announcement of the road surface state can be performed accurately.

A road surface friction state estimating apparatus according to an eighth aspect of the invention comprises a road surface state detector for detecting a road surface state of a road surface on which a vehicle mounted with the road surface friction state estimating apparatus in running; a road surface friction state estimating device for estimating a road surface friction state as a friction state between the road surface and a tire of the vehicle; and a final road surface friction state estimating device for estimating a final road surface friction state on the basis of the road surface state detected by the road surface state detector and the road surface friction state estimated by the road surface friction state estimating device.

The road surface state detector detects a road surface state of a road surface on which a vehicle mounted with the road surface friction state estimating apparatus in running. The road surface friction state estimating device estimates a road surface friction state as a friction state between the road surface and a tire of the vehicle.

The final road surface friction state estimating device estimates a final road surface friction state on the basis of the road surface state detected by the road surface state detector and the road surface friction state estimated by the road surface friction state estimating device. That is, on the basis of the road surface state detected by the road surface state detector and the road surface friction state estimated by the road surface friction state estimating device, the road surface friction state estimating device determines that an average (a moving average or the like) of road surface friction states detected by the road surface friction state estimating device is a final road surface friction state if the detected road surface state remains the same or the variation amount is within a prescribed value.

Since a final road surface friction state is estimated on the basis of the road surface state detected by the road surface state detector and the road surface friction state estimated by the road surface friction state estimating device, the road surface friction state can be processed so as to be adapted to a variation in the road surface state and hence the road surface friction state can be estimated more accurately.

Even if the road surface friction state can be processed so as to be adapted to a variation in the road surface state, a finally estimated road surface friction state may not be accurate if the detected road surface friction state is not correct.

In view of the above, the road surface friction state estimating apparatus may be such that road surface friction state ranges are set in advance so as to be correlated with a plurality of road surface states, respectively, such as to further comprise a judging component for judging whether the road surface friction state detected by the road surface friction state estimating device falls within a road surface friction state range corresponding to the road surface state detected by the road surface state detector on the basis of the road surface friction state ranges corresponding to the respective road surface states, the road surface state detected by the road surface state detector, and the road surface friction state detected by the road surface friction state estimating device, and such that the final road surface friction state estimating device for estimating a final road surface friction state on the basis of the road surface state detected by the road surface state detector and the road surface friction state estimated by the road surface friction state estimating device if the judging component judges that the road surface friction state detected by the road surface friction state estimating device falls within the road surface friction state range corresponding to the road surface state detected by the road surface state detector.

Road surface friction state ranges are set in advance so as to be correlated with a plurality of road surface states, respectively.

The judging component judges whether the road surface friction state detected by the road surface friction state estimating device falls within a road surface friction state range corresponding to the road surface state detected by the road surface state detector on the basis of the road surface friction state ranges corresponding to the respective road surface states, the road surface state detected by the road surface state detector, and the road surface friction state detected by the road surface friction state estimating device. For example, if judging that the detected road surface friction state is out of the road surface friction state range corresponding to the road surface state detected by the road surface state detector, the judging component can judge that the detected road surface friction state is not correct. If a final road surface friction state is estimated by using such an incorrect road surface friction state, a resulting road surface friction state estimation value is not correct.

In view of this, the final road surface friction state estimating device estimates a final road surface friction state on the basis of the road surface state detected by the road surface state detector and the road surface friction state estimated by the road surface friction state estimating device if the judging component judges that the road surface friction state detected by the road surface friction state estimating device falls within the road surface friction state range corresponding to the road surface state detected by the road surface state detector. Therefore, a road surface friction state can be estimated accurately.

A road surface state estimating apparatus according to a ninth aspect of the invention comprises a tire-generated sound detector for detecting a tire-generated sound that is generated from a tire while a vehicle is running; a wheel rotation speed detector for detecting a wheel rotation speed; a storage device for storing relationships between feature quantities corresponding to tire-generated sound sources and a wheel rotation speed in such a manner that the sets of coefficients are correlated with a plurality of road surface states, respectively; and an estimating device for estimating a road surface state on the basis of the tire-generated sound detected by the tire-generated sound detector, the wheel rotation speed detected by the wheel rotation speed detector, and the coefficients stored in the storage device.

The tire-generated sound detector detects a tire-generated sound that is generated from a tire while a vehicle is running. The wheel rotation speed detector detects a wheel rotation speed.

The storage device stores relationships between feature quantities corresponding to tire-generated sound sources and the wheel rotation speed. The storage device may store the relationships by, for example, storing sets of coefficients that define formulae representing the relationships. The formulae may be quadratic functions, for example.

The estimating device estimates a road surface state on the basis of the tire-generated sound detected by the tire-generated sound detector, the wheel rotation speed detected by the wheel rotation speed detector, and the relationship stored in the storage device.

Since the relationships between feature quantities corresponding to tire-generated sound sources and the wheel rotation speed in such a manner that the relationship is correlated with a plurality of road surface states, respectively, to enable estimation of a road surface state, the amount of storage information can be made smaller than in a case that tire-generated sounds and wheel rotation speeds are stored for each road surface state.

The road surface state estimating apparatus may be such as to further comprise an updating device for updating the relationships stored in the storage device on the basis of the tire-generated sound detected by the tire-generated sound detector and the wheel rotation speed detected by the wheel rotation speed detector, and such that the estimating device estimates a road surface state on the basis of the tire-generated sound detected by the tire-generated sound detector, the wheel rotation speed detected by the wheel rotation speed detector, and the relationships stored in the storage device and updated by the updating device.

In the above-described invention, the tire-generated sound detector is provided at such a position that the influence of disturbance not from tire-generated sound sources on a tire-generated sound is small, for example, at a position close to a tire inside a bumper.

The detector for detecting at least one of saturation information, luminance information, hue information, and intensity information of a road surface may detect at least one of saturation information, luminance information, hue information, and intensity information of an area including part of the vehicle and a forward road surface, and a calculation and output device may further be provided that calculates a relationship between at least one of saturation information, luminance information, hue information, and intensity information of the part of the vehicle and that of the forward road surface on the basis of at least one of saturation information, luminance information, hue information, and intensity information detected by the detector and outputs the calculated relationship.

BRIEF DESCRIPTION OF THE DRAWINGS

FIGS. 3A and 3B and FIGS. 4A and 4B show results of wavelet transform that was performed on tire-generated sounds of known road surfaces, that is, a dry asphalt road surface, a wet asphalt road surface, an ice-plate road surface, and a compacted-snow road surface, respectively, by using Daubechie's wavelet (N=3);

FIGS. 5A-5F show results of time-frequency analyses on respective wavelet components;

DESCRIPTION OF THE PREFERRED EMBODIMENTS

A first embodiment of the present invention will be hereinafter described with reference to the drawings.

Figure 1:
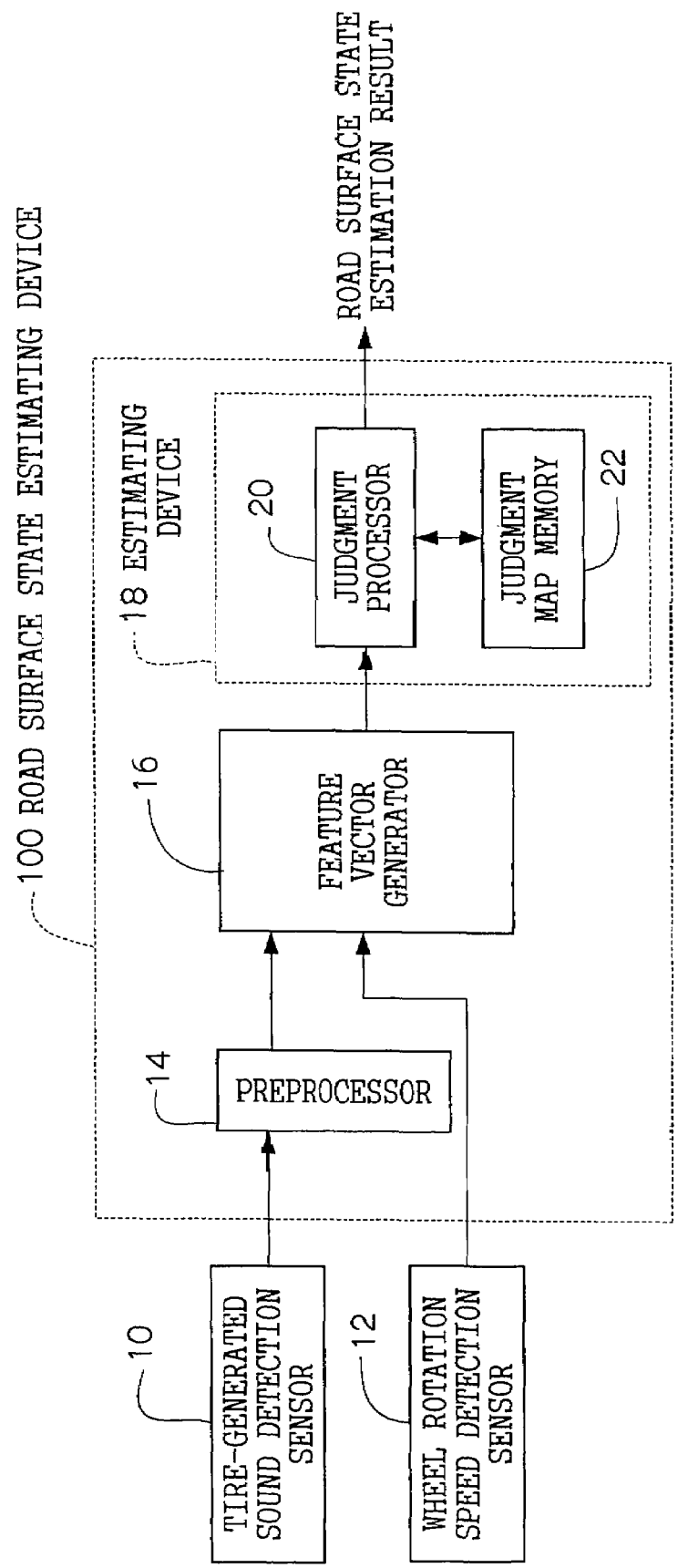
FIG. 1 is a block diagram of a road surface state estimating apparatus according to a first embodiment of the present invention.

As shown in FIG. 1, a road surface state estimating apparatus according to this embodiment is equipped with a tire-generated sound detection sensor 10 as a tire-generated sound detector for detecting a sound that is generated by a tire while the vehicle is running, a wheel rotation speed detection sensor 12 as a wheel rotation speed detector for detecting a wheel rotation speed, and a road surface state estimating device 100.

The tire-generated sound detection sensor 10 is disposed at such a position close to a tire as not to be prone to be influenced by external sounds such as an engine sound and a zip sound and to be least prone to be hit by obstacles such as water and stones. More specifically, the tire-generated sound detection sensor 10 is disposed close to a tire (not shown) so as not to be influenced by a vehicle vibration sound. For example, where the engine is located in the front part of the vehicle, the tire-generated sound detection sensor 10 is attached to a portion of the body that is close to a rear tire. The tire-generated sound detection sensor 10 maybe a microphone. The wheel rotation speed detection sensor 12 is a sensor for detecting an angular velocity of a wheel as a wheel rotation speed.

The road surface state estimating device 100 is equipped with a preprocessor 14 that is an IC or the like as a calculator for calculating at least one feature quantity corresponding to a road surface state and a source of a tire-generated sound, a feature vector generator 16 that is an IC or the like for generating a feature vector having, as components, feature quantities calculated by the preprocessor 14 and a wheel rotation speed detected by the wheel rotation speed detection sensor 12, and an estimating device 18.

The estimating device 18 is equipped with a judgment map memory 22 for storing, as a map, feature quantities that correspond to sets of a road surface state and a wheel rotation speed and a judgment processor 20 that is an IC or the like for estimating a state of a road surface on which the vehicle is running on the basis of a feature vector generated by the feature vector generator 16 and the feature quantities that are stored as a map in the judgment map memory 22 and correspond to the sets of a road surface state and a wheel rotation speed.

The feature quantities that are stored in the judgment map memory 22, that is, the feature quantities that are stored as a map and correspond to the sets of a road surface state and a wheel rotation speed, will be described below starting from factors that cause a sound between tires and a road surface.

Sources of sounds that are generated between tires and a road surface are described in, for example, "Research on Vehicular Tires," edited by The Yokohama Rubber Co., Ltd., Sankai-Do and Hideo Sakai: "Tire Engineering," Grand Prix Book Publishing Co., Ltd. Main sources of such sounds are:
  pumping noise
  rubber collision noise
  tire body vibration noise, and
  squeal noise.

The pumping noise is generated by air-column resonance that is caused by pumping action that the air in each tread groove is compressed and released, and has a fundamental frequency of 1.5 to 2.5 kHz. The pumping noise becomes large as the road surface becomes smoother.

The rubber collision noise is generated when treads collide relatively with small stones, water, etc. The rubber collision noise is white noise having a variable pitch pattern and is in a frequency range of 1 kHz or more.

The tire body vibration noise occur in such a manner that the treads and the side walls are shaken during rolling (i.e., rotation of a tire) and resulting vibration is transmitted through the air, and is classified into first vibration noise in which the shaking force is tread rubber blocks and second vibration noise in which the shaking force is road surface asperity. The tire body vibration noise has a frequency of hundreds of hertz to thousands of hertz.

The squeal noise is generated by a stick slip of tread rubber at the time of slamming on the brakes or sharp cornering, and is in a frequency range of 1 to 2 kHz.

As seen from the above-described sources, the tire-generated sound depends on the road surface state and the sound source, for example, the type of tire, the tread pattern, and the running speed.

FIGS. 2A-2D show time-frequency analysis results that were obtained when a vehicle equipped with studless tires ran on different road surfaces at a prescribed speed. An examination of these frequency distributions from the viewpoint of sound sources leads to conclusions that portions A in a frequency range of 2 kHz or less are tire body vibration noise and portions B having a fundamental frequency of 2 kHz are pumping noise. Portion C is considered a white noise component that was generated when treads collided relatively with water or the like on the road surface or such water or the like was splashed.

Figure 2A:
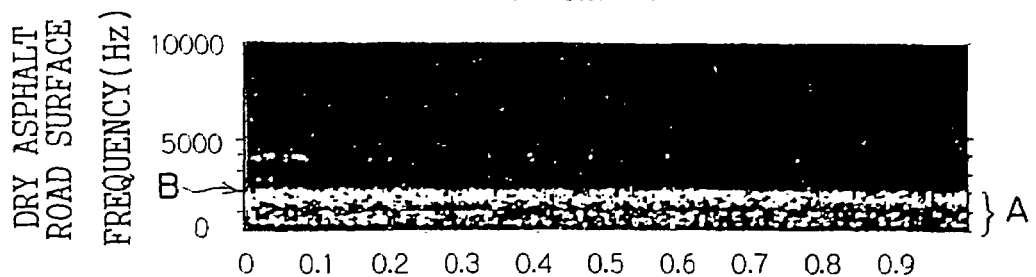
FIGS. 2A-2D show time-frequency analysis results that were obtained when a vehicle equipped with studless tires ran on different road surfaces at a prescribed speed.
Figure 2B:
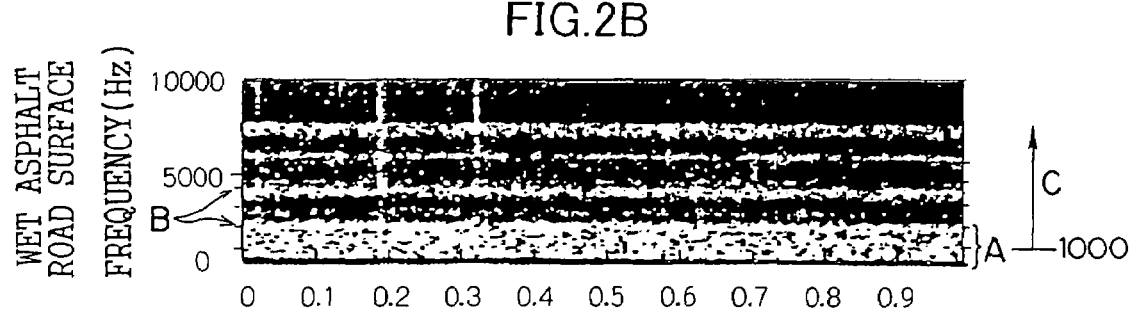
Figure 2C:
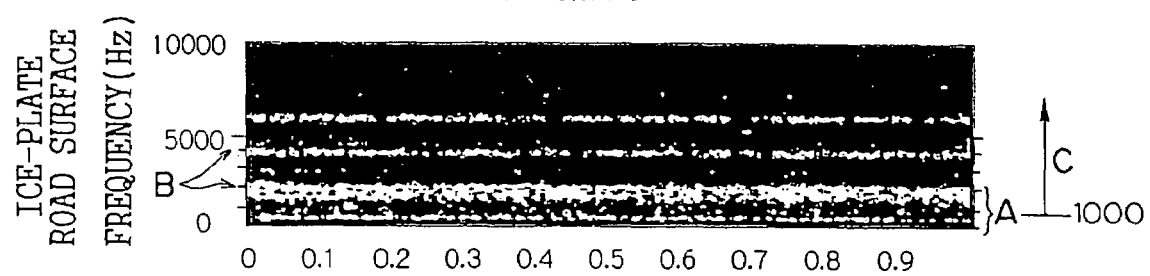
Figure 2D:
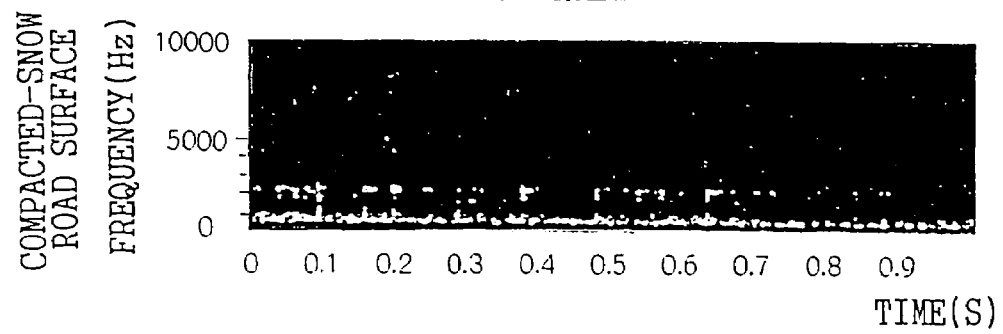
Figure 3A:
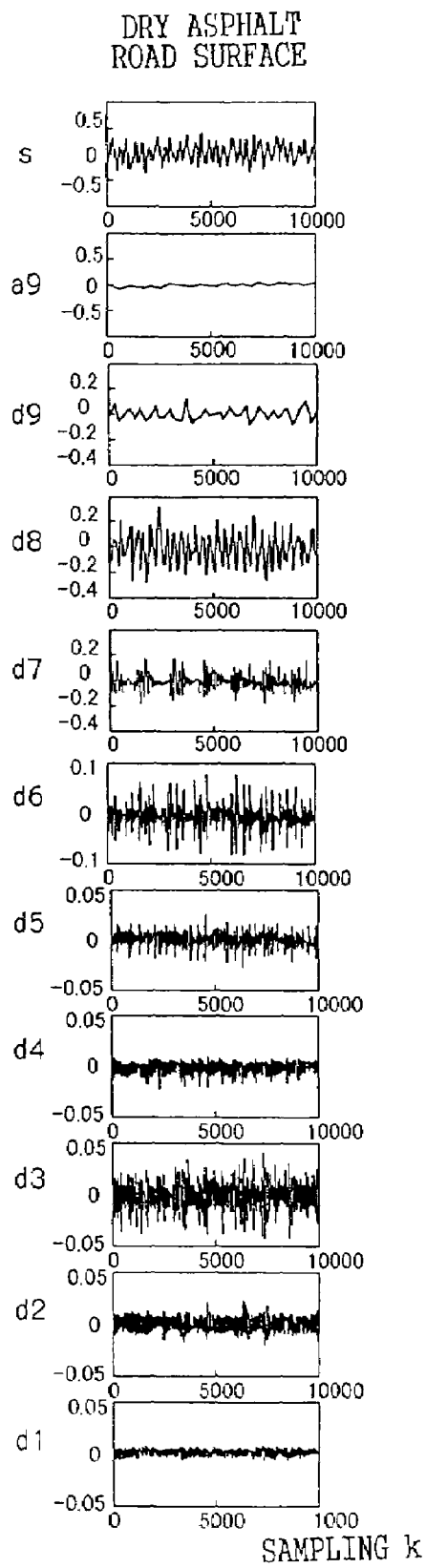
Figure 3B:
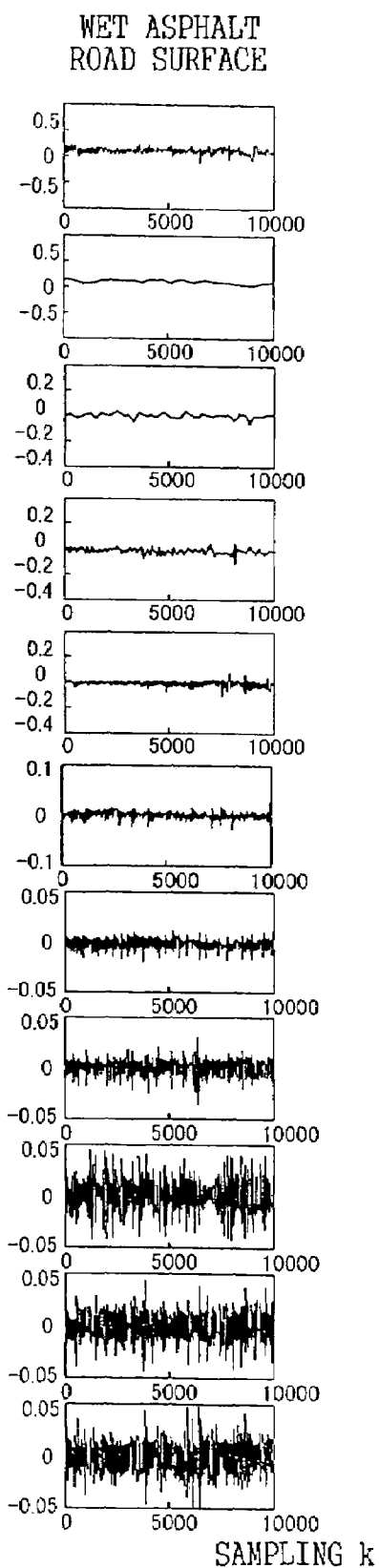

A large white noise component (portion C) is found in the case of a wet asphalt road surface (FIG. 2B) and, conversely, only a small white noise component is found in the case of a dry asphalt road surface (FIG. 2A).

In the case of a ice-plate road surface (FIG. 2C), a large pumping noise component (portion B) having a fundamental frequency of 2 kHz is found because that road surface is flat and, conversely, only a small tire body vibration noise (portion A) due to road surface asperity is found.

In the case of a compacted-snow road surface (FIG. 2D) no remarkable pumping noise component, white noise, or tread rubber block shaking component is found.

As described above, the magnitudes of sound components that depend on the sound source vary depending on the road surface state, which makes it possible to judge a road surface state by extracting those components.

FIGS. 3A and 3B and FIGS. 4A and 4B show results of wavelet transform that was performed on tire-generated sounds of known road surfaces, that is, a dry asphalt road surface, a wet asphalt road surface, an ice-plate road surface, and a compacted-snow road surface, respectively, by using Daubechie's wavelet (N=3). FIGS. 5A-5F show results of time-frequency analyses on respective wavelet components.

As seen from FIGS. 3A and 3B, 4A and 4B, and 5A-5F, in particular, the d1 component represents pumping noise at 2 kHz and rubber collision noise of 2 kHz or more, the d4 component represents tire body first vibration noise of 2 kHz or less due to tread rubber block shaking, and the d5 to d9 components represent tire body second vibration noise of 1 kHz or less due to road surface asperity. That is, these components particularly vary depending on the road surface.

The above results correspond to a case that the wheel rotation speed is kept at a prescribed value. Values obtained by performing wavelet transform on a tire-generated sound vary with the wheel rotation speed.

In this embodiment, values obtained by wavelet-transforming a tire-generated sound as feature quantities corresponding to a road surface state and sound sources are stored for each set of a wheel rotation speed and a road surface state are stored in the judgment map memory 22. That is, feature vectors (i.e., combinations of feature quantities (values obtained by wavelet-transforming a tire-generated sound) and a wheel rotation speed) that were obtained in advance by the preprocessor 14 and the feature vector generator 16 on the basis of typical tire-generation sounds and wheel rotation speeds for each of a plurality of road surfaces are classified by the road surface state and stored in the judgment map memory 22 as prototypes.

Next, the operation of this embodiment will be described.

The tire-generated sound detection sensor 10 detects a sound that is generated by a tire while the vehicle is running. The wheel rotation speed detection sensor 12 detects a wheel rotation speed at this time.

On the basis of the tire-generated sound that has been detected by the tire-generated sound detection sensor 10, the preprocessor 14 calculates feature quantities corresponding to $$S_K^{(j)} = \sum_n p_{n-2k} S_n^{(j-1)};$$

$$W_K^{(j)} = \sum_n q_{n-2k} S_n^{(j-1)}$$

a road surface state and sources of the tire-generated sound. That is, the preprocessor 14 separates the tire-generated sound into components of respective sound sources that depend on the road surface state by performing an analysis (i.e., signal processing) on the tire-generated sound that has been detected by the tire-generated sound detection sensor 10. The analysis may be a wavelet analysis that detects similarity correlation in the time domain by obtaining correlation values between the waveform of the tire-generated sound and at least one fundamental waveform having a predetermined length, for example, calculating the inner products of the tire-generated sound signal and wavelet fundamental waves. Alternatively, one of various kinds of filter processing may be used.

Figure 6:
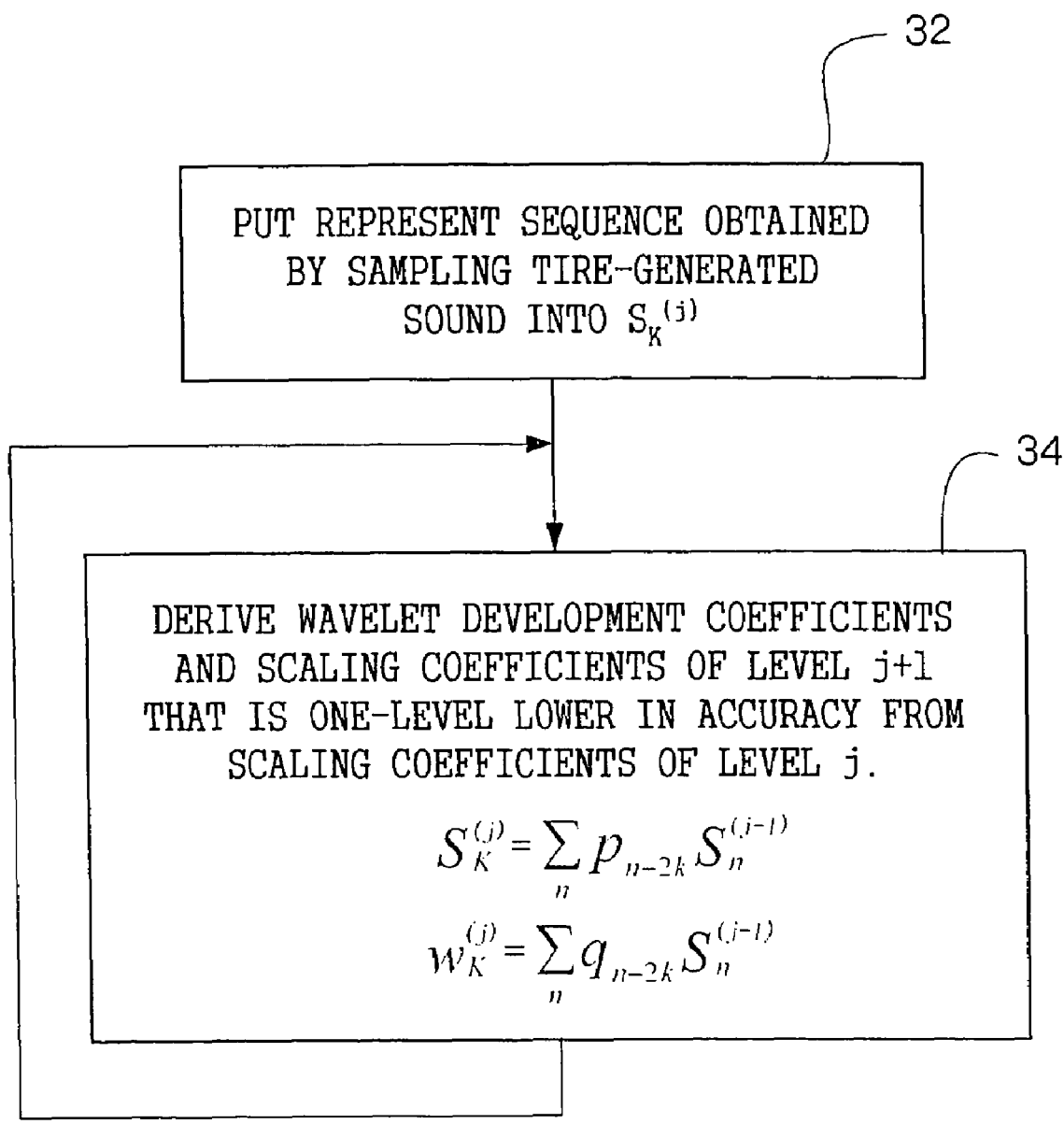
FIG. 6 shows an algorithm of a preprocessor that employs wavelet transform.

FIG. 6 shows an algorithm of the preprocessor 14 that employs wavelet transform. This is a fast wavelet transform algorithm that was discovered by S. Mallat in 1989 (S. Mallat: "A Theory for Multiresolution Signal Decomposition: the Wavelet Representation," IEEE Trans. PAMI, Vol. 11, No. 7, pp. 674-693, 1989).

At step 32, a sequence obtained by sampling a tire-generated sound is put into $S_k^{(j)}$. At step 34, wavelet development coefficients and scaling coefficients of level j+1 that is one-level lower in accuracy are derived from scaling coefficients of level j.

where $S_k^{(j)}$ is scaling coefficients, $W_k^{(j)}$ is wavelet development coefficients, p is a sequence of a scaling function, q is a wavelet sequence (fundamental waveform), k is a shift amount, and j is a scale.

The feature vector generator 16 generates a combination of the components that were separated and extracted by the preprocessor 14 and the wheel rotation speed that was detected by the wheel rotation speed detection sensor 12, that is, a feature vector having those as components. The feature vector generator 16 supplies the thus-generated feature vector to the judgment processor 20.

The judgment processor 20 estimates a state of a road surface on which the vehicle is running on the basis of the feature vector generated by the feature vector generator 16 and the feature vectors that are stored in the judgment map memory 22 for the respective road surface states and each of which corresponds to a road surface state and tire-generated sound sources. That is, the judgment processor 20 compares the input feature vector with the prototypes stored in the judgment map memory 22 in the feature space (i.e., a space having the feature quantities and the speed as components), and outputs, as a road surface state judgment result, a class to which a prototype having a shortest distance belongs. The Euclid distance is employed as the distance.

The nearest neighbor rule (i.e., NN method), the Bayes decision rule, a linear discriminant function, a neural network, or the like may be used for the discrimination processing. Where a neural network is used as a discrimination technique, weight coefficients of the neural network serve as data of a discrimination dictionary.

As described above, in this embodiment, at least one feature quantity corresponding to a road surface state and a tire-generated sound source is calculated on the basis of a tire-generated sound instead of handling the tire-generated sound itself having frequency components in a wide range, which makes it possible to reduce the amount of information that is necessary to estimate a road surface state. Since a state of a road surface on which the vehicle is running is estimated on the basis of calculated feature quantities and sets of feature quantities that are stored for respective road surface states and each of which corresponds to a road surface state and tire-generated sound sources, the road surface state can be estimated accurately.

More specifically, as shown in FIGS. 3A to 4B, as seen from, for example, a waveform obtained by decomposing, by wavelet transform, a tire-generated sound that was generated when a vehicle was running on a wet road surface, a tire-generated sound is composed of signals a9, d9, d8, . . . , d1 in a frequency range covering low frequencies and high frequencies. The waveforms of the signals are not periodic and have a feature that they change suddenly. And the signals have different general frequencies. The Fourier transform is insufficient as an analysis method for signals whose waveforms are not periodic and have a feature that they change suddenly. Therefore, a road surface state cannot be estimated accurately by the Fourier transform.

Figure 13:
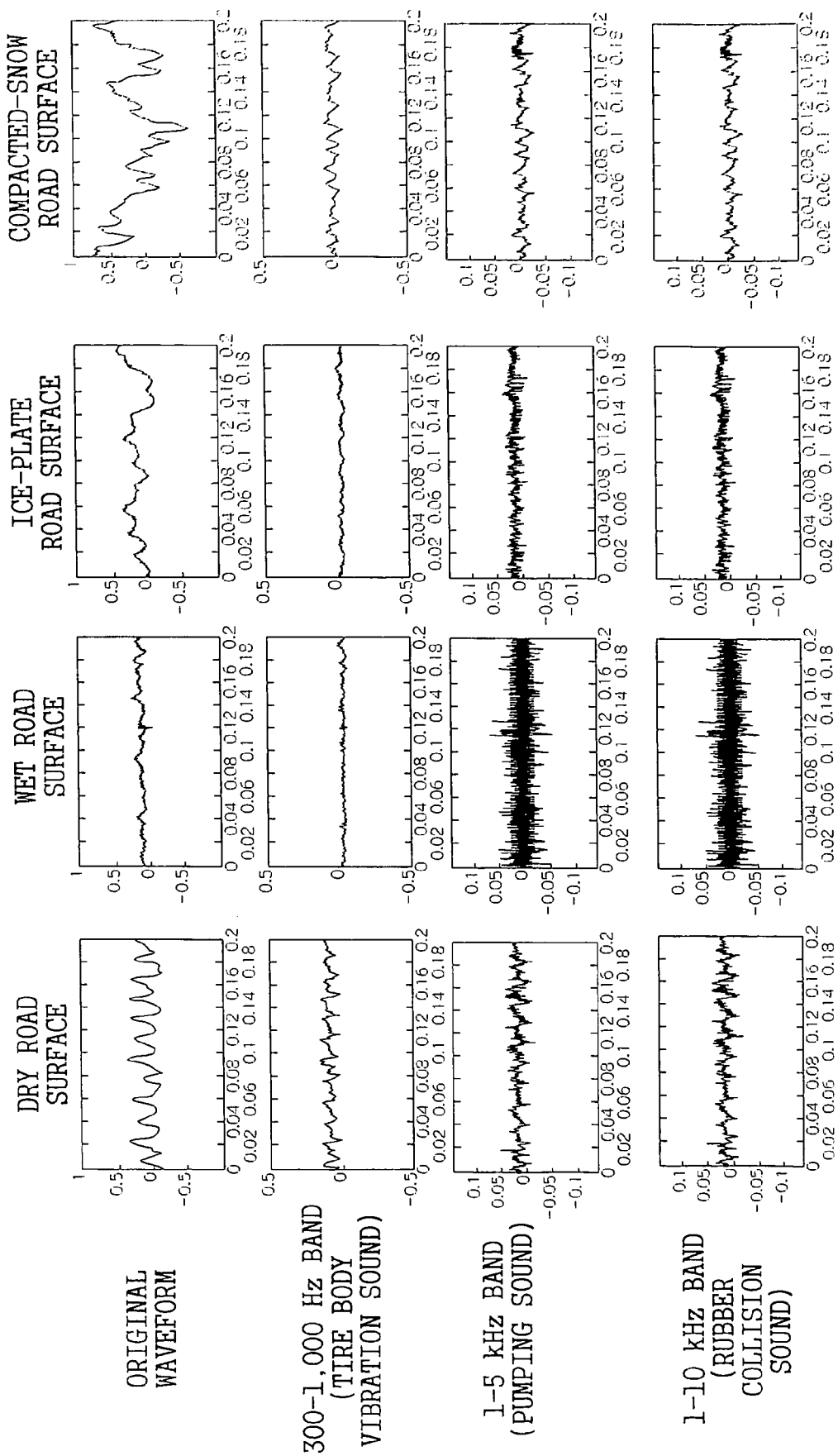
FIG. 13 shows waveforms obtained by decomposing tire-generated sounds that were generated when a vehicle ran on four different road surfaces, respectively, by causing the tire-generated sounds to pass through band-pass filters.
Figure 14B:
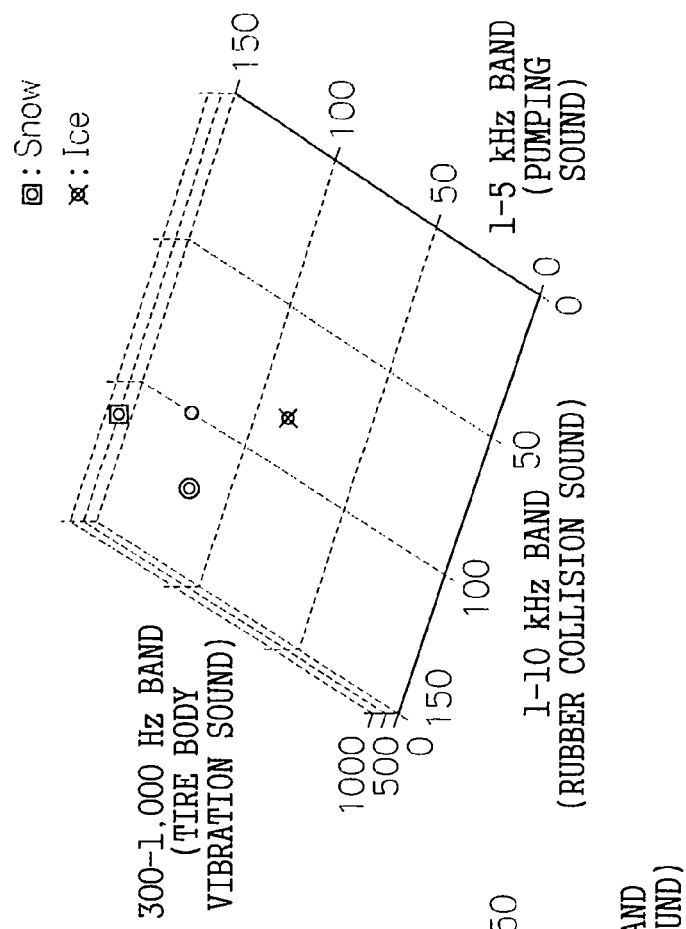
FIGS. 14A and 14B show feature quantities (i.e., effective values of the waveforms) calculated from the waveforms obtained by causing, to pass through the band-pass filters, the tire-generated sounds generated when the vehicle ran on the four different road surfaces.
Figure 14A:
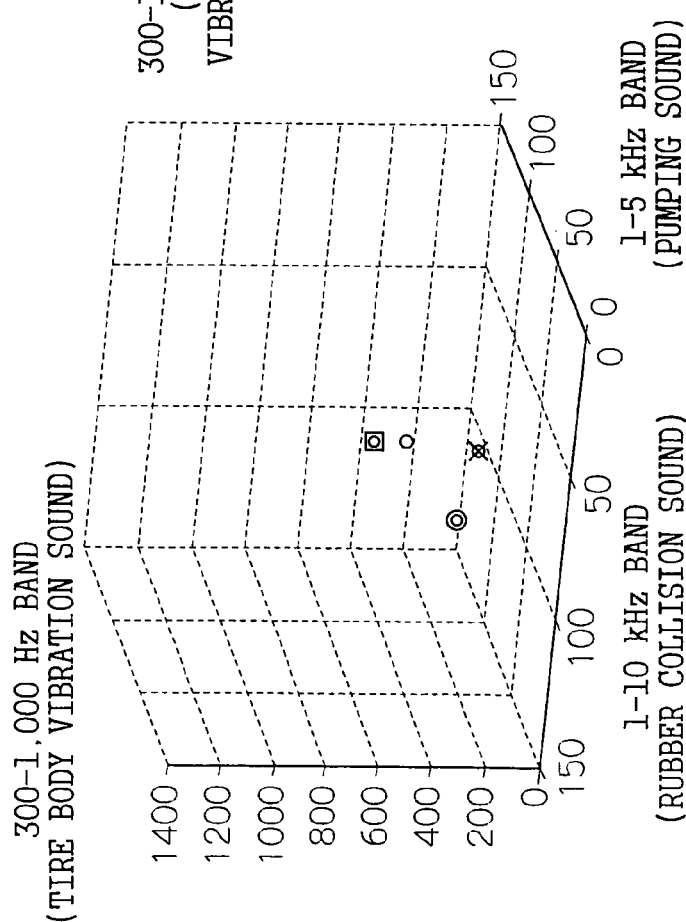

A tire-generated sound may be decomposed and analyzed by causing it to pass through band-pass filters that are determined for respective tire-generated sound sources instead of using the above-described wavelet transform. FIG. 13 shows waveforms obtained by decomposing tire-generated sounds that were generated when a vehicle ran on four different road surfaces, respectively, by causing the tire-generated sounds to pass through band-pass filters. To analyze the decomposed waveforms actually, effective values of the respective waveforms are calculated. FIGS. 14A and 14B show feature quantities (i.e., effective values of the waveforms) calculated from the waveforms obtained by causing, to pass through the band-pass filters, the tire-generated sounds generated when the vehicle ran on the four different road surfaces.

However, as shown in FIGS. 14A and 14B, the feature quantities of the tire-generated sounds obtained when the vehicle ran on the four different road surfaces are distributed in relatively small ranges. Therefore, it is difficult to clearly discriminate the feature quantities of the respective road surfaces from each other. It is concluded that in the case of using feature quantities calculated from waveforms that are obtained by decomposing tire-generated sounds by causing those to pass through band-pass filters the accuracy of estimation of road surface states is lower than in the case of using feature quantities calculated from waveforms that are obtained by wavelet transform.

In contrast, in the above embodiment, road surface states can be estimated accurately from the feature quantities because the feature quantities are calculated from the waveforms obtained by decomposing, by wavelet transform, the tire-generated sounds obtained when the vehicle ran on the plurality of (e.g., four) different road surfaces and hence the feature quantities are dispersed in wide ranges. This will be described below in more detail.

Figure 15:
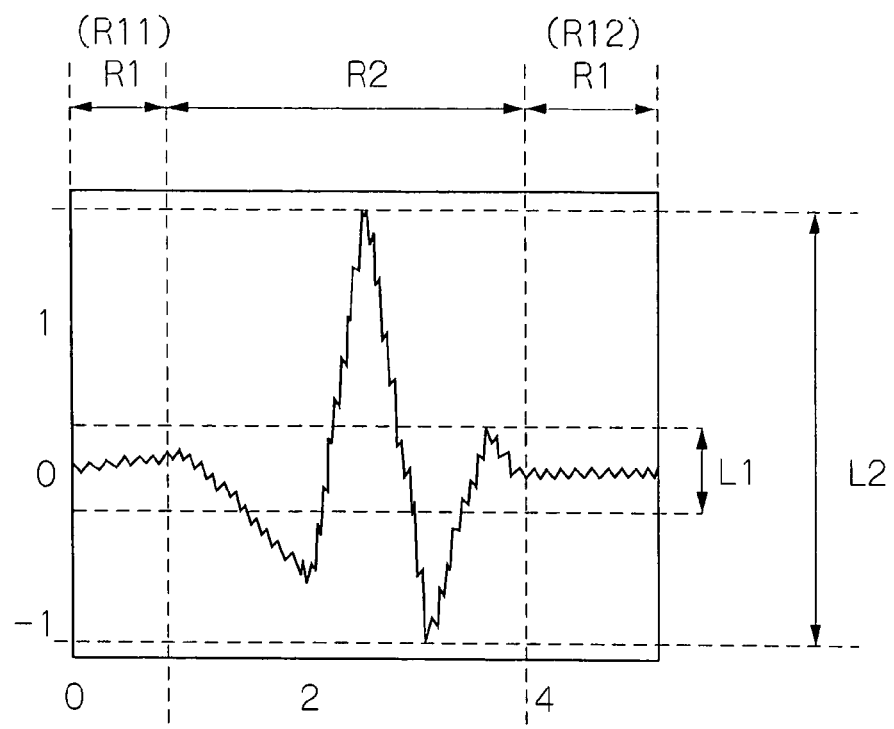
FIG. 15 shows Daubechie's wavelet fundamental waveform.
Figure 16:
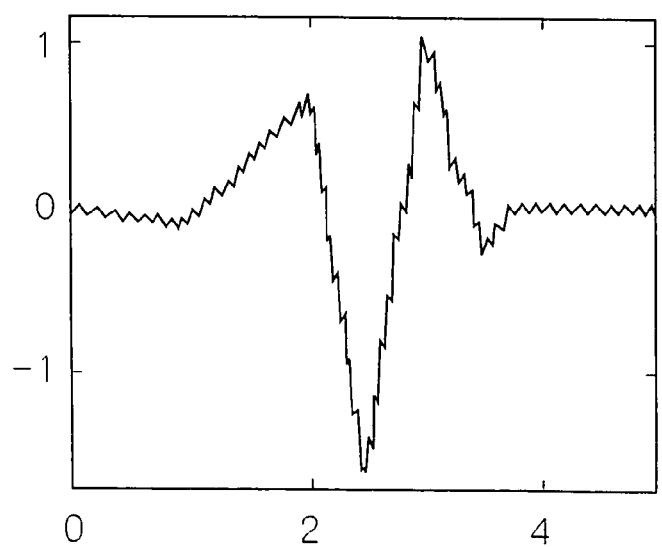
FIG. 16 shows Symlet's wavelet fundamental waveform.
Figure 17:
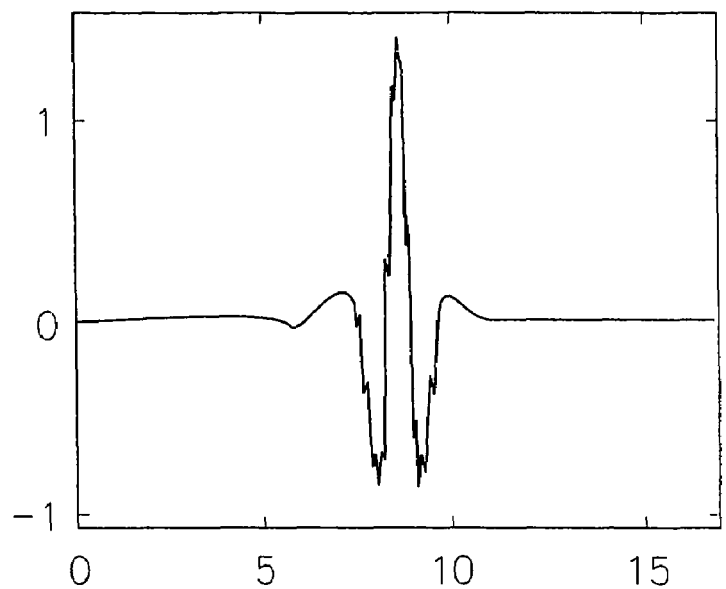
FIG. 17 shows Coiflet's wavelet fundamental waveform.
Figure 18:
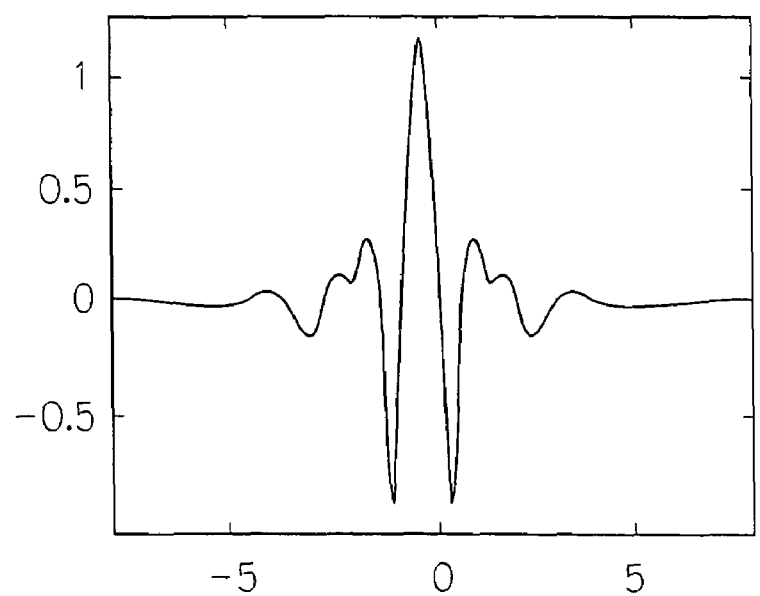
FIG. 18 shows Mayer's wavelet fundamental waveform.

A fundamental waveform that is used in decomposing a tire-generated sound by wavelet transform has two first regions in which an amplitude of the wave is within a first range and a second region that is interposed between the two first regions and in which the amplitude of the wave is larger than in the two first regions and the value is within a second range that is wider than the first range. For example, Daubechie's wavelet fundamental waveform shown in FIG. 15 has two first regions R1 (R11 and R12) in which the amplitude of the wave is within a first range L1 and a second region R2 that is interposed between the two first regions R1 (R11 and R12) and in which the amplitude of the wave is larger than in the two first regions R1 (R11 and R12) and the value is within a second range L2 that is wider than the first range L1. As shown in FIGS. 16-18, the same is true of Symlet's, Coiflet's, and Mayer's wavelet fundamental waveforms.

Figure 19A:
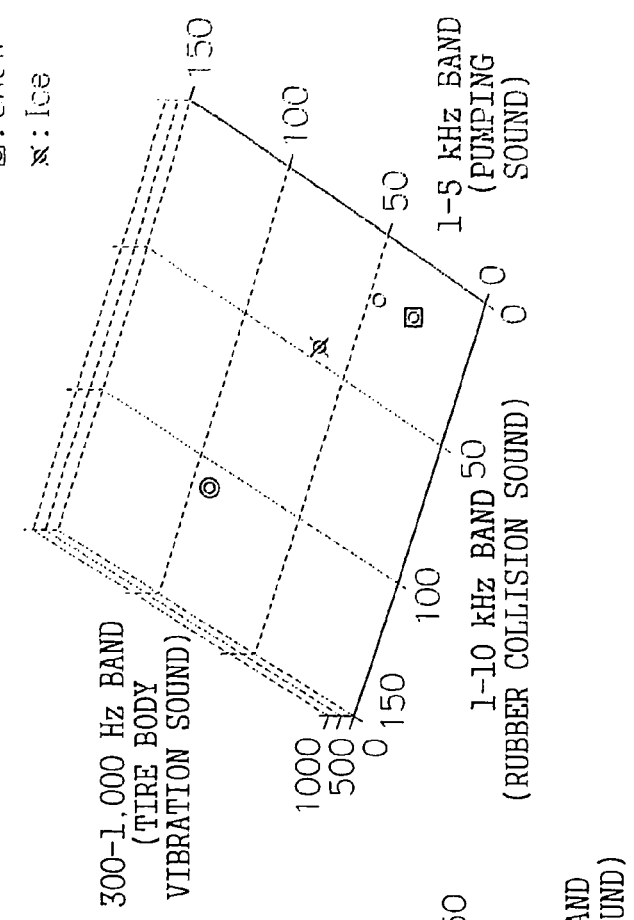
FIGS. 19A and 19B show feature quantities (correlation values) calculated from the waveforms obtained by decomposing, by using Daubechie's wavelet fundamental waveform, the tire-generated sounds that were generated when the vehicle ran on the four road surfaces.
Figure 19B:
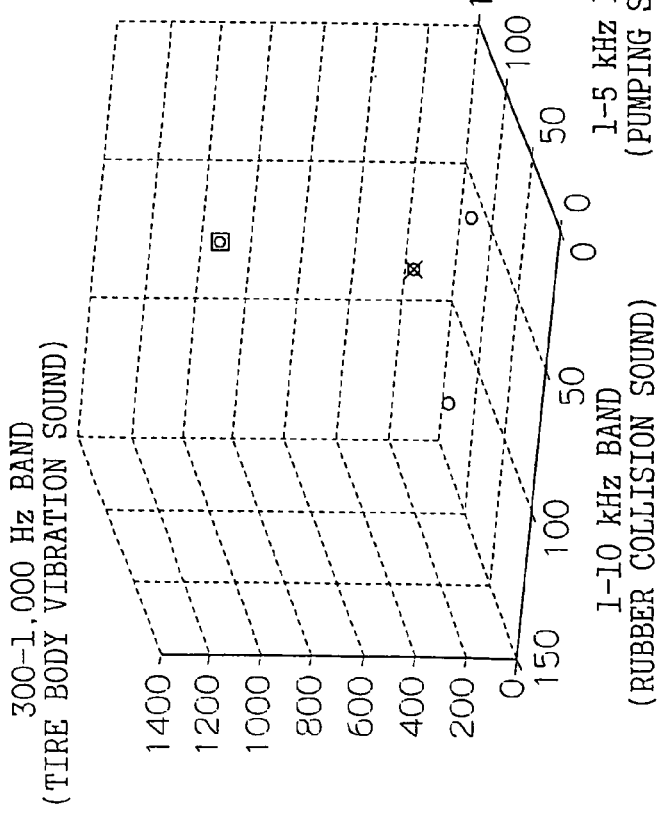

FIGS. 3A to 4B show waveforms obtained by decomposing, by using Daubechie's wavelet (see FIG. 15), tire-generated sounds that were generated when a vehicle ran on four road surfaces, that is, dry, wet, ice-plate, and compacted-snow road surfaces. FIGS. 3A, 3B, 4A, and 4B show feature quantities (correlation values) calculated from those decomposed waveforms. In FIGS. 19A and 19B, terms "dry," "wet," "ice," and "snow" represent dry, wet, ice-plate, and compacted-snow road surfaces, respectively.

Comparison between FIGS. 14A and 14B and FIGS. 19A and 19B shows that the distribution range of the feature quantities (correlation values) of the four road surfaces shown in FIGS. 19A and 19B that were calculated from the waveforms obtained by decomposition using Daubechie's wavelet is wider than that of the feature quantities shown in FIGS. 14A and 14B. Since the feature quantities of the four road surfaces are dispersed in a wide range, road surface states can be judged correctly on the basis of the feature quantities.

Feature quantities (correlation values) of the four road surfaces that were calculated from the waveforms obtained by decomposition using each of Symlet's wavelet, Coiflet's wavelet, and Mayer's wavelet are also dispersed in a wide range. Therefore, road surface states can be judged correctly on the basis of those feature quantities.

Next, the details of the preprocessor 14 will be described with reference to FIG. 20.

Figure 20:
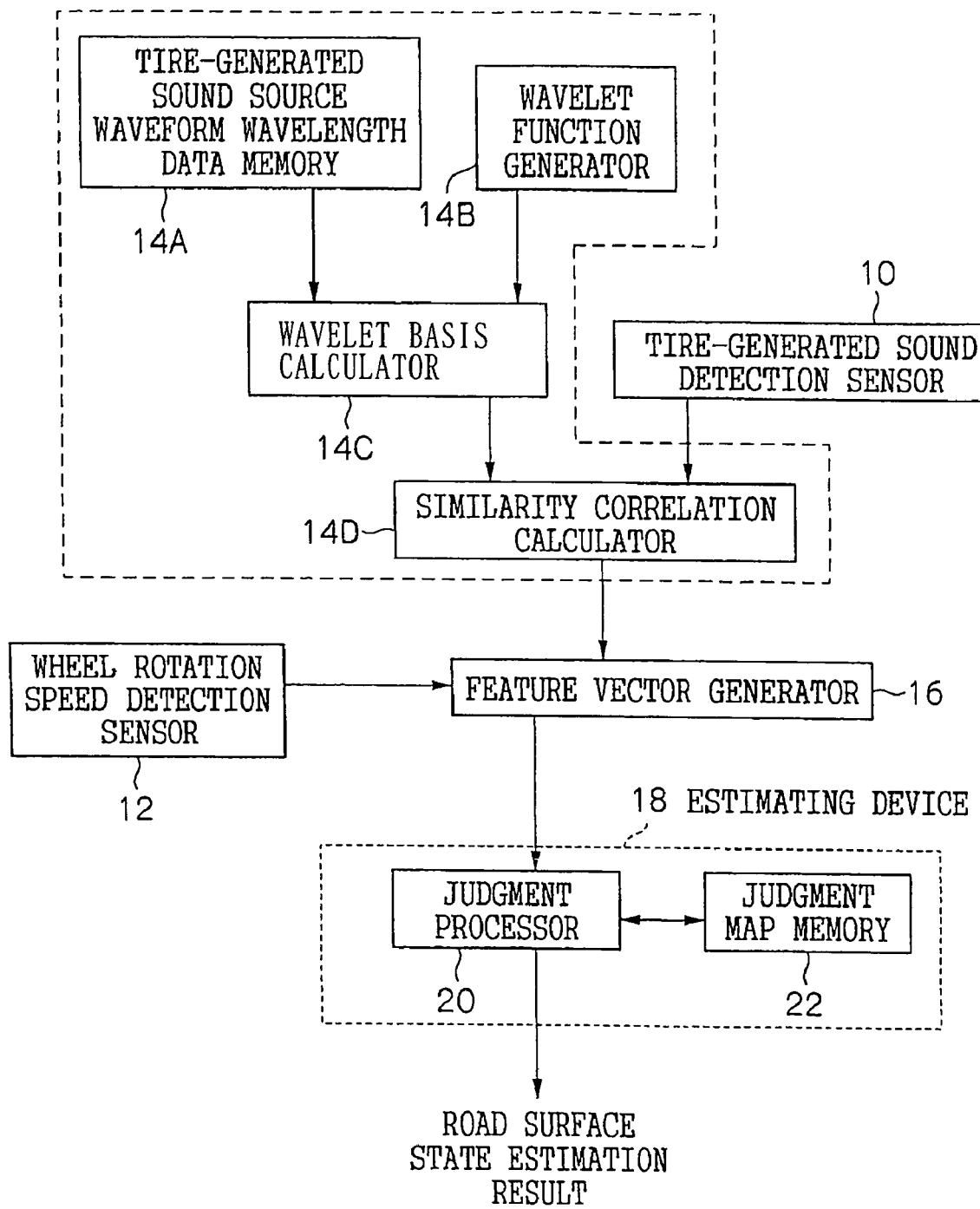
FIG. 20 is a block diagram of the road surface state estimating apparatus according to the first embodiment and shows the details of a preprocessor.

As shown in FIG. 20, the preprocessor 14 is equipped with a memory 14A for storing tire-generated sound source waveform wavelength data, a wavelet function generator 14B for generating a mother wavelet (wavelet function), a wavelet basis calculator 14C for calculating wavelet bases to be used for analyzing waveforms of tire-generated sound sources on the basis of the tire-generated sound source waveform wavelength data stored in the memory 14A and the mother wavelet generated by the wavelet function generator 14B, and a similarity correlation calculator 14D for detecting similarity correlation values by calculating the inner products of a tire-generated sound detected by the tire-generated sound detection sensor 10 and the wavelet bases calculated by the wavelet basis calculator 14C.

The wavelet function generator 14B generates a mother wavelet that is represented by a square-integrable function f(t) that satisfies the following inequality:

$$\int_{-\infty}^{\infty} |f(t)|^2 \, dt < \infty$$

The term "mother wavelet" is a generic term of functions ψ(t) that satisfy the following equations:

$$\int_{-\infty}^{\infty} \psi(t)\, dt = 0, \quad \int_{-\infty}^{\infty} \psi^2(t)\, dt = 1$$

The left equation (i.e., first condition) of the above two Equations means that ψ(t) is oscillatory and its support (i.e., a closure of an interval in which the function is not equal to 0) is bounded. The right equation (i.e., second condition) means that the degree of variation of ψ(t) is finite and is standardized to 1. An arbitrary function that satisfies the above two conditions may be employed as a mother wavelet.

The wavelet basis calculator 14C calculates wavelet bases to be used for analyzing waveforms of tire-generated sound sources on the basis of the tire-generated sound source waveform wavelength data stored in the memory 14A and the mother wavelet generated by the wavelet function generator 14B. That is, the wavelet basis calculator 14C calculates wavelet bases to be used for detecting waveforms of sound sources of a tire-generated sound.

The wavelet basis is given by $$\psi_{a,b}(t) = \frac{1}{\sqrt{|a|}} \psi\left(\frac{t-b}{a}\right)$$

where a is a scale parameter for controlling wavelength increase/decrease and b is a shift parameter for time adjustment.

The wavelet basis calculator 14C sets, on the basis of each tire-generated sound source waveform wavelength data stored in the memory 14A, the scale parameter a so that the wavelength of the wavelet basis becomes equal to a tire-generated sound source wavelength. That is, the wavelet basis calculator 14C sets the scale parameter a so that the wavelength of the wavelet basis becomes equal to a tire-generated sound source wavelength on the basis of each of data that were obtained by an experiment in which a vehicle ran on road surfaces having different states.

The similarity correlation calculator 14D detects similarity correlation values by calculating the inner products of a tire-generated sound detected by the tire-generated sound detection sensor 10 and the wavelet bases calculated by the wavelet basis calculator 14C, respectively. That is, the similarity correlation calculator 14D calculates the inner products of a tire-generated sound x(t) and the thus-set wavelet bases according to the following equation:

$$X(a, b) = \int_{-\infty}^{\infty} x(t)\overline{\psi_{a,b}(t)}\, dt$$

Then, the similarity correlation calculator 14D detects sound components of sound sources from the tire-generated sound by calculating similarity correlation values at respective time points while varying the shift parameter b.

As described above, wavelet bases that are similar to the waveforms of tire-generated sound sources of the wavelength data are calculated by using a wavelet function which generally has strong similarity with intermittent sounds and the inner products of the wavelet bases and a tire-generated sound are calculated. Therefore, only components of sound sources can be detected accurately from the tire-generated sound.

Using a function g(t) that is defined by $$g(t) = \overline{\psi(-t/a)}$$

This Equation is modified to $$X(a, b) = \int_{-\infty}^{\infty} x(t) g(b - t)\, dt$$

This is equivalent to an output that is produced by a filter having an impulse response g(t) when it receives x(t).

The matched filter is known as a filter that is used in a signal processing method utilizing correlation. This is a filter that is designed so as to produce a large output when receiving a waveform that coincides with a certain waveform. Now assume a filter that produces a large output when receiving a waveform that coincides with a waveform z(t).

It is assumed that this filter has an impulse response g(t)=z(−t). That is, the following equation holds:

$$y(t) = \int_{-\infty}^{\infty} u(\tau) z(\tau - t) d\tau$$

where u(t) is an input and y(t) is an output. That is, when receiving a waveform that coincides with z(t), this filter outputs a waveform that is an autocorrelation function, shifted by t, of z(t). On the other hand, this filter produces a small output when receiving a waveform having weak correlation with z(t).

The wavelet transform can be considered a matched filter with scaling. That is, the wavelet transform produce san output that is equivalent to an output that is produced when x(t) is input to a filter whose impulse response is g(t).

If this filter is a matched filter, the following equation holds:

$$\overline{\psi(t/a)}$$

That is, this is a matched filter that produces a large output when receiving a waveform that coincides with a scaled analyzing wavelet.

(Modifications)

Next, modifications of the first embodiment will be described. The following two modifications are different from the first embodiment in the preprocessor 14 and hence differences from the first embodiment will mainly be described below.

Figure 21:
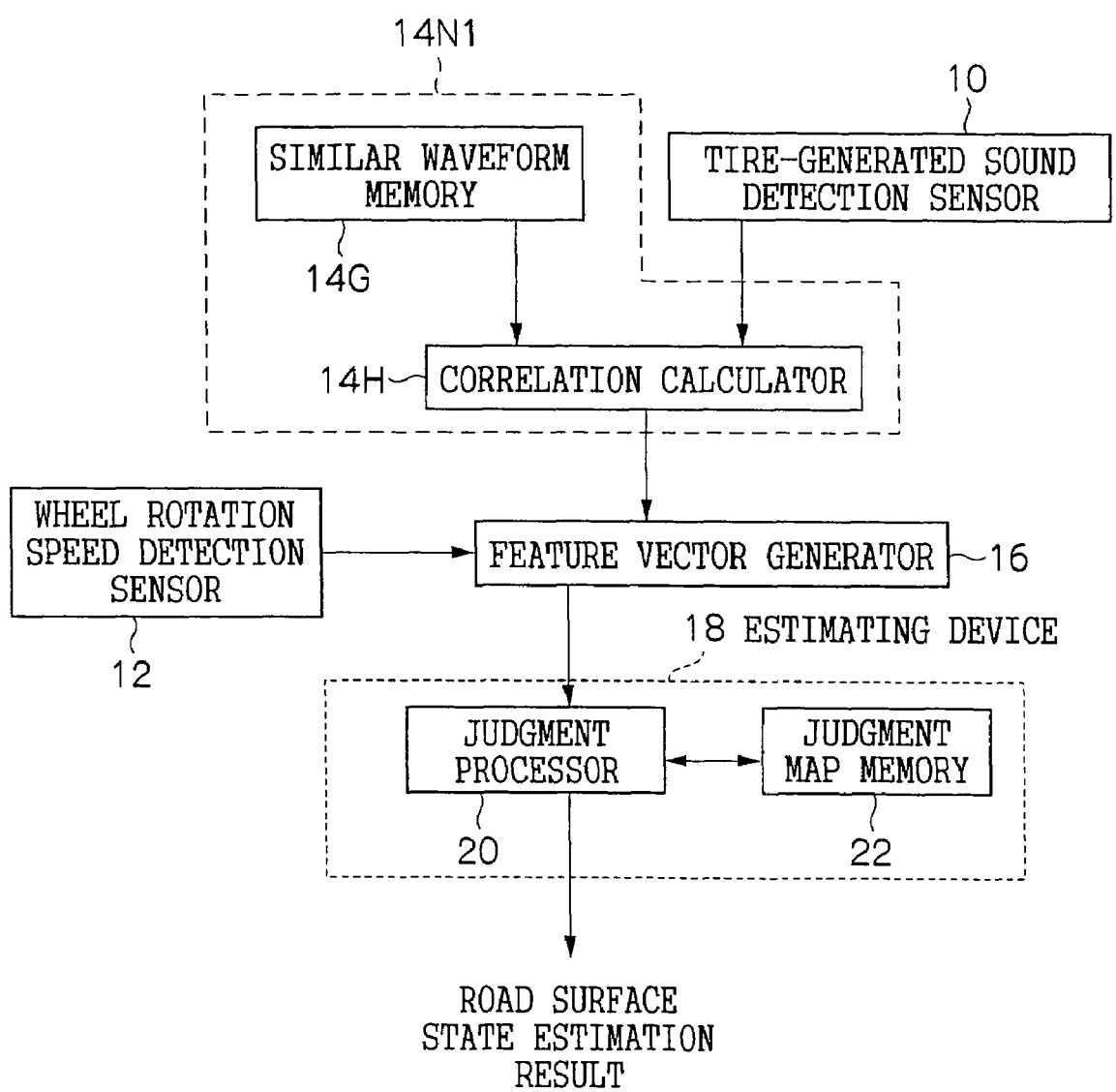
FIG. 21 is a block diagram of a road surface state estimating apparatus according to a first modification of the first embodiment.

As shown in FIG. 21, a preprocessor 14N1 according to the first modification is equipped with a similar waveform memory 14G for storing similar waveforms having certain correlation with respective tire-generated sound source waveforms and a correlation calculator 14H for detecting sound source waveforms from a tire-generated sound by calculating correlation between the tire-generated sound and the stored similar waveforms.

Figure 23A:
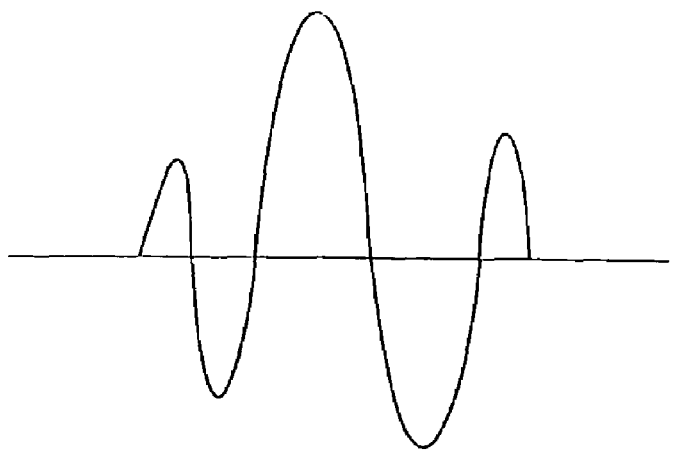
FIGS. 23A and 23B show fundamental waveforms that are stored in advance as corresponding to a dry road surface and a wet road surface, respectively, to enable calculation of correlation with a tire-generated sound.
Figure 23B:
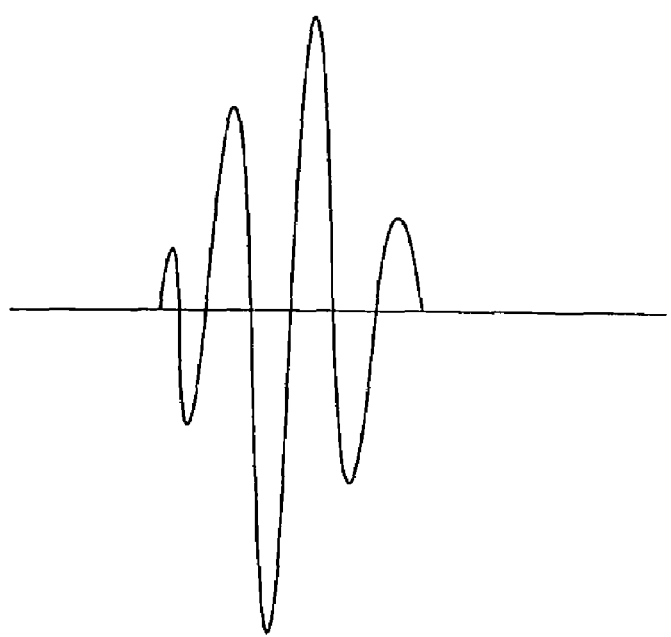

The similar waveform memory 14G stores similar waveforms having certain correlation with respective tire-generated sound source waveforms. More specifically, as shown in FIGS. 23A and 23B, to enable calculation of correlation with a tire-generated sound, fundamental waveforms that correspond to a plurality of road surfaces such as dry, wet, compacted-snow, and ice-plate road surfaces, respectively, and were obtained by causing a vehicle to run on those road surfaces are stored. FIGS. 23A and 23B show fundamental waveforms corresponding to a dry road surface and a wet road surface, respectively.

The correlation calculator 14H detects sound source waveforms from a tire-generated sound by calculating correlation between the tire-generated sound and the stored fundamental waveforms.

More specifically, the correlation calculator 14H calculates correlation between a tire-generated sound x(i) and the fundamental waveforms s(i) according to the following equation:

$$R_{XS}(i) = \begin{cases} \dfrac{1}{M+i}\sum_{j=1}^{M+i} x(i+j) \cdot s(j-i) : i = -1, -2, \ldots, -M+1 \\ \dfrac{1}{M}\sum_{j=1}^{M} x(i+j) \cdot s(j) : i = 0, 1, \ldots, N-M \\ \dfrac{1}{N-i}\sum_{j=1}^{N-i} x(i+j) \cdot s(j) : i = N-M+1, \ldots, N-1 \end{cases}$$

Figure 24A:
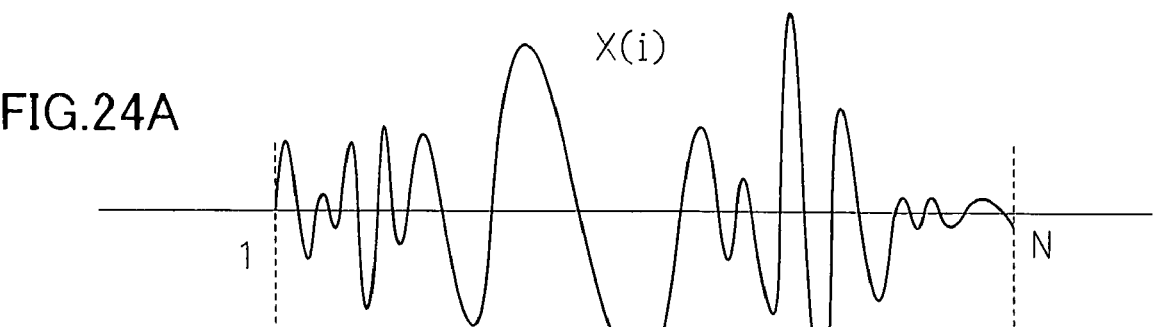
FIGS. 24A-24C illustrate correlation between a tire-generated sound and a fundamental waveform.
Figure 24B:
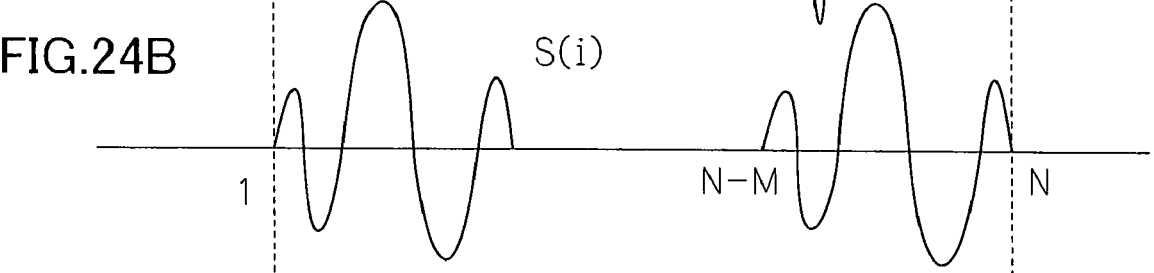
Figure 24C:
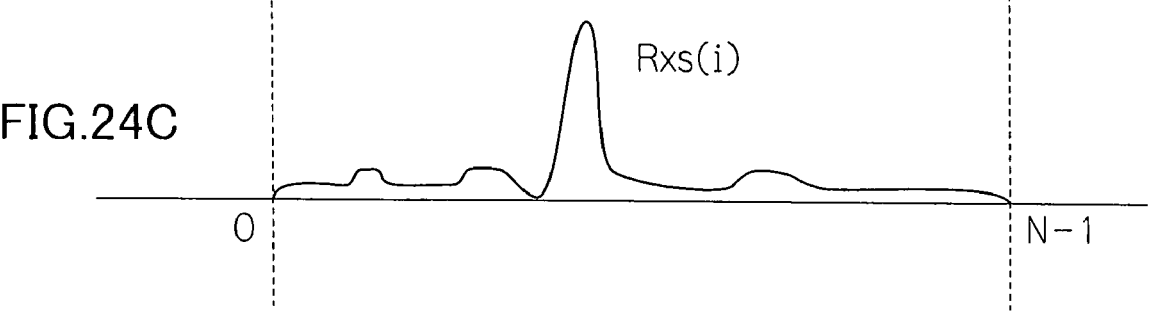

For example, correlation between a tire-generated sound x(i) in a certain period (see FIG. 24A) and the fundamental waveform s(i) of the dry road surface (see FIGS. 23A and 24B) is calculated as correlation values Rxs(i) (see FIG. 24C). As seen from FIGS. 24A-24C, large correlation values Rxs(i) are obtained for portions, in the period concerned, of the tire-generated sound x(i) where the tire-generated sound x(i) is similar to the fundamental waveform s(i).

Figure 22:
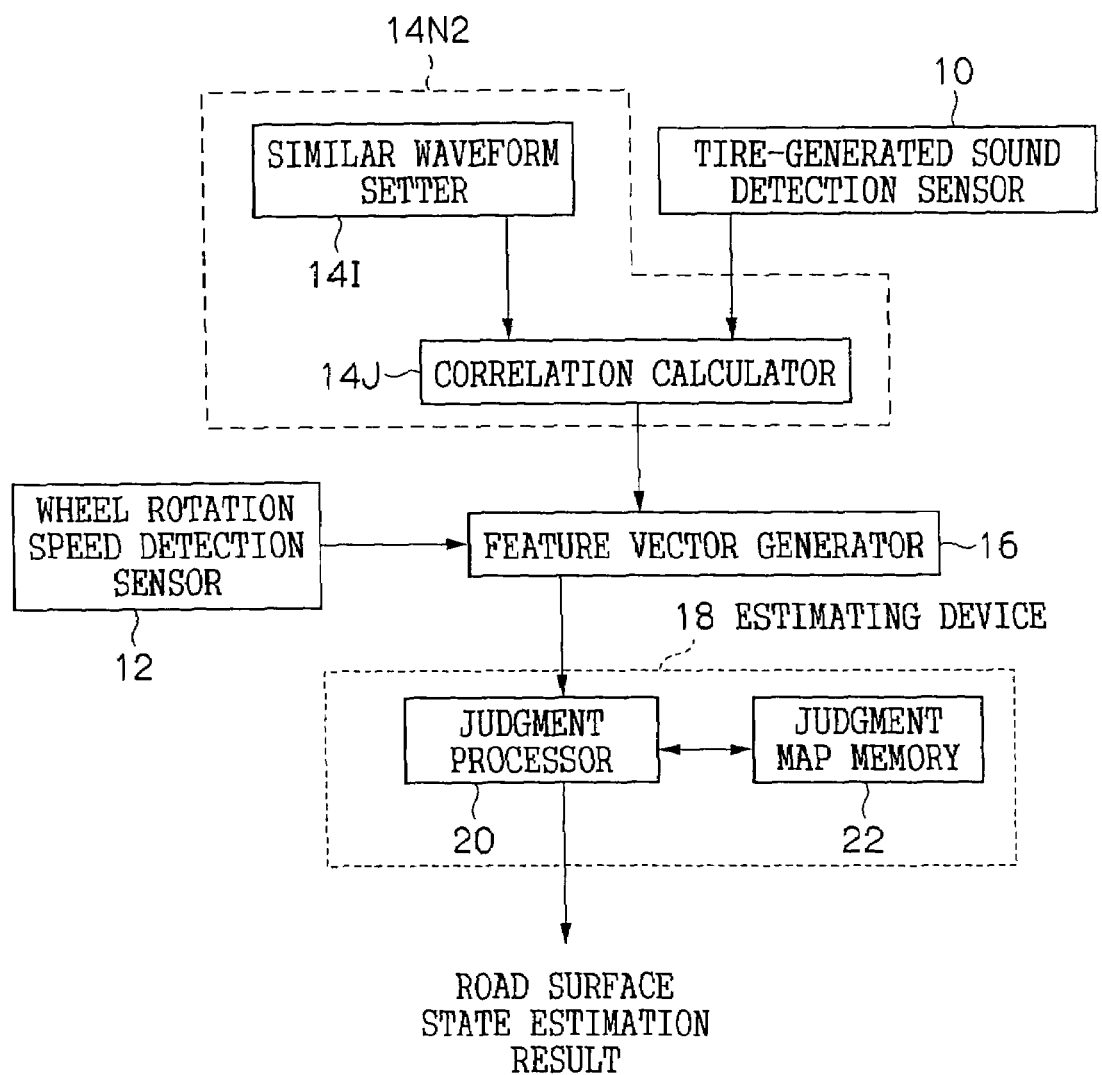
FIG. 22 is a block diagram of a road surface state estimating apparatus according to a second modification of the first embodiment.

Next, the second modification of the first embodiment will be described. As shown in FIG. 22, a preprocessor 14N2 according to the second modification is equipped with a similar waveform setter 14I for setting similar waveforms having certain correlation with respective tire-generated sound source waveforms and a correlation calculator 14J for detecting sound source waveforms from a tire-generated sound by calculating correlation between the tire-generated sound and the thus-set similar waveforms.

Figure 25:
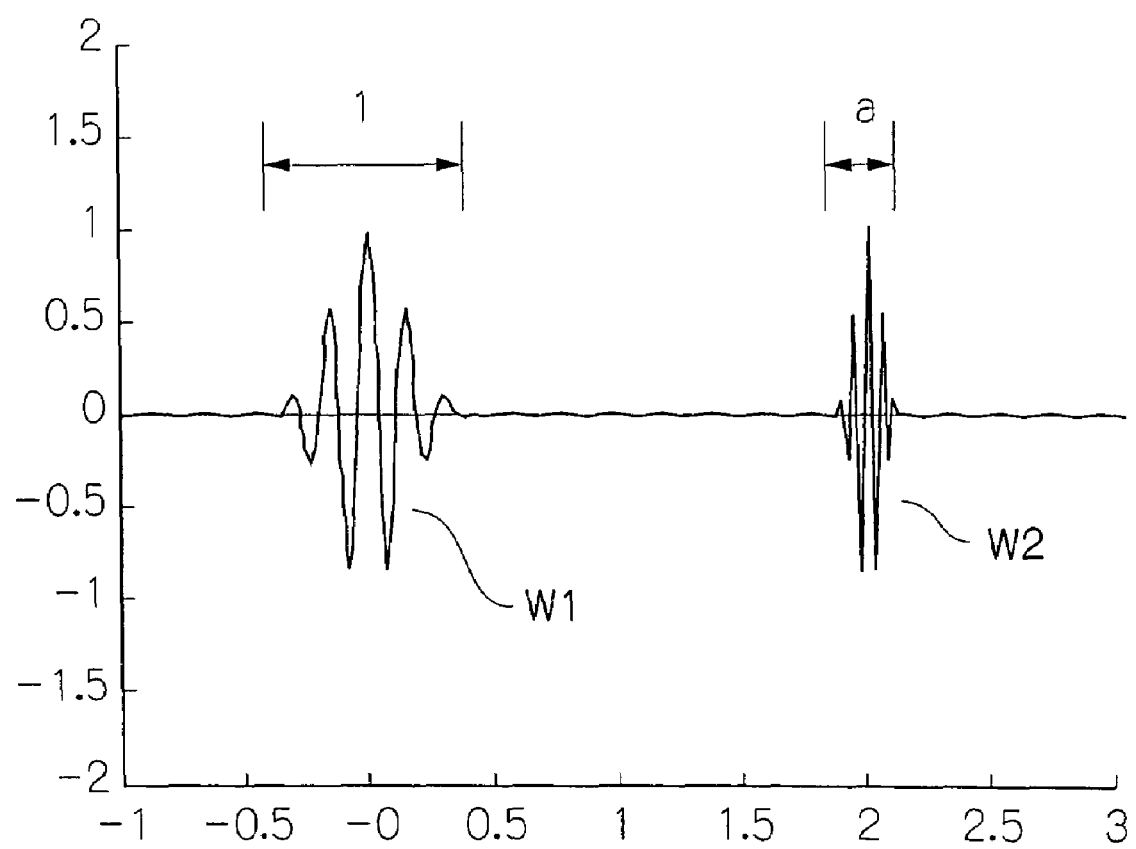
FIG. 25 illustrates how a fundamental waveform is set.

The similar waveform setter 14I sets fundamental waveforms by setting wavelengths using localized waveforms (original waveforms) that are similar to respective tire-generated sound source waveforms corresponding to respective road surface states. FIG. 25 shows an exemplary localized waveform according to the following equation:

$$s(t) = e^{-\frac{(t/a)^2}{8^2}} \cos(t)$$

The similar waveform setter 14I sets a parameter in the above equation so that each tire-generated sound source waveform can be detected most properly. That is, the parameter a is set so that a fundamental waveform becomes the same as or similar to a waveform corresponding to each road surface by causing a vehicle to run on it. For example, starting from a localized waveform W1 (a=1), the parameter a is made smaller than 1 so that a fundamental waveform that coincides with or is similar to a waveform corresponding to a road surface on which a vehicle ran, whereby a fundamental waveform W2 is set.

The correlation calculator 14J detects sound source waveforms from a tire-generated sound by calculating correlation between the tire-generated sound and the thus-set fundamental waveforms. The details of the correlation calculator 14J will not be described because it is the same as in the first modification.

In the second modification, fundamental waveforms corresponding to respective road surfaces are set by changing the parameter a of the above Equation. Therefore, the amount of storage information can be made smaller in the second modification than in the first modification in which fundamental waveforms themselves corresponding to respective road surfaces are stored.

Figure 7:
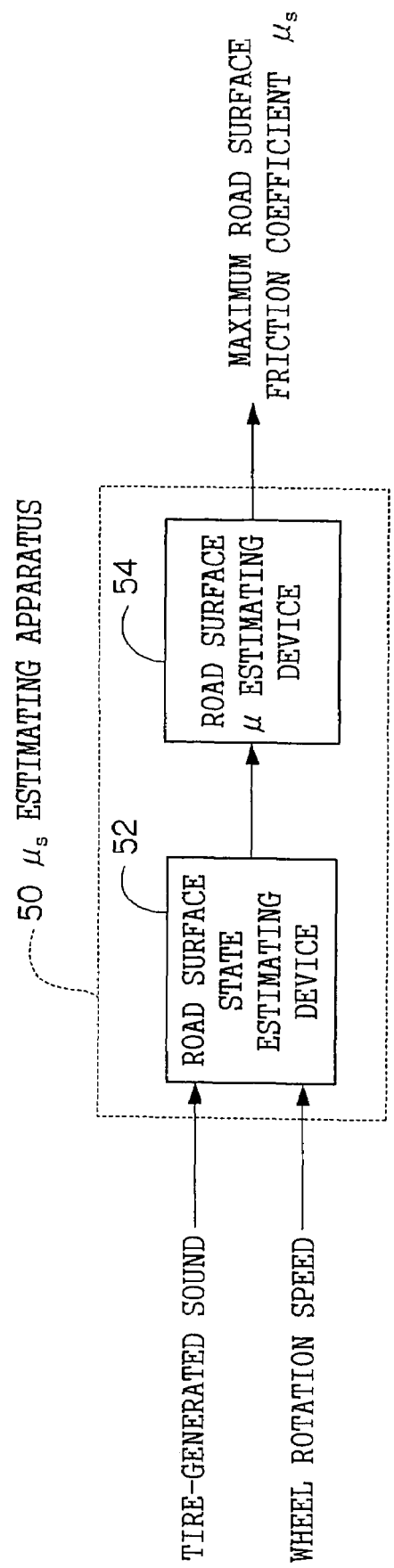
FIG. 7 is a block diagram of a road surface friction coefficient estimating apparatus according to a second embodiment of the invention.

Next, a second embodiment of the invention will be described. In this embodiment, a road surface state estimating device is provided in a road surface friction coefficient estimating apparatus (i.e., $\mu_s$ estimating apparatus) 50 for estimating a maximum road surface friction coefficient $\mu_s$, that is, a maximum coefficient of friction between a road surface and a wheel. As shown in FIG. 7, the $\mu_s$ estimating apparatus 50 is composed of a road surface state estimating device 52 that is the same in configuration as the road surface state estimating device 100 of the first embodiment and a road surface $\mu$ estimating device 54 for storing maximum road surface friction coefficients $\mu_s$ corresponding to respective road surface states. The second embodiment is different from the first embodiment in that the former has an additional function of estimating a maximum road surface friction coefficient $\mu_s$ on the basis of a road surface state.

The road surface $\mu$ estimating device 54 estimates a maximum road surface friction coefficient $\mu_s$ of a road surface on which the vehicle is running (i.e., a road surface from which a tire-generated sound is detected) on the basis of a road surface state that is estimated by the road surface state estimating device 52 and the maximum road surface friction coefficients $\mu_s$ that are stored in the road surface $\mu$ estimating device 54 itself so as to correspond to the respective road surface states.

"Research on Vehicular Tires," edited by The Yokohama Rubber Co., Ltd., Sankai-Do states that the maximum road surface friction coefficients $\mu_s$ depends on the road surface state, the running speed, the water film thickness, and the tire type.

On the basis of a road surface state that is estimated by the road surface state estimating device 52, the road surface $\mu$ estimating device 54 outputs a maximum road surface friction coefficients $\mu_s$ in such a manner that it is correlated with the road surface state.

Figure 8:
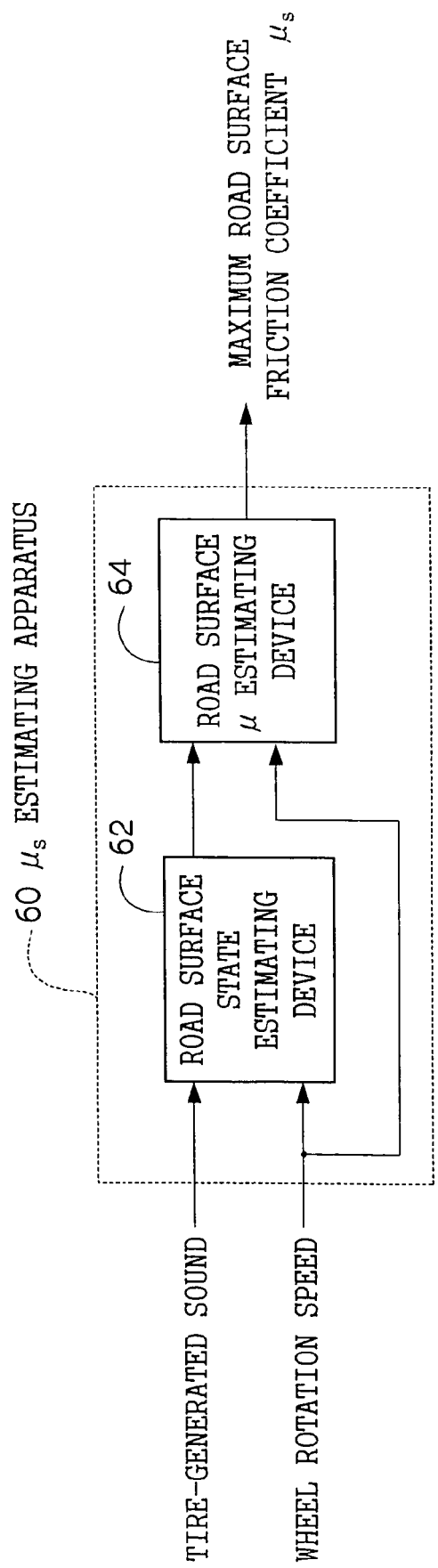
FIG. 8 is a block diagram of a road surface friction coefficient estimating apparatus according to a third embodiment of the invention.

Next, a third embodiment of the invention will be described. As shown in FIG. 8, this embodiment is approximately the same in configuration as the second embodiment (FIG. 7) and is different from the latter in that a wheel rotation speed is also input to the road surface $\mu$ estimating device 64.

A $\mu_s$ estimating apparatus 60 according to this embodiment is composed of a road surface state estimating device 62 that is the same in configuration as the road surface state estimating device 100 of the first embodiment and a road surface $\mu$ estimating device 64 for storing maximum road surface friction coefficients $\mu_2$ for respective sets of a road surface state and a wheel rotation speed.

The road surface $\mu$ estimating device 64 estimates and outputs a maximum road surface friction coefficient $\mu_s$ of a road surface on which the vehicle is running (i.e., a road surface from which a tire-generated sound is detected) on the basis of a wheel rotation speed, a road surface state that is estimated by the road surface state estimating device 62, and the maximum road surface friction coefficients $\mu_s$ that are stored in the road surface $\mu$ estimating device 64 itself so as to correspond to the respective sets of a road surface state and a wheel rotation speed.

This embodiment is different from the first embodiment in that this embodiment has an additional function of estimating a maximum road surface friction coefficient $\mu_s$ on the basis of a road surface state and a wheel rotation speed.

Next, a fourth embodiment of the invention will be described.

Figure 9:
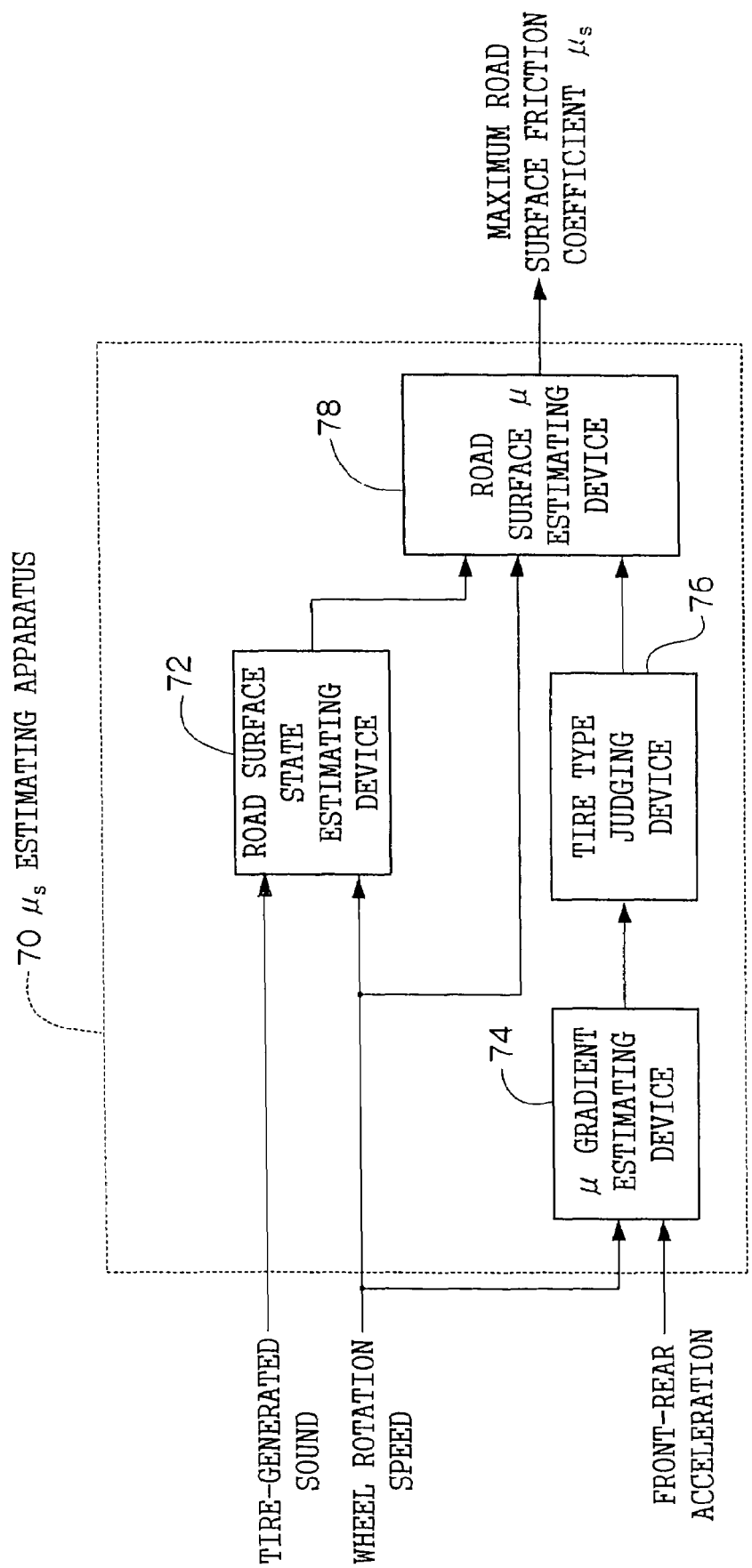
FIG. 9 is a block diagram of a road surface friction coefficient estimating apparatus according to a fourth embodiment of the invention.

As shown in FIG. 9, a $\mu_s$ estimating apparatus 70 according to this embodiment is composed of a road surface state estimating device 72 that is the same in configuration as the road surface state estimating device 100 of the first embodiment, a road surface $\mu$ estimating device 78, a $\mu$ gradient estimating device 74, and a tire type judging device 76.

The $\mu_s$ estimating apparatus 70 according to this embodiment, the road surface state estimating device 72 estimates a road surface state.

The $\mu$ gradient estimating device 74 estimates a $\mu$ gradient that is a gradient with respect to the slip speed of the coefficient of friction between the wheels and a road surface. That is, the $\mu$ gradient estimating device 74 estimates a $\mu$ gradient using a rotation speed difference between the front wheels and the rear wheels and front-rear acceleration by, for example, a method described in Japanese Patent Application No. 2002-40722.

The tire type judging device 76 judges a tire type on the basis of the $\mu$ gradient. More specifically, the tire type judging device 76 judges a tire type, that is, judges whether the tires are summer tires (including worn studless tires) or studless tires, using the $\mu$ gradient that is estimated by the $\mu$ gradient estimating device 74 by, for example, a method described in Japanese Patent Application No. 2002-40722.

The road surface $\mu$ estimating device 78 estimates a maximum road surface friction coefficient $\mu_s$ of a road surface on which the vehicle is running (i.e., a road surface from which a tire-generated sound is detected) on the basis of a wheel rotation speed, the road surface state, and the tire type. This embodiment is different from the first embodiment in that the this embodiment has an additional function of estimating a maximum road surface friction coefficient $\mu_s$ on the basis of a road surface state, a tire type, and a wheel rotation speed.

Next, a fifth embodiment of the invention will be described.

Figure 10:
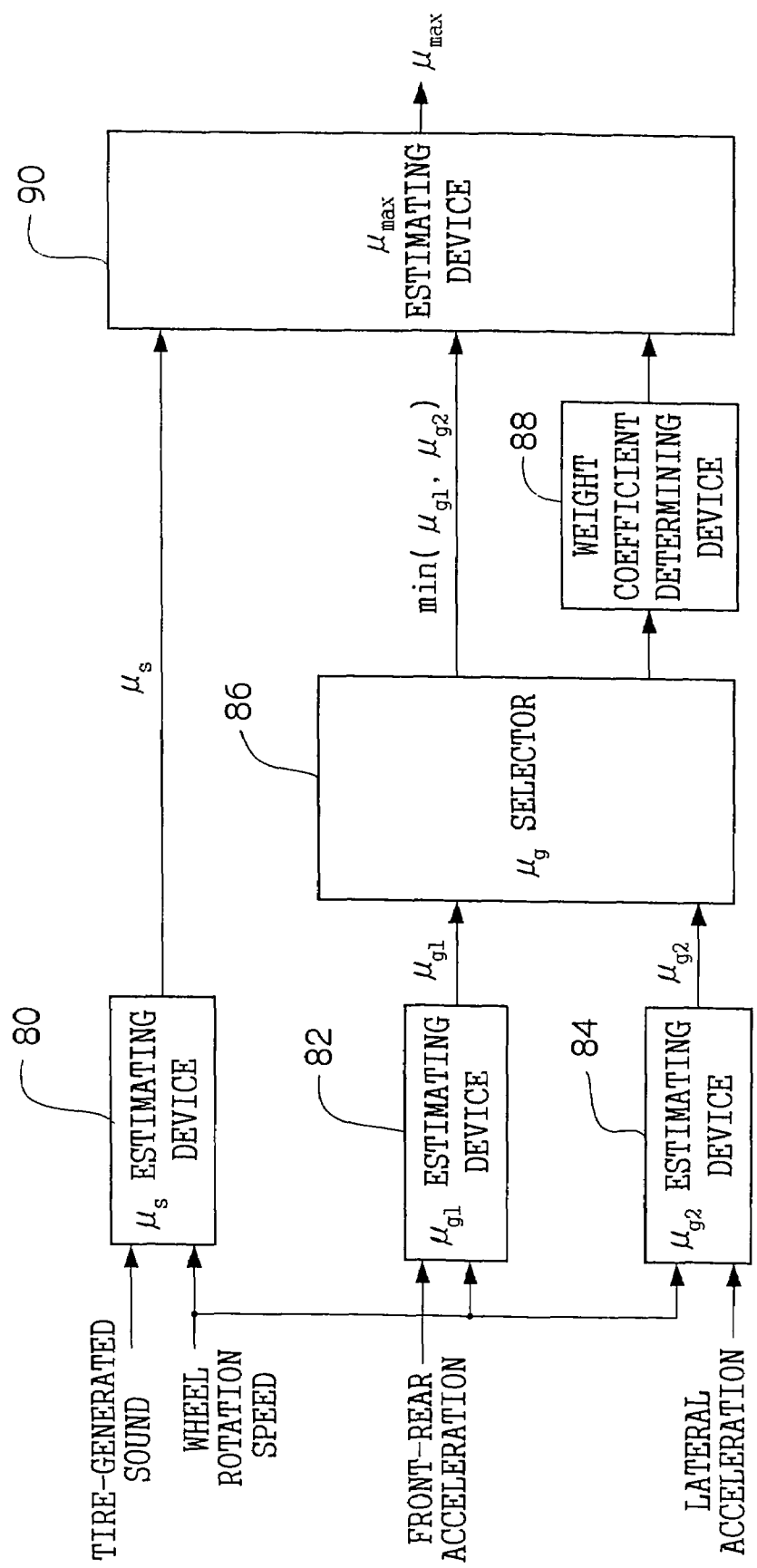
FIG. 10 is a block diagram of a road surface friction coefficient estimating apparatus according to a fifth embodiment of the invention.

As shown in FIG. 10, a $\mu_s$ estimating apparatus according to this embodiment is equipped with a $\mu_s$ estimating device 80 for estimating a maximum road surface friction coefficient $\mu_s$ for steady-state running, a $\mu_{g1}$ estimating device 82 for estimating a maximum road surface friction coefficient $\mu_{g1}$ for acceleration/deceleration running, a $\mu_{g2}$ estimating device 84 for estimating a maximum road surface friction coefficient $\mu_{g2}$ for turning, a $\mu_g$ selector 86 for selecting one of the maximum road surface friction coefficients $\mu_{g1}$ and $\mu_{g2}$, a weight coefficient determining device 88 for determining a weight coefficient K, and a $\mu_{max}$ estimating device 90 for estimating a total maximum road surface friction coefficient $\mu_{max}$.

A tire-generated sound and a wheel rotation speed (described above) are input to the $\mu_s$ estimating device 80. Front-rear acceleration (i.e., acceleration/deceleration) is input from a sensor (not shown) to the $\mu_{g1}$ estimating device 82. Lateral acceleration is input from a sensor (not shown) to the $\mu_{g2}$ estimating device 84.

The individual devices will be described below.

Any of the $\mu_s$ estimating apparatus 50, 60, and 70 of FIGS. 7, 8, and 9, can be employed as the $\mu_s$ estimating device 80.

The $\mu_{g1}$ estimating device 82 estimates a $\mu$ gradient on the basis of wheel rotation speeds and front-rear acceleration by, for example, a method described in Japanese Patent Application No. 2002-40722 and estimates a degree of grip Gr1 and a maximum road surface friction coefficient $\mu_{g1}$ for acceleration/deceleration running on the basis of the thus-estimated $\mu$ gradient. The estimated maximum road surface friction coefficient $\mu_{g1}$ is supplied to the $\mu_g$ selector 86.

The $\mu_{g2}$ estimating device 84 estimates a $\mu$ gradient on the basis of wheel rotation speeds by, for example, a method described in Japanese Patent Application No. 2002-40722 and estimates a degree of grip Gr2 and a maximum road surface friction coefficient $\mu_{g2}$ for turning on the basis of the thus-estimated μ gradient. The estimated maximum road surface friction coefficient $\mu_{g2}$ is supplied to the $\mu_g$ selector 86.

The $\mu_g$ selector 86 selects a larger one of the maximum road surface friction coefficient $\mu_{g1}$ estimated by the $\mu_{g1}$ estimating device 82 and the maximum road surface friction coefficient $\mu_{g2}$ estimated by the $\mu_{g2}$ estimating device 84, and supplies the selected maximum road surface friction coefficient to the $\mu_{max}$ estimating device 90 as a maximum road surface friction coefficient $\mu_g$.

Alternatively, the $\mu_g$ selector 86 may select a maximum road surface friction coefficient corresponding to a smaller one of the degrees of grip Gr1 and Gr2. As a further alternative, the $\mu_g$ selector 86 may operate in such a manner as to judge whether the vehicle is turning on the basis of a steering angle that is detected by a steering angle sensor and to select the maximum road surface friction coefficient $\mu_{g2}$ if the vehicle is turning and select the maximum road surface friction coefficient $\mu_{g1}$ if the vehicle is not turning.

The weight coefficient determining device 88 determines a weight coefficient K on the basis of the degree of grip Gr corresponding to the maximum road surface friction coefficient $\mu_g$ selected by the $\mu_g$ selector 86. More specifically, the weight coefficient K is set closer to 1 as the degree of grip Gr comes closer to 1 and the weight coefficient K is set closer to 0 as the degree of grip Gr comes closer to 0. While the vehicle is running in a steady state, the degree of grip Gr is large (i.e., close to 1) and hence the weight coefficient K is set close to 1 to increase the reliability of $\mu_s$ rather than $\mu_g$.

While the vehicle is accelerating (or decelerating) or turning, the degree of grip Gr is small and hence the weight coefficient K is set close to 0 to increase the reliability of $\mu_g$ rather than $\mu_s$.

The weight coefficient determining device 88 may set the weight coefficient K close to 0 while the control of a vehicle stability control system such as a traction control system (TRC) or an antilock brake system (ABS) is effective.

The $\mu_{max}$ estimating device 90 estimates a total maximum road surface friction coefficient $\mu_{max}$ taking into consideration steady-state running, acceleration/deceleration running, and turning by, for example, a method described in Japanese Patent Application No. 2002-40722.

As described above, a total maximum road surface friction coefficient $\mu_{max}$ can be estimated on the basis of a maximum road surface friction coefficient $\mu_s$ for steady-state running and a maximum road surface friction coefficient $\mu_s$ for acceleration/deceleration running or turning.

Since the weight coefficient K is determined on the basis of a degree of grip Gr for acceleration/deceleration running or turning, states of steady-state running, acceleration/deceleration running, and turning can be taken into consideration and hence a maximum road surface friction coefficient $\mu_{max}$ can be estimated accurately.

Next, a sixth embodiment of the invention will be described.

Figure 11:
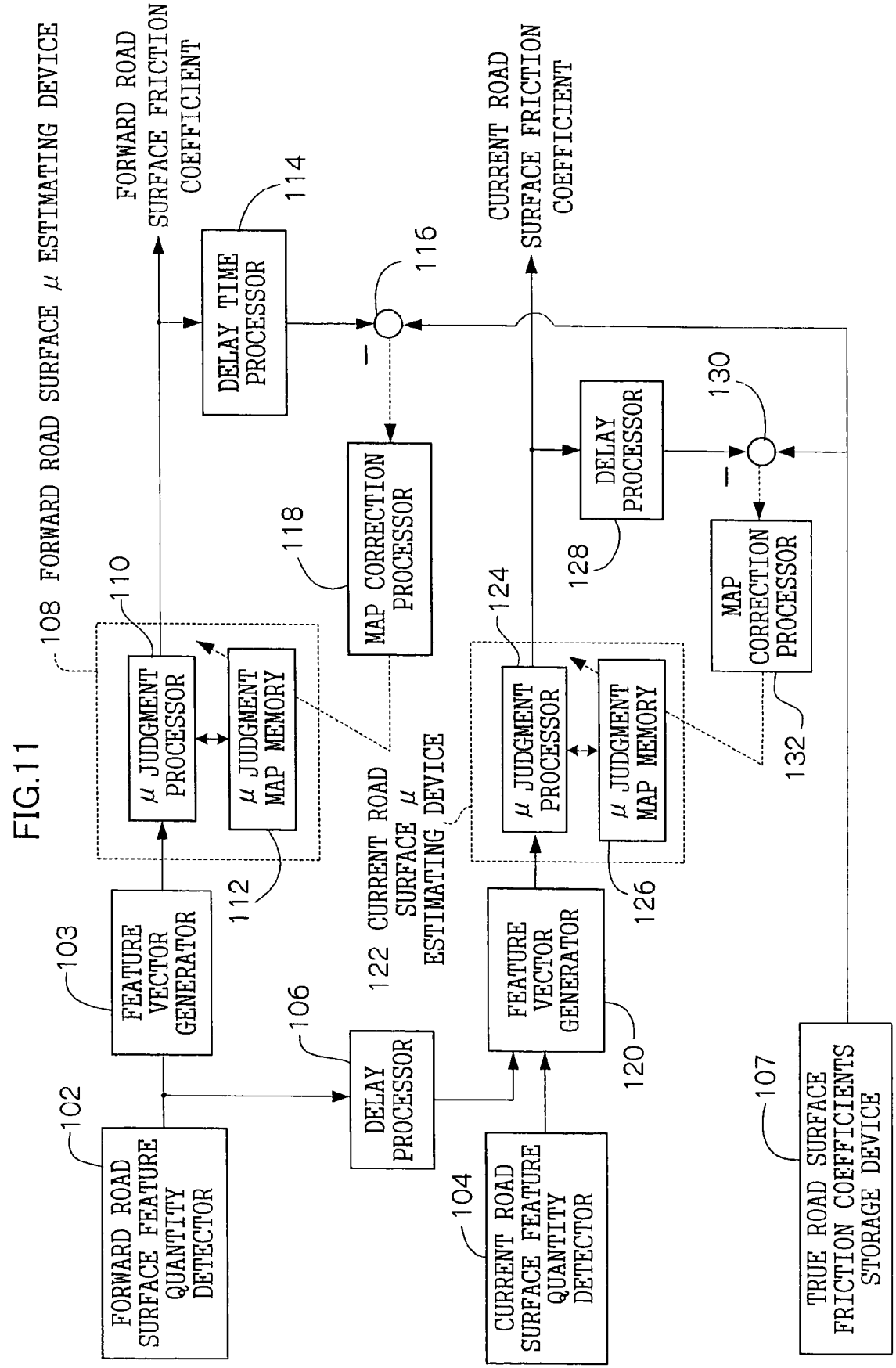
FIG. 11 is a block diagram of a road surface friction coefficient estimating apparatus according to a sixth embodiment of the invention.

As shown in FIG. 11, a road surface friction coefficient estimating apparatus according to this embodiment is equipped with a forward road surface feature quantity detector 102, a current road surface feature quantity detector 104, and a true road surface friction coefficients storage device 107.

The forward road surface feature quantity detector 102, which is a device for detecting forward road surface feature quantities, may be any of a device that detects power spectrum distributions of horizontal and vertical polarization images of an image obtained by shooting a forward road surface with a camera (JP-A-8-327530), a device that detects averages and variance values of hue, saturation, and lightness values of an image obtained by shooting a forward road surface with a camera (JP-A-2002-140789), and other devices. Alternatively, a forward road surface sensor in a infrastructure or a forward vehicle may be used as the forward road surface feature quantity detector 102 and a road surface μ value or the like measured by that device may be detected as a forward road surface feature quantity.

The current road surface feature quantity detector 104, which is a device for current road surface feature quantities, may be any of devices that detect a frequency spectrum of load noise (JP-A-6-138018 and JP-A-7-156782), a device that detects a road surface ultrasonic wave reflection characteristic (JP-A-9-5449), a device that detects road surface light reflection characteristic (JP-A-7-49223), the devices of the first to fifth embodiments, and other devices.

Road surface friction coefficients that are measured from vehicle state quantities and are road surface friction coefficients in ranges of vehicle behavior close to the limits or more reliable road surface friction coefficients of current and forward road surfaces obtained by statistical processing over a relatively long period are stored in the true road surface friction coefficients storage device 107. The details of the true road surface friction coefficients storage device 107 are the same as described in Japanese Patent Application No. 2002-40722.

A feature vector generator 104 is connected to the forward road surface feature quantity detector 103. A forward road surface μ estimating device 108 having a μ judgment processor 110 and a μ judgment map memory 112 is connected to the feature vector generator 103. A delay processor 114 is connected to the output side of the μ judgment processor 110.

A feature vector generator 120 is connected to the current road surface feature quantity detector 104. A current road surface μ estimating device 122 having a μ judgment processor 124 and a μ judgment map memory 126 is connected to the feature vector generator 120. A delay processor 128 is connected to the output side of the μ judgment processor 124. A delay processor 106 for delaying forward road surface feature quantities obtained by the forward road surface feature quantity detector 102 and inputting the delayed feature quantities to the feature vector generator 120 is connected to the feature vector generator 120.

A subtracter 116 is connected to the delay processor 114 and the true road surface friction coefficients storage device 107, and a subtracter 130 is connected to the delay processor 128 and the true road surface friction coefficients storage device 107. A map correction processor 118 for correcting the values stored in the μ judgment map memory 112 is connected to the subtracter 116, and a map correction processor 132 for correcting the values stored in the μ judgment map memory 126 is connected to the subtracter 130.

Next, the operation of this embodiment will be described. The apparatus according to this embodiment is an apparatus which estimates each of forward road surface μ and current road surface μ by collating a road surface state with road surface μ's in a μ judgment map. A true road surface μ value measured from past vehicle behaviors etc. is compared with a corresponding forward road surface μ value or current road surface μ value, and a μ judgment map is learned so that its value comes close to the true road surface μ value. The operation will be described below in detail.

The forward road surface feature quantity detector 102 detects forward road surface feature quantities. The feature vector generator 103 generates a single vector using the detected forward road surface feature quantities and inputs the generated vector to the forward road surface μ estimating device 108.

Receiving the forward road surface feature quantities, the forward road surface μ estimating device 108 performs discrimination processing for outputting a corresponding forward road surface friction state (i.e., a physical quantity representing a friction state), for example, a friction coefficient. The nearest neighbor rule (i.e., NN method), the Bayes decision rule, a linear discriminant function, a neural network, or the like may be used for the discrimination processing. Where the nearest neighbor rule (NN method) is used for the discrimination processing, forward road surface data of respective road surface states are classified by using corresponding road surface friction coefficients and stored in advance in the μ judgment map memory 112 as prototypes. The μ judgment processor 110 compares forward road surface data that is input at the time of judgment with the prototypes stored in the μ judgment map memory 112, and outputs, as a forward road surface friction coefficient judgment result, a road surface friction coefficient class to which a nearest prototype belongs. In many cases, the Euclid distance is employed. Where a neural network is used as a discrimination technique, weight coefficients of the neural network serve as data of the μ judgment map memory 112.

The current road surface feature quantity detector 104 detects current road surface feature quantities. The delay processor 106 performs processing for synchronizing the forward road surface feature quantities with the current ones. The current road surface feature quantity detector 104 controls the delay time to establish synchronization all the time by calculating correlation between forward road surface data and current road surface data using wheel rotation speed information. The forward road surface feature quantities are stored in a memory, and delayed feature quantities are supplied from the memory to the feature vector generator 120.

The feature vector generator 120 generates a single vector from the delayed forward road surface feature quantities and the current road surface feature quantities, and inputs the generated vector to the current road surface μ estimating device 122.

Receiving the feature vector consisting of the delayed forward road surface feature quantities and the current road surface feature quantities, the current road surface μ estimating device 122 performs discrimination processing for outputting a corresponding current road surface friction state (i.e., a physical quantity representing a friction state), for example, a friction coefficient. The discrimination method is the same as employed by the forward road surface μ estimating device 108.

Incidentally, as mentioned above, reliable road surface friction coefficients of current and forward road surfaces are stored in the true road surface friction coefficient storage device 107.

The delay processors 114 and 128 output a forward road surface friction coefficient or a current road surface friction coefficient corresponding to a true road surface friction coefficient. Forward road surface friction coefficients or current road surface friction coefficients are stored in a memory in advance, and a forward road surface friction coefficient or a current road surface friction coefficient corresponding to a true road surface friction coefficient is output from the memory.

The map correction processor 118 increases or decreases the prototype friction coefficient stored in the μ judgment map memory 112 in accordance with the difference between the true road surface friction coefficient and the delayed forward road surface friction coefficient, and thereby learns a μ judgment map in the μ judgment map memory 112 so that the prototype friction coefficient comes close to the true road surface friction coefficient. The map correction processor 132 performs similar processing and learns a μ judgment map in the μ judgment map memory 126.

Two specific calculation methods of the map correction processing of the map correction processors 118 and 132 will be described below.

SPECIFIC EXAMPLE 1

The map correction processor 118 stores the following typical feature vectors of forward road surface feature quantities in the μ judgment map memory 112 in advance:

$$x_1 = (x_{11}, x_{12}, \ldots x_{1d})$$

$$x_2 = (x_{21}, x_{22}, \ldots x_{2d})$$

$$\ldots$$

$$x_n = (x_{n1}, x_{n2}, \ldots x_{nd})$$

The components $x_{n1}$, $x_{n2}$, ... $x_{nd}$, etc. are forward road surface feature quantities.

Further, the correction processor 118 stores the following forward road surface friction coefficients μ that correspond to the above respective feature vectors one to one in the μ judgment map memory 112 in advance:

$$x_1 \to \mu_1$$

$$x_2 \to \mu_2$$

$$\ldots$$

$$x_n \to \mu_n$$

Now assume that the forward road surface feature vector at the present time is $x_a$. First, the μ judgment processor 110 calculates distances in the d-dimensional feature space between the feature vector $x_a$ and the feature vectors $x_1$, $x_2$, ... $x_n$ that are stored in the μ judgment map 112 and selects a map feature vector having a shortest distance.

Assume that forward road surface friction coefficients μ corresponding to respective map feature vectors are set in the following manner:

$x_1 \to \mu_1 = 0.8$ (corresponds to a dry asphalt road surface)

$x_2 \to \mu_2 = 0.6$ (corresponds to a wet asphalt road surface)

$x_3 \to \mu_3 = 0.2$ (corresponds to a compacted-snow road surface)

$x_4 = \mu_4 = 0.1$ (corresponds to an ice-plate road surface)

If a feature vector nearest to the feature vector $x_a$ is $x_1$, $\mu_1 = 0.8$ that is stored at an address that is indicated by a pointer of $x_1$ is output as a forward road surface friction coefficient at the present time.

The friction coefficient $\mu_s$ thus estimated is stored temporarily and subjected to delay processing so as to be compared with past, true road surface friction coefficient $\mu_{ri}$. Comparison with a corresponding true road surface friction coefficient $\mu_{ri}$ is made according to the following equation and an error is thereby obtained.

Assume that estimated friction coefficients stored temporarily are $\mu_{s1}$, $\mu_{s2}$, $\mu_{s1}$, ..., $\mu_{en}$ in time-series order.

The equation is:

$$e_i = \mu_{ri} \mu_{si}$$

where $\mu_{ri}$ is the past, true road surface friction coefficient and $\mu_{si}$ is the estimated friction coefficient at the time point concerned.

If $\mu_{ri}$=0.9 and $\mu_{si}$=0.8, we obtain $e_i$=0.1.

Therefore, the map correction processor 118 updates the μ value corresponding to the dry asphalt road surface according to the following equation:

$$\mu_{1new} = \mu_1 + e_i$$
$$= 0.8 + 0.1$$

That is, the value $\mu_1$ corresponding to $x_1$ is corrected to 0.9.

The map correction processor 132 performs similar processing for estimation of a current road surface friction coefficient.

SPECIFIC EXAMPLE 2

An example in which a map is corrected by the back propagation method using a neural network will be described below.

Figure 12:
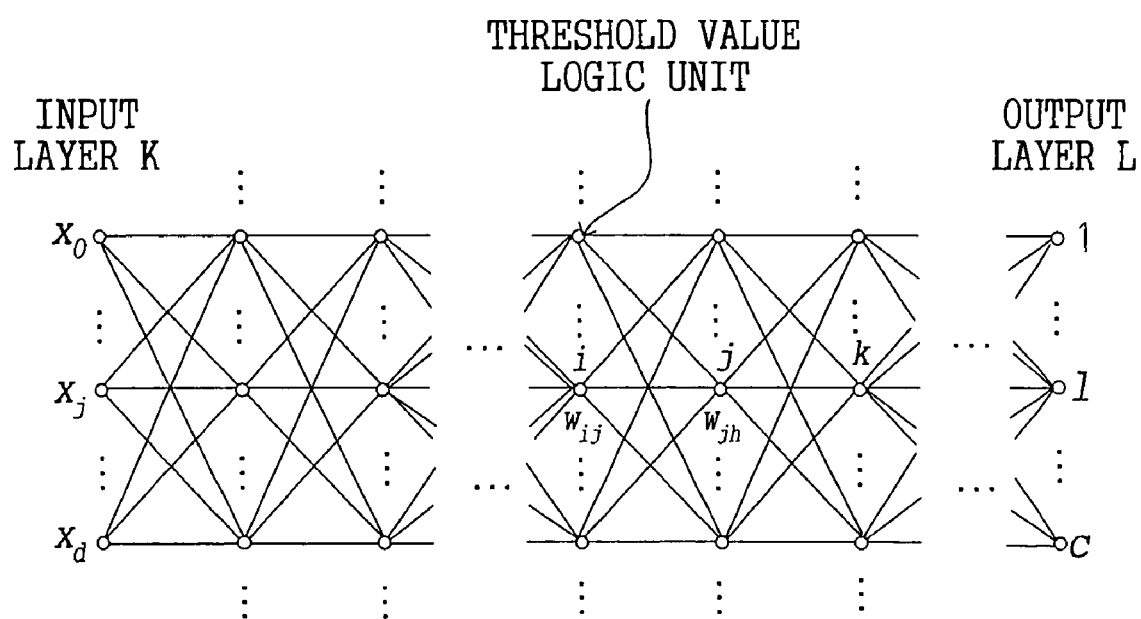
FIG. 12 is a conceptual diagram showing the configuration of each µ judgment processor that is formed by a neural network.

Each of the μ judgment processors 110 and 124 is formed by a neural network shown in FIG. 12.

Inputs $x_0, \ldots, x_j, \ldots, x_d$ to an input layer K are components of a feature vector, and outputs $\mu_1, \ldots, \mu_1, \ldots, \mu_c$ from an output layer L are components of a vector that indicates a road surface friction coefficient value corresponding to the input feature vector.

In each of the μ judgment processors 110 and 124, feature vectors of typical road surfaces $$x_1 = (x_{11}, x_{12}, \ldots, x_{1d})$$

$$x_2 = (x_{21}, x_{22}, \ldots, x_{2d})$$

$$\ldots$$

$$x_n = (x_{n1}, x_{n2}, \ldots, x_{nd})$$

and road surface friction coefficients $\mu_1, \mu_2, \ldots, \mu_n$ corresponding to the above feature vectors one to one are employed as leaning data and teacher data, respectively. The neural network is caused to learn so as to output the teacher data $\mu_1, \mu_2, \ldots, \mu_n$ in response to the learning data $x_1, x_2, \ldots, x_n$, respectively. Learned weight coefficients of the neural network are stored in each of the μ judgment map memories 112 and 126. A vector that is output from the output layer L and indicates a road surface friction coefficient value will be described below.

For example, road surface friction coefficient vectors $M=(\mu_1, \ldots, \mu_1, \ldots, \mu_c)$ that are output from the output layer L are correlated with friction coefficient values $\mu_s$ in the following manner:

$$M=(1, \ldots 0, \ldots, 0) \to \mu_s=0.1$$

$$M=(0, 1, \ldots 0, \ldots, 0) \to \mu_s=0.2$$

$$\ldots$$

$$M=(0, 0 \ldots, 0, \ldots, 1) \to \mu_s=1.0$$

That is, where the teacher data $\mu_1$ corresponding to the feature vector $x_1=(x_{11}, x_{12}, \ldots, x_{1d})$ is 0.1, the neural network is caused to learn so as to output $M=(1, \ldots 0, \ldots, 0)$ indicating $\mu_s$=0.1 in response to $x_1$.

To increase the accuracy of a friction coefficient estimation value that is obtained by using a pre-stored μ judgment map, it is necessary to correct the μ judgment map so that it reflects, more properly, the status of the road surface on which the vehicle is running.

To this end, feature vectors that are acquired during running are stored in advance and the μ judgment map is corrected by causing it to learn again using those feature vectors as learning data and corresponding true road surface friction coefficients as teacher data.

Re-learning is performed when the error between the estimated friction coefficient and the true road surface friction coefficient has exceeded a certain allowable range.

The correction of the μ judgment map in such a case can be performed by correcting the weight coefficients of the neural network by the back propagation method. (The back propagation method is described in detail on pp. 42-48 of "Pattern Recognition," Ohm-Sha Ltd.)

As described above, in this embodiment, μ judgment maps to be used for μ judgment of forward road surface μ and current road surface μ are learned by using past, true μ values that were obtained from vehicle behaviors etc. Therefore, correct forward road surface μ and current road surface μ can be obtained with any road surface state.

Further, in this embodiment, a friction coefficient of a current road surface (i.e., a road surface on which the vehicle is running) is estimated by using feature quantities indicating a forward road surface state as well as feature quantities indicating a current road surface state. Therefore, a road surface friction coefficient can be estimated on the basis of a larger amount of information and hence a road surface friction coefficient of a current road surface can be estimated accurately.

Furthermore, in this embodiment, a stored road surface friction coefficient is corrected on the basis of a predetermined road surface friction coefficient of a current road surface and an estimated road surface friction coefficient. Therefore, stored road surface friction coefficients can be corrected to proper values, which makes it possible to estimate a road surface friction coefficient accurately.

Other various embodiments will be hereinafter described. The following embodiments include common components, and they will be given the same reference symbols and detailed descriptions of their configurations and operations may be omitted.

First, a seventh embodiment of the invention will be described.

Figure 26:
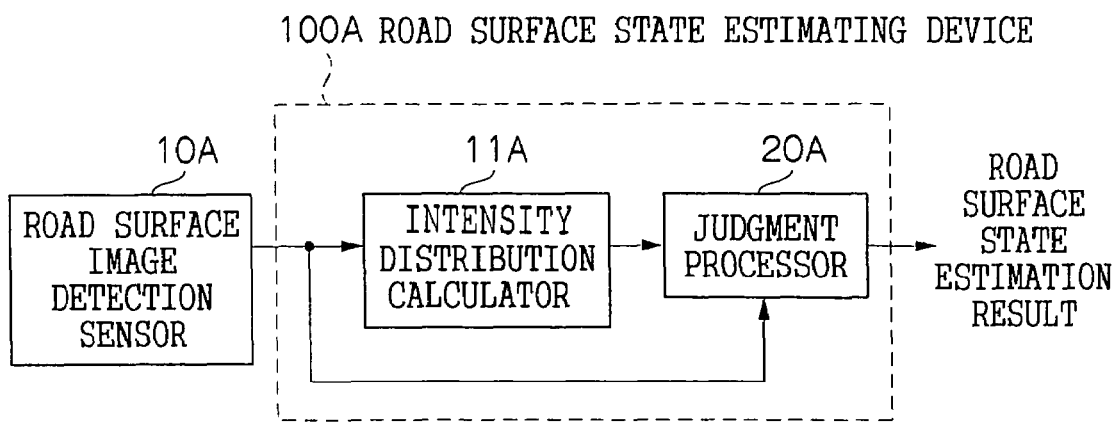
FIG. 26 is a block diagram of a road surface state estimating apparatus according to a seventh embodiment of the invention.

As shown in FIG. 26, a road surface state estimating apparatus as a road surface state physical quantity calculating apparatus according to this embodiment is equipped with a road surface image detection sensor 10A for detecting a forward road surface image as a detector for detecting at least one of saturation information, luminance information, hue information, and intensity information of a forward road surface on which the vehicle will run and a road surface state estimating device 100A for calculating a road surface state physical quantity on the basis of the forward road surface image detected by the sensor 10A and a parameter to be used for calculation of a road surface state physical quantity indicating a road surface state and estimating a forward road surface state on the basis of the calculated road surface state physical quantity.

As described above, in the present embodiment, at least one of saturation information, luminance information, hue information, and intensity information is detected. However, the embodiments that use the intensity information as an example will be described. However, the present invention is not limited to such a case.

The road surface image detection sensor 10A may be a CCD camera that divides a forward road surface area into a plurality of regions and detects intensity information of each of the plurality of regions.

As described later, the road surface state estimating device 100A is equipped with a intensity distribution calculator 11A and a judgment processor 20A. The intensity distribution calculator 11A corrects a threshold value k as a parameter and classifies intensity data of individual pixels of image data of a forward road surface image detected by the road surface image detection sensor 10A into two classes, that is, a high-intensity class C1 and a low-intensity class C2, using the corrected threshold value k. The judgment processor 20A counts the numbers of intensity data (i.e., the numbers of pixels; correspond to road surface state physical quantities) belonging to the respective classes of the classification by the intensity distribution calculator 11A, and judges that the road surface is in a first road surface state (i.e., compacted snow or ice plate) if more intensity data are classified into the high-intensity class C1 and judges that the road surface is in a second road surface state (i.e., dry or wet) if more intensity data are classified into the low-intensity class C2.

Next, the operation of this embodiment will be described.

First, one calculation technique of the intensity distribution calculator 11A will be described (refer to Otsu, Kurita, and Sekita: "Pattern Recognition," Asakura Publishing Co., Ltd.)

A normalized histogram of data that are detected by the road surface image detection sensor 10A is represented by $$P_i = \frac{n_i}{N} \quad (1 \cdot 1)$$

where $n_i$ is the number of data of level i in a range of 1 to L (maximum intensity level) and N is the total number of data. This histogram can be regarded as a probability distribution of intensity. An average and variance of all the intensity levels are given by $$\mu_T = \sum_{i=1}^{L} i p_i \quad (1 \cdot 2)$$

$$\sigma_T^2 = \sum_{i=1}^{L} (i - \mu_T)^2 p_i \quad (1 \cdot 3)$$

Level k in the range of 0 to L is employed as a threshold value, and data in an interval S1=[1, . . . , k] in which the intensity level is lower than or equal to k are classified into class C1 and data in an interval S2=[k+1, . . . , L] in which the intensity level is higher than k are classified into class C2. Two accumulation quantities $$\omega(k) = \sum_{i=1}^{k} p_i \quad (\omega(L) = 1) \quad (1 \cdot 4)$$

$$\mu(k) = \sum_{i=1}^{k} i p_i \quad (\mu(L) = \mu_T) \quad (1 \cdot 5)$$

are defined for the normalized histogram.

Using the former accumulation quantity, probabilities of occurrence of the respective classes with the threshold value set at level k are given by $$\omega_1 = P_r(C_1) = \sum_{i \in S_1} p_i = \omega(k) \quad (1 \cdot 6)$$

$$\omega_2 = P_r(C_2) = \sum_{i \in S_2} p_i = 1 - \omega(k) \quad (1 \cdot 7)$$

Average levels of the respective classes are given by $$\mu_1 = \sum_{i \in S_1} i P_r(i \mid C_1) = \sum_{i \in S_1} \frac{i p_i}{\omega_1} = \frac{\mu(k)}{\omega(k)} \quad (1 \cdot 8)$$

$$\mu_2 = \sum_{i \in S_2} i P_r(i \mid C_2) = \sum_{i \in S_2} \frac{i p_i}{\omega_2} = \frac{\mu_T - \mu(k)}{1 - \omega(k)} \quad (1 \cdot 9)$$

When a histogram is divided into two classes by using a threshold value k, the threshold value k is expected to be good if the degree of separation of the classes is high. To evaluate how good the threshold value k, judgment parameters $$\lambda = \frac{\sigma_B^2}{\sigma_W^2}, \kappa = \frac{\sigma_T^2}{\sigma_W^2}, \eta = \frac{\sigma_B^2}{\sigma_T^2} \quad (1 \cdot 10)$$

are defined, where $$\sigma_W^2 = \omega_1 \sigma_1^2 + \omega_2 \sigma_2^2 \quad (1.1)$$

$$\sigma_B^2 = \omega_1(\nu_1 - \nu_T)^2 + \omega_2(\nu_2 - \nu_T)^2 = \omega_1 \omega_2 (\nu_1 - \nu_2)^2 \quad (1.12)$$

are intraclass variance and interclass variance. A fundamental relationship $$\sigma_W^2 + \sigma_B^2 = \sigma_T^2 \quad (1.13)$$

always holds among the intraclass variance, the interclass variance, and the total variance independently of the threshold value k.

Both of $\sigma_W^2$ and $\sigma_B^2$ are a function of k. Whereas $\sigma_W^2$ requires up to second-order statistical quantities, $\sigma_B^2$ include only first-order statistical quantities. That is, $\eta$ is the simplest evaluation parameter for k. Therefore, to search for a threshold value that gives the best separation for the two classes C1 and C2, it is most efficient to employ $\eta$ as a parameter to be used for evaluating how good the threshold value k is. This is equivalent to employing k that maximizes $\sigma_B^2$ as the best threshold value k. Since $$\sigma_B^2(k^*) = \max_{1 \leq k \leq L} \sigma_B^2(k) \qquad (1 \cdot 14)$$

the best k (k*) can be searched for by incrementing k according to the following equations:

$$\sigma_B^2(k) = \frac{[\mu_T \omega(k) - \mu(k)]^2}{\omega(k)[1 - \omega(k)]} \qquad (1 \cdot 15)$$

$$\omega(k) = \omega(k-1) + p_k \qquad (1.16)$$

$$\mu(k) = \mu(k-1) + k p_k \qquad (1.17)$$

Actually, it is appropriate to change k in such a range that $\omega_1 \cdot \omega_2 > 0$ that is, $0 < \omega(k) < 1$, is satisfied.

As described above, the intensity distribution calculator 11A corrects the threshold value k on the basis of forward road surface intensity information that is obtained by the road surface image detection sensor 10A so that the intensity distribution properly reflects environmental conditions (sunshine conditions etc.). Even with a road surface having the same road surface state, a intensity distribution obtained in fine daytime is different from that obtained in the evening. In view of this, in this embodiment, the threshold value is corrected to that the same road surface state is judged the same in fine daytime and in the evening, for example.

The intensity distribution calculator 11A classifies intensity data of individual pixels of image data of a forward road surface image detected by the road surface image detection sensor 10A into two classes, that is, a high-intensity class C1 and a low-intensity class C2, using the threshold value k that is always corrected online in the above-described manner.

The judgment processor 20A counts the numbers of intensity data (i.e., the numbers of pixels; correspond to road surface state physical quantities) belonging to the respective classes of the classification by the intensity distribution calculator 11A, and judges that the road surface is in the first road surface state (i.e., compacted snow or ice plate) if more intensity data are classified into the high-intensity class C1 and judges that the road surface is in the second road surface state (i.e., dry or wet) if more intensity data are classified into the low-intensity class C2.

As described above, in the seventh embodiment, the intensity distribution threshold value to be used for judging a road surface state is not constant during an estimation operation. Instead, adaptation is made to variations in the running environment such as sunshine conditions by always learning the intensity distribution of each road surface by performing the above-described calculation online during running. This enables estimation that is robust with respect to the running environment.

Next, an eighth embodiment of the invention will be described.

Figure 27:
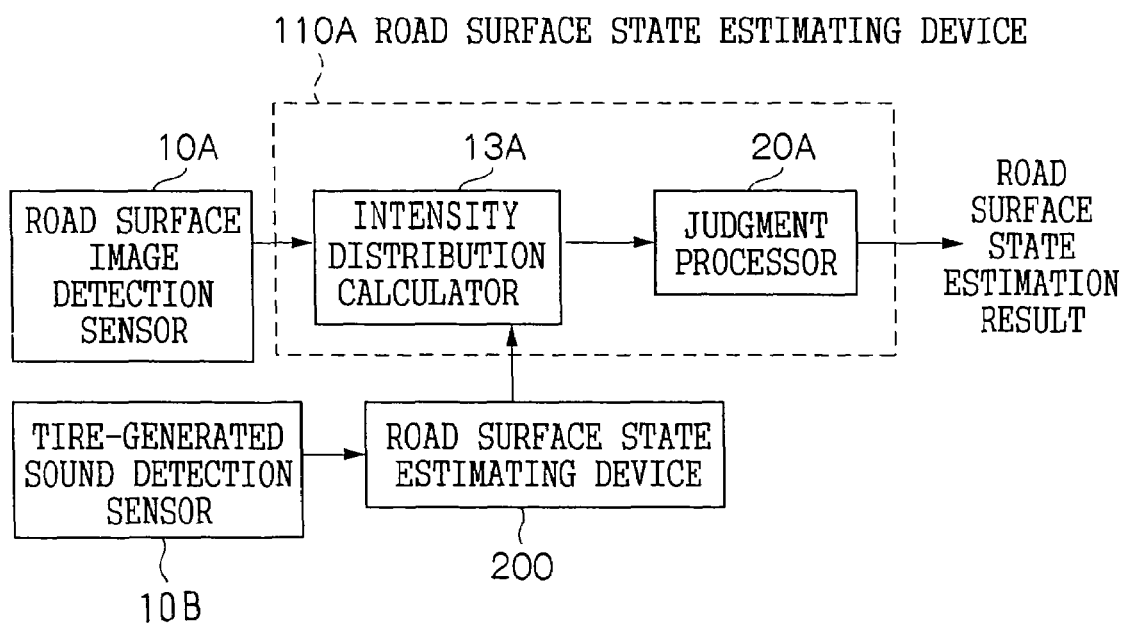
FIG. 27 is a block diagram of a road surface state estimating apparatus according to an eighth embodiment of the invention.

As shown in FIG. 27, a road surface state estimating apparatus according to the eighth embodiment is equipped with the same road surface image detection sensor 10A as used in the seventh embodiment, a road surface state estimating device 110A for estimating a forward road surface state, a tire-generated sound detection sensor 10B that is the same as the tire-generated sound detection sensor 10 of the first embodiment and that detects a tire-generated sound, and a road surface state estimating device 200 that is the same as the road surface state estimating device 100 of the first embodiment and that estimates a road surface state on which the vehicle is running on the basis of the tire-generated sound.

The road surface state estimating device 110A is equipped with a intensity distribution calculator 13A for calculating a intensity distribution as a road surface state physical quantity of a state, obtained by the road surface state estimating device 200, of a road surface on which the vehicle is running, and a judgment processor 20A for judging what road surface state a intensity distribution of a forward road surface image obtained by the road surface image detection sensor 10A corresponds to on the basis of the intensity distribution obtained by the intensity distribution calculator 13A. The intensity distribution calculator 13A has memories as storage devices for storing intensity distributions of a plurality of road surface states, respectively.

Next, the operation of this embodiment will be described. The operations of the tire-generated sound detection sensor 10B and the road surface state estimating device 200 are the same as described in the first embodiment and hence will not be described.

The road surface state estimating device 200 estimates a state of a road surface on which the vehicle is running (i.e., a current road surface state) all the time during running.

The road surface image detection sensor 10A detects intensity information of a forward road surface area.

The intensity distribution calculator 13A synchronizes the intensity information of the forward road surface area detected by the road surface image detection sensor 10A with the current road surface state estimated by the road surface state estimating device 200 by delaying the former until the forward road surface becomes a current road surface, that is, until the vehicle reaches the above-mentioned forward road surface.

The intensity distribution calculator 13A calculates a intensity distribution of a road surface state. A technique used by the intensity distribution calculator 13A for calculating a intensity distribution by the maximum likelihood estimation will be described below.

First, let $X = \{x_1, x_2, \ldots, x_n\}$ represent a set of intensity data of a state of a road surface on which the vehicle is running and p (X; θ) represent a intensity probability density function to be estimated, where θ is a vector representing a set of parameters and called a parameter vector.

Various vectors θ are conceivable as vector θ that has caused the set X of intensity data of one road surface state. Consideration will be given to which one of those vectors θ is most probable. Since it is considered that the data of the set X have occurred independently of each other according to the probability density function p(X; θ), the probability density function p(X; θ) of the set X of data is given by the following equation:

$$p(X; \theta) = \prod_{k=1}^{n} p(x_k; \theta) \qquad (2.1)$$

The most probable θ is θ that maximizes Equation (2.1). Such θ is represented by $\hat{\theta}$ Vector θ should be determined as an estimation vector, that is, $$\max_\theta \{p(X;\theta)\} = p(X;\hat{\theta}) \quad (2\cdot 2)$$

Vector θ can be determined by solving $$\nabla p(X;\theta) = \frac{\partial}{\partial \theta} p(X;\theta) = 0 \text{ or} \quad (2.3)$$

$$\sum_{k=1}^{n} \frac{\partial}{\partial \theta} \log p(x_k;\theta) = 0 \quad (2.4)$$

in which both sides are logarithms of those of equations.

With an assumption that the intensity probability density function p(X; θ) has a normal distribution, the following equation holds $$p(X;\theta) = \frac{1}{(2\pi)^{d/2}|\Sigma|^{1/2}} \exp\left\{-\frac{1}{2}(x-m)'\Sigma^{-1}(x-m)\right\} \quad (2.5)$$

where m is an average and Σ is a covariance matrix.

From Equations (2.5) and (2.4), estimation values of m and Σ are obtained as follows:

$$\hat{m} = \frac{1}{n}\sum_{k=1}^{n} x_k \quad (2.6)$$

$$\hat{\Sigma} = \frac{1}{n} = \sum_{k=1}^{n}(x_k - \hat{m})(x_k - \hat{m})' \quad (2.7)$$

When the vehicle runs on other road surfaces, intensity distributions of states of those road surfaces are calculated in the same manner. Intensity distributions are stored (updated) so as to be correlated with states of a plurality of road surfaces such as dry, wet, compacted-snow, and ice-plate road surfaces, respectively.

The judgment processor 20A judges which road surface state a forward road surface intensity distribution that has been detected this time by the road surface image detection sensor 10A corresponds to. As mentioned above, intensity distributions are stored in the judgment processor 20A so as to be correlated with the states of a plurality of road surfaces such as dry, wet, compacted-snow, and ice-plate road surfaces, respectively. The judgment processor 20A judges which of the intensity distributions stored for the respective road surface states a forward road surface intensity distribution detected this time by the road surface image detection sensor 10A is closest to, and outputs a road surface state corresponds to the thus-determined intensity distribution as a forward road surface state estimation result.

As described above, in the eighth embodiment, as in the case of the seventh embodiment, the intensity distribution threshold value to be used for judging a road surface state is not constant during an estimation operation. Instead, adaptation is made to variations in the running environment such as sunshine conditions by always learning the intensity distribution of each road surface by performing the above-described calculation online during running. This enables estimation that is robust with respect to the running environment. Further, in the eighth embodiment, a intensity distribution of a current road surface state estimated from a tire-generated sound is always determined online by learning and the actual running road surface state is collated with a corresponding road surface state to be used for estimation calculation, which makes it possible to obtain a more correct estimation result.

The intensity distribution calculator 13A maybe replaced by the intensity distribution calculator 11A of the seventh embodiment, and a road surface state that has been classified by the intensity distribution calculator 11A may be corrected by using a road surface state estimation result obtained by the road surface state estimating device 200.

Next, a ninth embodiment of the invention will be described.

Figure 28:
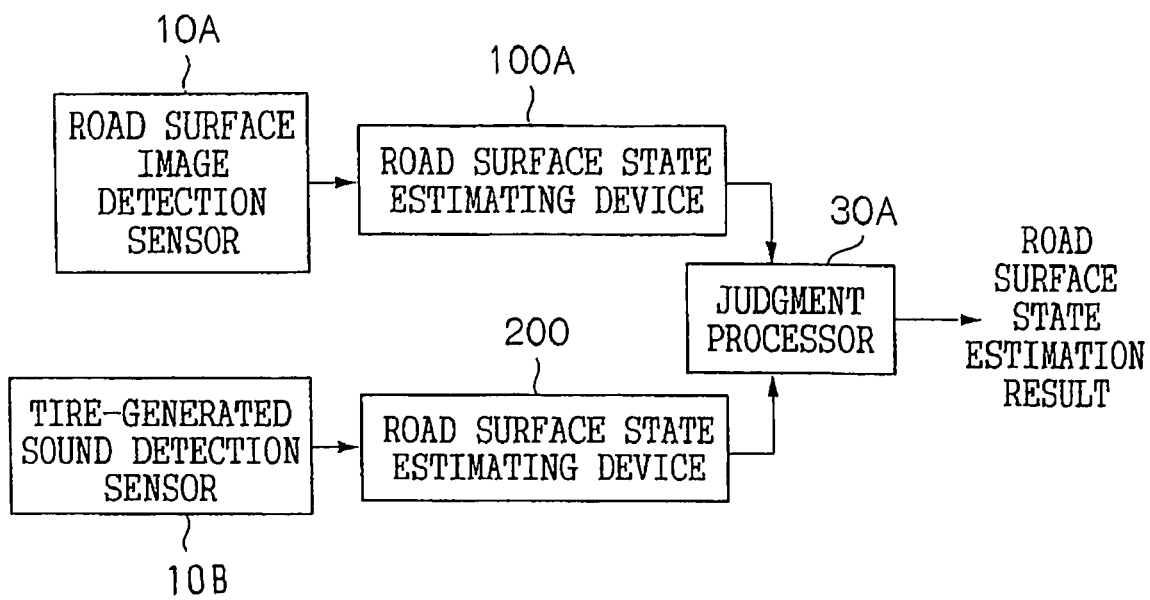
FIG. 28 is a block diagram of a road surface state estimating apparatus according to a ninth embodiment of the invention.

As shown in FIG. 28, a road surface state estimating apparatus according to the ninth embodiment is equipped with a road surface image detection sensor 10A, a road surface state estimating device 100A (maybe the road surface state estimating device 110A of the eighth embodiment) for estimating a forward road surface state, a tire-generated sound detection sensor 10B, a road surface state estimating device 200 for estimating a current road surface state, and a judgment processor 30A as an announcing device for comparing the current road surface state and the forward road surface state with each other and, when one of those road surface states has varied, makes an announcement about a post-variation road surface state.

The road surface image detection sensor 10A and the road surface state estimating device 100A (may be the road surface state estimating device 110A) constitute a forward road surface state detector for detecting a state of a forward road surface on which the vehicle will run. The tire-generated sound detection sensor 10B and the road surface state estimating device 200 constitute a current road surface state detector for detecting a state of a current road surface on which the vehicle is running.

Next, the operation of this embodiment will be described.

As described in the seventh (or eighth) embodiment, the road surface state estimating device 100A (or road surface state estimating device 110A) estimates, on the basis of intensity information of a forward road surface, which of two kinds of road surface states, that is, a compacted-snow or ice-plate road surface and the other road surfaces, the forward road surface corresponds to.

On the other hand, the road surface state estimating device 200 estimates which of four kinds of road surface states, that is, dry, wet, compacted-snow, and ice-plate road surfaces, the current road surface corresponds to.

When judging, on the basis of estimation results of the road surface state estimating device 100A (or road surface state estimating device 110A) and the road surface state estimating device 200, that the froward road surface state has become different from the current road surface state, for example, the current road surface state estimated by the road surface state estimating device 200 is a dry road surface and the forward road surface state estimated by the road surface state estimating device 100A (or road surface state estimating device 110A) has changed from the kind of road surface state "dry or wet" to the other kind "compacted snow or ice plate," the judgment processor 30A immediately outputs the estimation result of the road surface state estimating device 100A (or road surface state estimating device 110A) as a final road surface state estimation result.

Then, if the estimation result of the road surface state estimating device 100A (or road surface state estimating device 110A) does not change and the current road surface state estimated by the road surface state estimating device 200 has changed from a dry road surface to a compacted-snow road surface, for example, the judgment processor 30A changes the final estimation result from the kind of road surface state "compacted snow or ice plate" to a more detailed road surface state of "compacted snow."

As described above, in the ninth embodiment, the estimation result of the road surface state estimating device 100A (or road surface state estimating device 110A) captures a variation in the forward road surface state and the road surface state estimating device 200 estimates a more detailed road surface state that cannot be estimated by the road surface state estimating device 100A (or road surface state estimating device 110A) Therefore, the response speed and the accuracy of estimation can be made higher than in the conventional road surface state estimating apparatus.

Next, a 10th embodiment of the invention will be described.

Figure 29:
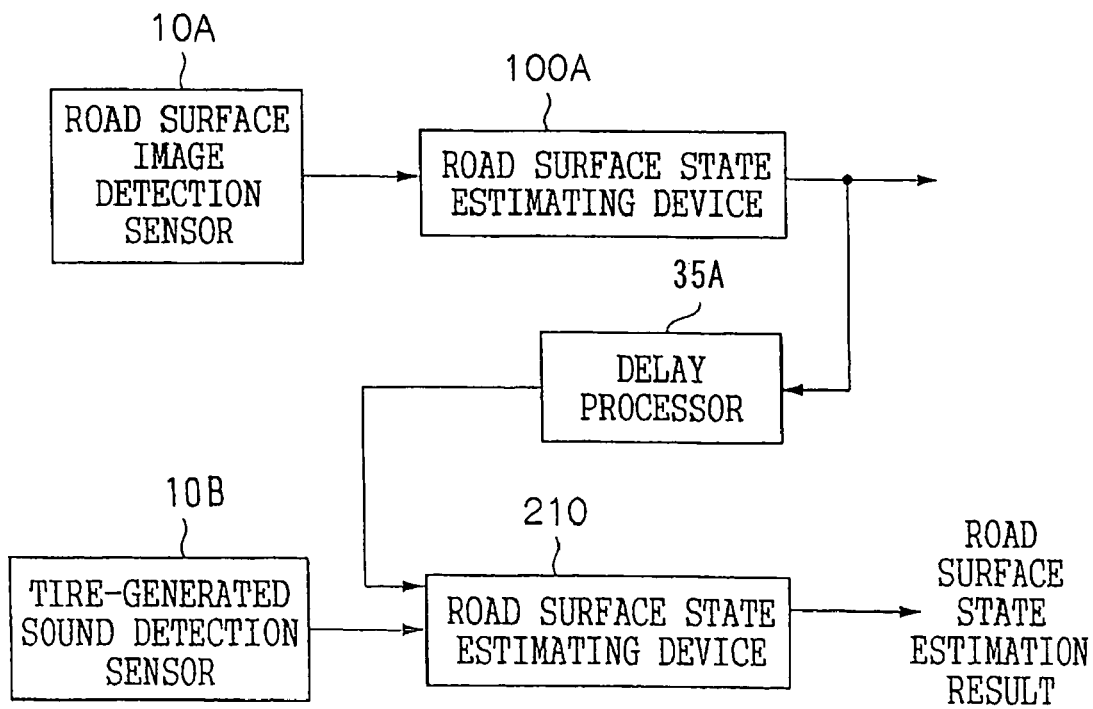
FIG. 29 is a block diagram of a road surface state estimating apparatus according to a 10th embodiment of the invention.

As shown in FIG. 29, a road surface state estimating apparatus according to the 10th embodiment is equipped with a road surface image detection sensor 10A, a road surface state estimating device 100A (or road surface state estimating device 110A), a delay processor 35A, a tire-generated sound detection sensor 10B, and a road surface state estimating device 210.

The road surface image detection sensor 10A and the road surface state estimating device 100A (or road surface state estimating device 110A) constitute a forward road surface state detector for detecting a forward road surface state. The tire-generated sound detection sensor 10B and the road surface state estimating device 210 constitute a current road surface state detector for detecting a state of a current road surface on which the vehicle is running. The delay processor 35A serves as a synchronizer. The road surface state estimating device 210 serves as an announcing device.

Next, the operation of this embodiment will be described.

The road surface state estimating device 210 estimates a current road surface state on the basis of feature quantities of a tire-generated sound taking into consideration a forward road surface state estimation result of the road surface state estimating device 100A (or road surface state estimating device 110A) that is synchronized with the processing of estimating a current road surface state by the delay processor 35A.

More specifically, even if the current road surface state estimated on the basis of feature vectors of a tire-generated sound has changed from a first kind of road surface state "compacted snow or ice plate" to a second kind of road surface state "dry or wet" whereas the forward road surface state estimation result of the road surface state estimating device 100A (or road surface state estimating device 110A) that is synchronized with the processing of estimating a current road surface state by the delay processor 35A is the first kind of road surface state "compacted snow or ice plate," the road surface state estimating device 210 employs the first kind of road surface state "compacted snow or ice plate" as a final estimation result with a judgment that the probability that the current road surface state is a dry or wet road surface state is low.

As described above, in the 10th embodiment, a forward road surface estimation result is taken into consideration in estimating a current road surface state, whereby a low-probability current road surface state estimation result is prevented from occurring due to an erroneous judgment that is caused by noise or the like and hence the accuracy of estimation can be increased.

Next, an 11th embodiment of the invention will be described.

Figure 30:
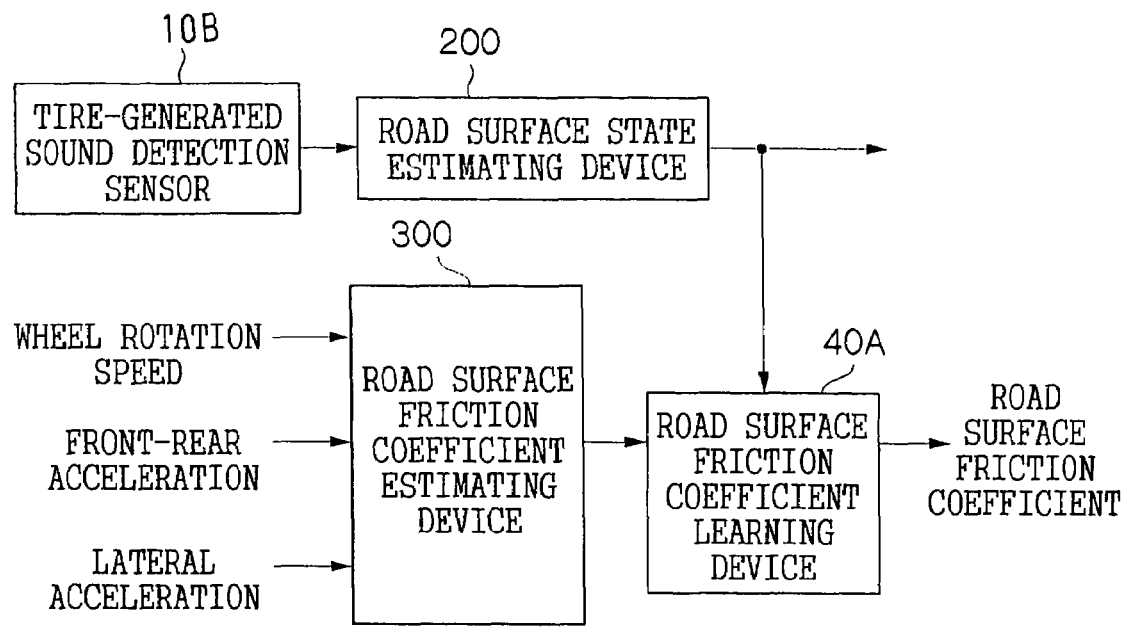
FIG. 30 is a block diagram of a road surface friction state estimating apparatus according to an 11th embodiment of the invention.

As shown in FIG. 30, a road surface state estimating apparatus according to this embodiment is equipped with a tire-generated sound detection sensor 10B, a road surface state estimating device 200 (or road surface state estimating device 100A, 110A, or 210) for estimating a state of a road surface on which the vehicle is running, a road surface friction coefficient estimating device 300 for estimating a road surface friction coefficient as a road surface friction state, that is, a friction state between a road surface and a vehicle tire, and a road surface friction coefficient learning device 40A as a final road surface friction state estimating device for estimating a final road surface friction coefficient.

The tire-generated sound detection sensor 10B and the road surface state estimating device 200 (or road surface state estimating device 100A, 110A, or 210) constitute a road surface state detector.

Next, the operation of this embodiment will be described.

The road surface friction coefficient estimating device 300 estimates a current road surface friction coefficient on the basis of a wheel rotation speed, front-rear acceleration, and lateral acceleration. A device described in Japanese Patent Application No. 2002-40722 can be used as the road surface friction coefficient estimating device 300.

The road surface friction coefficient learning device 40A stores friction coefficients, estimated by the road surface friction coefficient estimating device 300, of respective road surface states estimated by the road surface state estimating device 200 (or road surface state estimating device 100A, 110A, or 210), and determines, by learning, a most probable friction coefficient of a current road surface state. For example, the most simple method for determining a most probable friction coefficient is to output, as a friction coefficient of a road state concerned, a moving average of friction coefficients corresponding to the road surface concerned that are estimated by the road surface friction coefficient estimating device 300. In this manner, the road surface friction coefficient learning device 40A can estimate a most probable friction coefficient of a road surface state estimated by the road surface state estimating device 200 (or road surface state estimating device 100A, 110A, or 210).

As described above, in the 11th embodiment, a friction coefficient of a current road surface state is determined online by learning all the time during running and hence a proper road surface friction coefficient can be estimated while adaptation is made to variations in the road surface state that are caused depending on the region, the season, etc.

Figure 31:
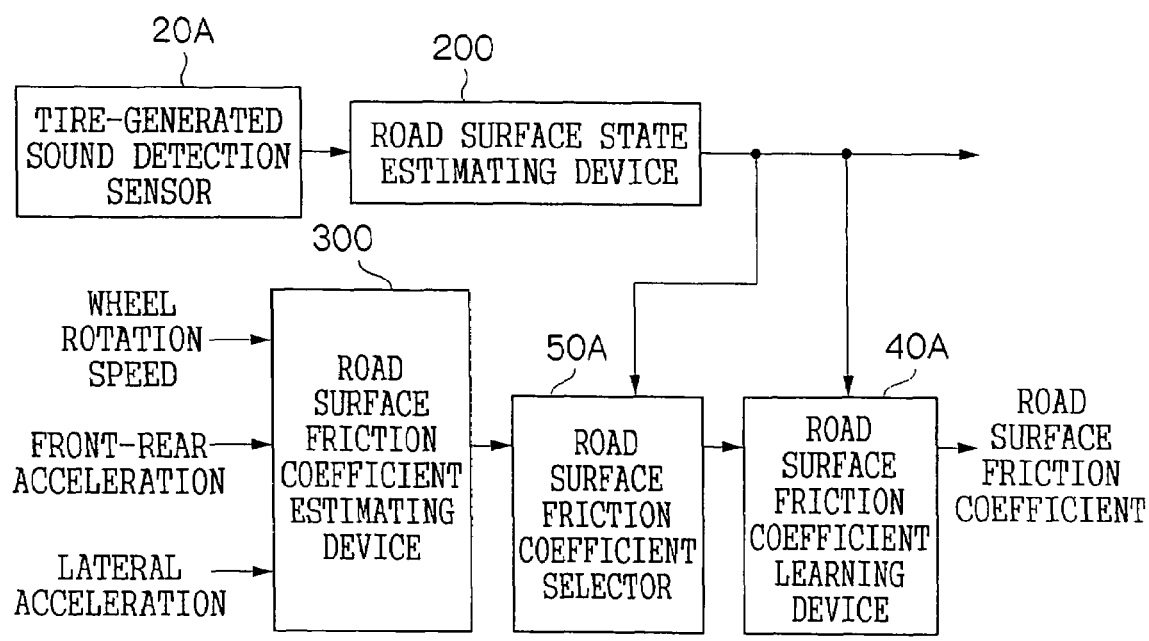
FIG. 31 is a block diagram of a road surface friction state estimating apparatus according to a modification of the 11th embodiment.

In the above embodiment, the road surface friction coefficient learning device 40A averages all friction coefficients estimated by the road surface friction coefficient estimating device 300. However, the invention is not limited to such a case. As shown in FIG. 31, a road surface friction coefficient selector 50A may be provided between the road surface friction coefficient estimating device 300 and the road surface friction coefficient learning device 40A.

Road surface friction coefficients estimated by the road surface friction coefficient estimating device 300 are not always correct and may be far from a value that should be estimated from a current road surface state. If the road surface friction coefficient learning device 40A averages all friction coefficients estimated by the road surface friction coefficient estimating device 300 including such values that are far from a value that should be estimated from a current road surface state, a final road surface friction coefficient estimation value becomes erroneous.

In view of this, road surface friction coefficient ranges are set in advance for a plurality of road surface states, respectively. On the basis of the road surface friction coefficient ranges corresponding to the respective road surface states and a road surface state estimated by the road surface state estimating device 200, the road surface friction coefficient selector 50A judges whether a road surface friction coefficient estimated by the road surface friction coefficient estimating device 300 falls within the road surface friction coefficient range corresponding to the road surface state estimated by the road surface state estimating device 200. If judging that the road surface friction coefficient estimated by the road surface friction coefficient estimating device 300 falls within the road surface friction coefficient range corresponding to the road surface state estimated by the road surface state estimating device 200, the road surface friction coefficient selector 50A outputs the road surface friction coefficient estimated by the road surface friction coefficient estimating device 300 to the road surface friction coefficient learning device 40A.

As described above, the road surface friction coefficient selector 50A outputs a road surface friction coefficient estimated by the road surface friction coefficient estimating device 300 to the road surface friction coefficient learning device 40A if judging that the road surface friction coefficient estimated by the road surface friction coefficient estimating device 300 falls within the road surface friction coefficient range corresponding to a road surface state estimated by the road surface state estimating device 200. Therefore, the road surface friction coefficient learning device 40A is prevented from estimating a final road surface friction coefficient using values that are far from a value that should be estimated from a current road surface state: a more correct final road surface friction coefficient estimation value can be obtained.

Next, a 12th embodiment of the invention will be described.

Figure 32:
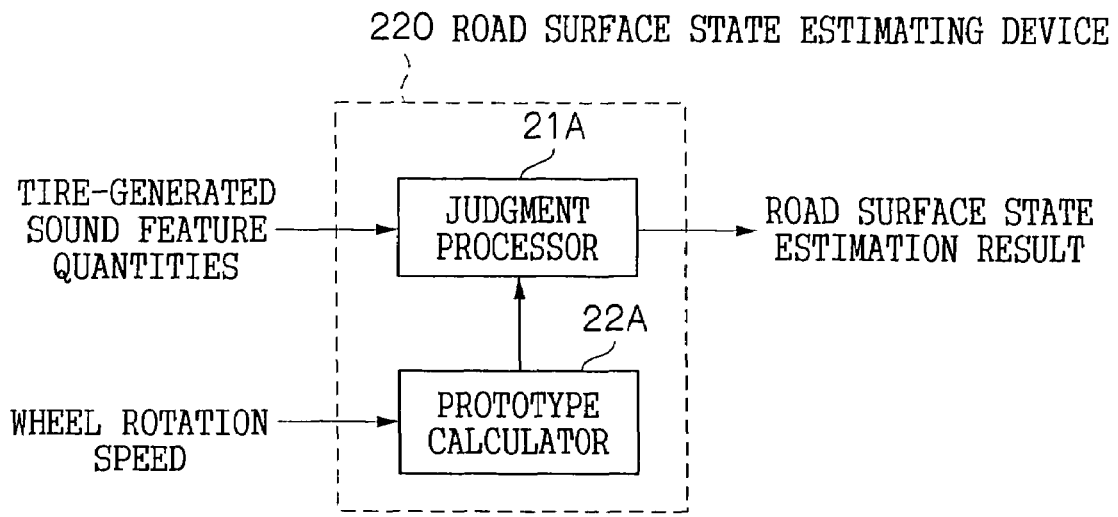
FIG. 32 is a block diagram of a road surface state estimating apparatus according to a 12th embodiment of the invention.

As shown in FIG. 32, a road surface state estimating apparatus according to this embodiment is equipped with a road surface state estimating device 220 for estimating a current road surface state on the basis of feature quantities of a tire-generated sound that is generated by the preprocessor 14 of the first embodiment (not shown; see FIG. 1) and a wheel rotation speed that is detected by the wheel rotation speed sensor 12 of the first embodiment (not shown; see FIG. 1). The road surface state estimating device 220 is composed of a judgment processor 21A and a prototype calculator 22A.

Figure 36:
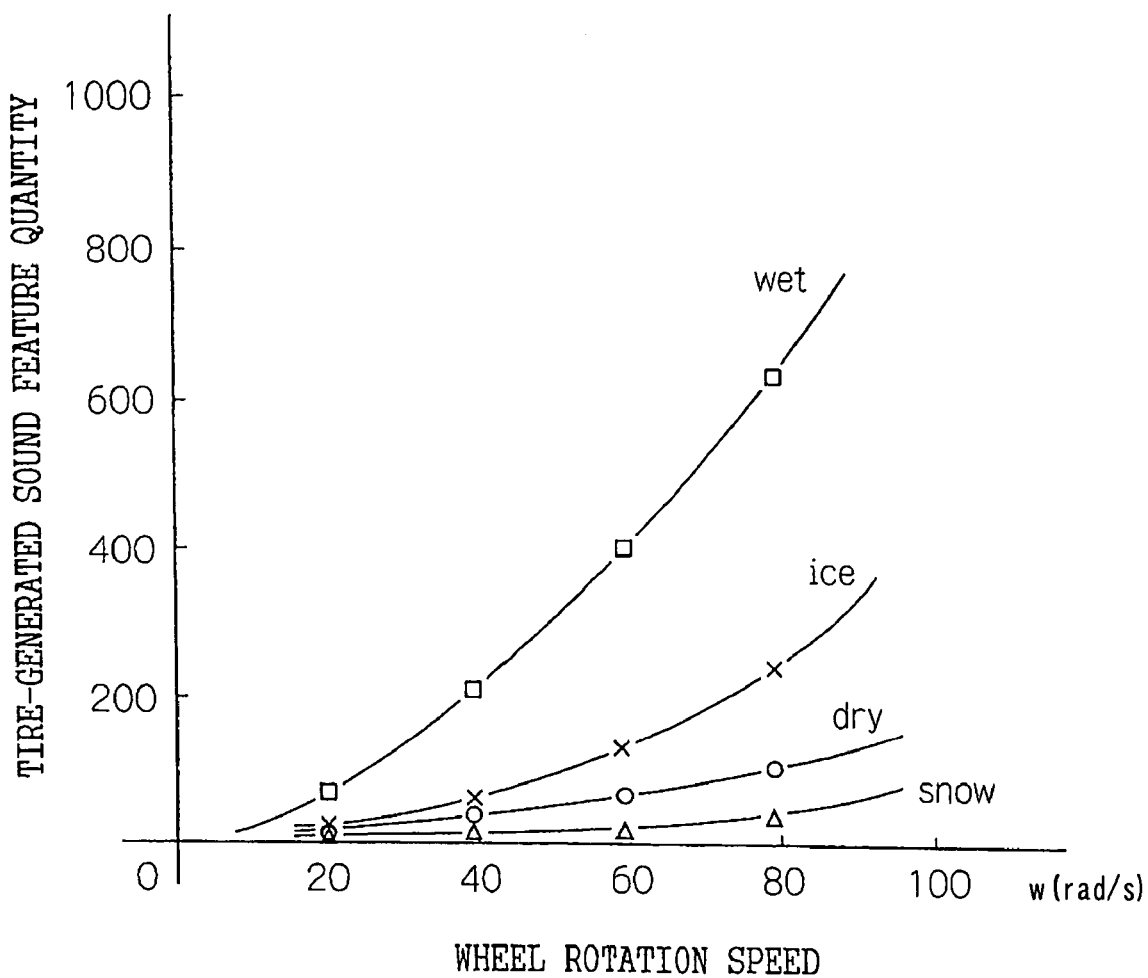
FIG. 36 is a graph showing relationships between the wheel rotation speed and the tire-generated sound feature quantities.

Relationships between the tire-generated sound feature quantities and the wheel rotation speed will be described. The values of the tire-generated sound feature quantities increase with the wheel rotation speed. FIG. 36 shows relationships between the tire-generated sound feature quantities and the wheel rotation speed. The magnitude of each tire-generated sound feature quantity can be approximated by a quadratic function of the wheel rotation speed.

Therefore, the prototype calculator 22A calculates prototype values to be collated with a tire-generated sound feature vector that is detected while the vehicle is running using quadratic functions of the wheel rotation speed. The judgment processor 21A estimates a current road surface state by collating prototype values calculated by the prototype calculator 22A with a tire-generated sound feature vector that is detected while the vehicle is running.

As described above, in the 12th embodiment, it is sufficient to store only coefficients of quadratic functions instead of storing all prototypes of road surface states for a plurality of wheel rotation speeds. The storage capacity can therefore be reduced.

Next, a 13th embodiment of the invention will be described.

Figure 33:
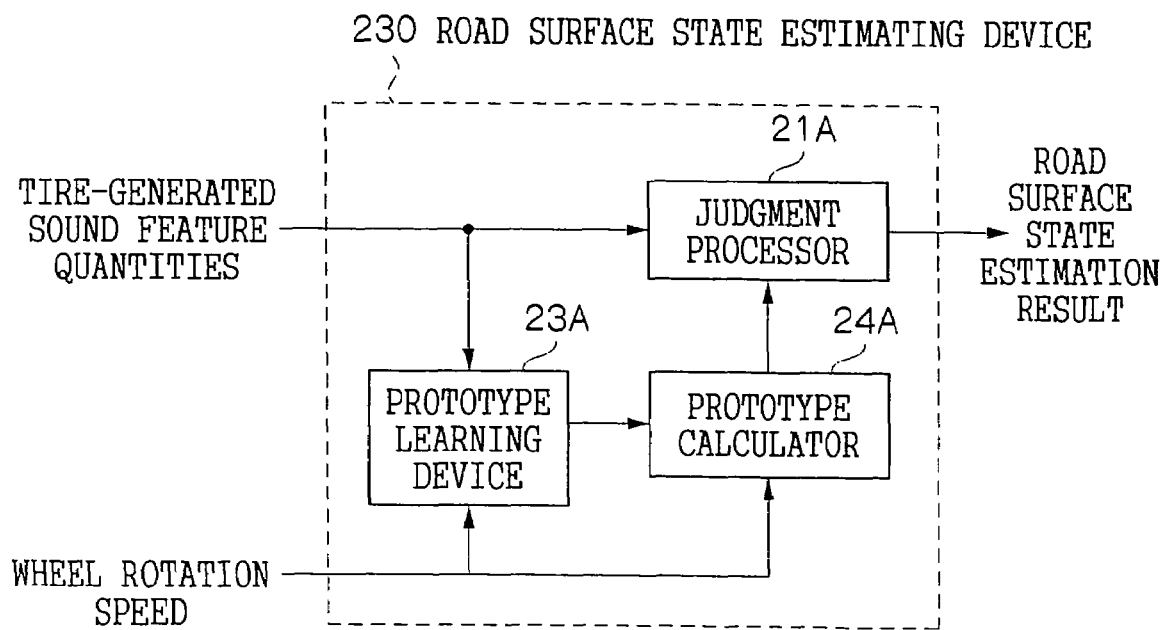
FIG. 33 is a block diagram of a road surface state estimating apparatus according to a 13th embodiment of the invention.

As shown in FIG. 33, a road surface state estimating apparatus according to this embodiment is equipped with a road surface state estimating device 230 for estimating a current road surface state on the basis of feature quantities of a tire-generated sound and a wheel rotation speed. The road surface state estimating device 230 is composed of a judgment processor 21A, a prototype learning device 23A, and a prototype calculator 24A.

The prototype learning device 23A stores tire-generated sound feature quantities at wheel rotation speeds of representative points online during running and calculate and updates the coefficients of quadratic functions that represent the relationships between the tire-generated sound feature quantities and the wheel rotation speed on the basis of stored values. The prototype calculator 24A calculates prototype values to be collated with a tire-generated sound feature vector that is detected while the vehicle is running using the coefficients of quadratic functions calculated by the prototype learning device 23A. The judgment processor 21A estimates a current road surface state by collating prototype values calculated by the prototype calculator 22A with a tire-generated sound feature vector that is detected while the vehicle is running.

As described above, in the 13th embodiment, coefficients of quadratic functions to be used for calculating prototype values to be collated with a tire-generated sound feature vector are determined online by learning all the time during running. Therefore, prototype points can be adapted to variations in the road surface state that are caused depending on the region, the season, etc. (e.g., the state (properties) of even the same dry road surface varies and the tire-generated sound feature quantities vary accordingly). A road surface friction coefficient can be estimated accurately with adaptation made to such variations.

Figure 34:
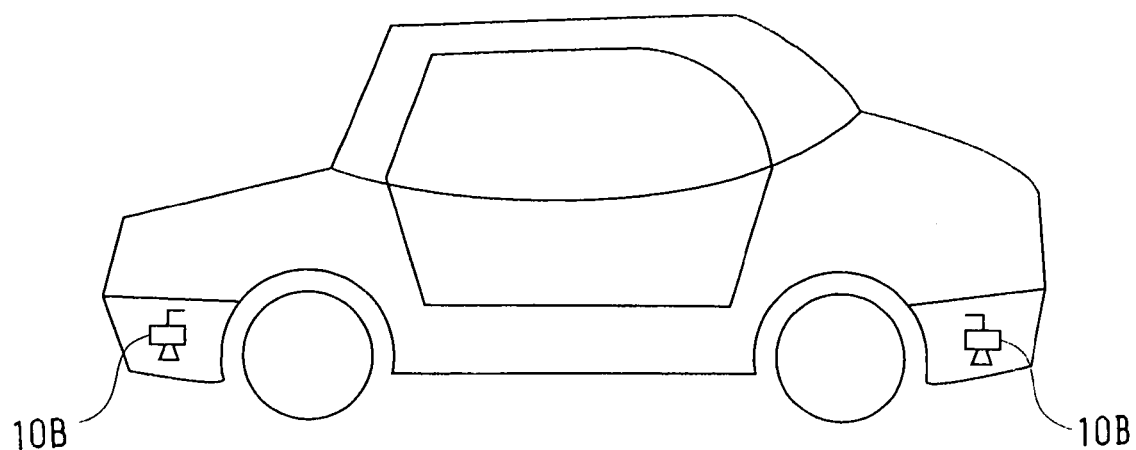
FIG. 34 shows positions where tire-generated sound detection sensors are provided.

In the above-described embodiments, each tire-generated sound detection sensor 10B is provided at such a position that the influence of disturbance not from tire-generated sound sources on a tire-generated sound is small, for example, at a position closest to a tire inside a bumper (see FIG. 34).

To detect a tire-generated sound in the vicinity of a tire, it is necessary to avoid obstacles such as mud and water that is splashed by the tire and a disturbance sound generated by wind pressure or the like. When provided closest to a tire inside a bumper, the tire-generated sound detection sensor 10B can avoid obstacles such as mud and water that is splashed by the tire and a disturbance sound generated by wind pressure or the like. Further, the tire-generated sound detection sensor 10B can be set there relatively easily.

As described above, providing the tire-generated sound detection sensor 10B closest to a tire inside a bumper makes it possible to avoid obstacles such as mud and water that is splashed by the tire and a disturbance sound generated by wind pressure or the like and to thereby detect a tire-generated sound having only a small amount of noise. Further, since the tire-generated sound detection sensor 10B can be set there easily, it can be provided at a low cost.

In the above embodiment in which a road surface image is detected, image data detected by the road surface image detection sensor 10A are output as they are. However, the invention is not limited to such a case. The following devices may be provided additionally.

Figure 35:
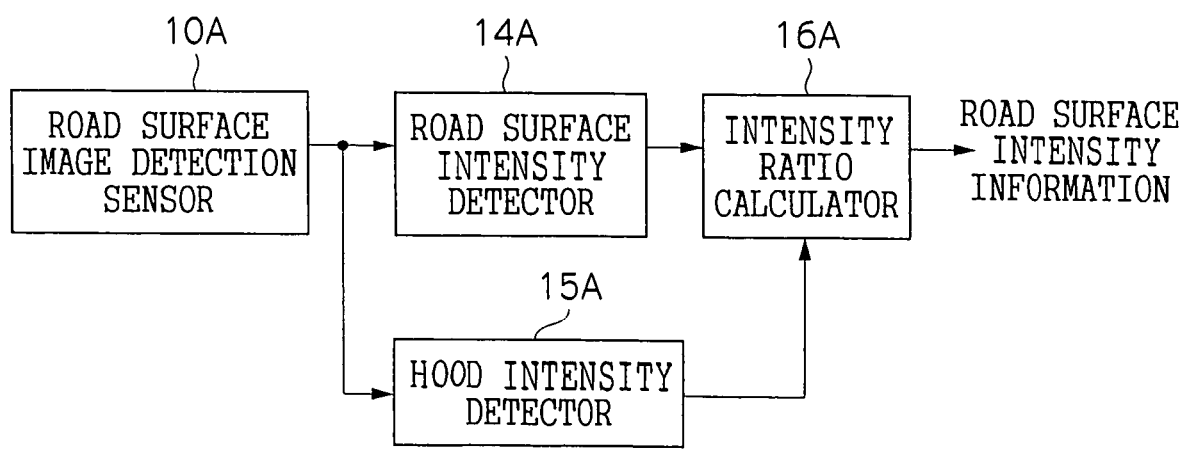
FIG. 35 is a block diagram of a road surface intensity information output section.

As shown in FIG. 35, the road surface image detection sensor 10A, a road surface intensity detector 14A, a hood intensity detector 15A, and a intensity ratio calculator 16A may be provided.

The road surface image detection sensor 10A shoots an area including part of the vehicle and a forward road surface. The road surface intensity detector 14A detects intensity of part of the forward road surface from a forward road surface image detected by the road surface image detection sensor 10A. The hood intensity detector 15A detects intensity of the hood that is part of the vehicle from the forward road surface image detected by the road surface image detection sensor 10A. The intensity ratio calculator 16A calculates a ratio of the intensity of the forward road surface obtained by the road surface intensity detector 14A to the intensity of the hood of the vehicle obtained by the hood intensity detector 15A and outputs the calculated ratio to the road surface state estimating device 100 (or road surface state estimating device 110).

Since the ratio of the intensity of a forward road surface to the intensity of the hood of the vehicle is used as forward road surface intensity information to be used for estimating a forward road surface state, the influence of a variation in intensity due to the fact that the incident angle of sunlight varies with the orientation of the vehicle can be reduced. The calculation load can be reduced by using average intensity of a portion, not the whole, of a forward road surface image.

What is claimed is:

1. A road surface state estimating apparatus comprising
   a tire-generated sound detector configured to detect a tire-generated sound that is generated from a tire while a vehicle is running;
   a calculator configured to calculate at least one feature quantity corresponding to a road surface state and tire-generated sound sources from the tire-generated sound detected by the tire-generated sound detector;
   a storage device configured to store feature quantities, each quantity corresponding to a road surface state and tire-generated sound source, in such a manner that the feature quantities are correlated with a plurality of road surface states, respectively; and
   an estimating device configured to estimate a state of a road surface on which the vehicle is running on the basis of the feature quantity calculated by the calculator and the feature quantities stored in the storage device,
   wherein the calculator calculates at least one feature quantity corresponding to a road surface state and tire-generated sound source by calculating correlation values of a waveform of the tire-generated sound detected by the tire-generated sound detector and at least one fundamental waveform having a predetermined length.

2. The road surface state estimating apparatus according to claim 1, further comprising:
   a wheel rotation speed detector configured to detect a wheel rotation speed, wherein
   the storage device stores the feature quantities in such a manner that the feature quantities are correlated with respective each of a plurality road surface states and each of a plurality of wheel rotation speeds; and
   the estimating device estimates a state of a road surface on which the vehicle is running on the basis of the feature quantity calculated by the calculator, the wheel rotation speed detected by the wheel rotation speed detector, and the feature quantities stored in the storage device.

3. The road surface state estimating apparatus according to claim 1, wherein the calculator uses wavelet transform.

4. The road surface state estimating apparatus according to claim 1, wherein the calculator calculates correlation values of a waveform of the tire-generated sound detected by the tire-generated sound detector and at least one wavelet fundamental waveform.

5. The road surface state estimating apparatus according to claim 1, wherein the fundamental waveform has two first regions in which an amplitude of the wave is within a first range and a second region that is interposed between the two first regions and in which an amplitude of the wave is larger than in the two first regions and the value is within a second range that is wider than the first range.

6. The road surface state estimating apparatus according to claim 3, wherein the calculator calculates correlation values of a waveform of the tire-generated sound detected by the tire-generated sound detector and a fundamental waveforms corresponding to at least one road surface state.

7. The road surface state estimating apparatus according to claim 6, wherein the calculator sets the fundamental waveforms by modifying a predetermined original waveform so that it becomes suitable for the road surface states.

8. A road surface friction state estimating apparatus comprising:
   a detector configured to detect a feature quantity indicating a road surface state;
   a storage device configured to store road surface friction states that are friction states between road surfaces and a tire in such a manner that the road surface friction states are correlated with a plurality of feature quantities indicating different road surface states, respectively;
   an estimating device configured to estimate a road surface friction state of the road surface, the road surface corresponding to the feature quantity which is detected by the detector, on the basis of the feature quantities detected by the detector and the road surface friction states stored in the storage device; and
   a corrector configured to correct a road surface friction state stored in the storage device on the basis of a pre-detected road surface friction state of the road surface, the road surface corresponding to the feature quantity which is detected by the detector, and the road surface friction state estimated by the estimating device.

9. The road surface friction state estimating apparatus according to claim 8, wherein the detector detects a feature quantity indicating a road surface state of a forward road surface.

10. The road surface friction state estimating apparatus according to claim 8, wherein the detector detects feature quantity indicating a road surface state of a road surface on which a vehicle is running.

11. The road surface friction state estimating apparatus according to claim 10, wherein the detector is the road surface state estimating apparatus according to claim 1.

12. A road surface friction state estimating apparatus comprising:
   a first detector configured to detect feature quantity indicating a road surface state of a road surface on which a vehicle is running;
   a second detector configured to detect a feature quantity indicating a road surface state of a forward road surface obtained by shooting the forward road surface with a camera;

a synchronizer configured to synchronize a feature quantity detected by the second detector with the feature quantities detected by the first detector of a road surface ,the road surface corresponding to the feature quantity which was detected by the second detector;

a storage device configured to store road surface friction states that are friction states between road surfaces and a tire in such a manner that the road surface friction states are correlated with a plurality of feature quantities indicating different road surface states, respectively; and an estimating device configured to estimate a road surface friction state of the road surface ,the road surface corresponding to the feature quantity which is detected by the first detector, on the basis of the feature quantity detected by the first detector, the feature quantity detected by the second detector and synchronized by the synchronizer, and the road surface friction states stored in the storage device.

13. The road surface friction state estimating apparatus according to claim 12, further comprising a corrector configured to correct a road surface friction state stored in the storage device on the basis of a road surface friction state of the road surface , the road surface corresponding to feature quantity which is detected by the first detector and the road surface friction state estimated by the estimating device.

14. A road surface state physical quantity calculating apparatus comprising:

a detector configured to detect at least one of saturation information, luminance infonnation and hue information of a forward road surface on which a vehicle will run; and a calculator configured to calculate a road surface state physical quantity on the basis of at least one of saturation information, luminance information and hue information of the forward road surface detected by the detector and a parameter to be used for calculating a road surface state physical quantity indicating a road surface state, wherein the calculator corrects the parameter on the basis of at least one of saturation information, luminance information and hue information of the forward road surface detected by the detector, and calculates a road surface state physical quantity indicating a road surface state on the basis of the corrected parameter and at least one of saturation information, luminance information and hue information of the forward road surface detected by the detector.

15. The road surface state physical quantity calculating apparatus according to claim 14, wherein:

the detector divides an area of the forward road surface into a plurality of regions and detects pieces of at least one of saturation information, luminance information and hue information of the respective regions;

the parameter is a value to be used for classifying the detected pieces of at least one of saturation information, luminance information and hue information of the respective regions into classes corresponding to respective road surface states; and the calculator calculates a road surface state physical quantity by classifying the detected pieces of at least one of saturation information, luminance information and hue information of the respective regions into the classes corresponding to the respective road surface states using the parameter.

16. The road surface state physical quantity calculating apparatus according to claim 14, wherein:

the detector divides an area of the forward road surface into a plurality of regions and detects pieces of at least one of saturation information, luminance information and hue information of the respective regions;

the parameter is a value that maximizes a probability that the detected pieces of at least one of saturation information, luminance information and hue information of the respective regions are obtained; and the calculator calculates a road surface state physical quantity by calculating a probability maximized by the parameter.

17. A road surface state estimating apparatus comprising:

a storage device configured to store road surface state physical quantities determined on the basis of at least one of saturation information, luminance information and hue information and indicating road surface states of a plurality of road surfaces, respectively, in such a manner that the road surface state physical quantities are correlated with the respective road surface states;

a detector configured to detect at least one of saturation information, luminance information and hue information of a forward road surface; and an estimating device for estimating a road surface state of the forward road surface on the basis of at least one of saturation information, luminance information and hue information of the forward road surface detected by the detector and the road surface state physical quantities stored in the storage device.

18. The road surface state estimating apparatus according to claim 17, wherein the estimating device determines a road surface state physical quantity on the basis of at least one of saturation information, luminance information and hue information of the forward road surface detected by the detector, and estimates a road surface state of the forward road surface on the basis of the determined road surface state physical quantity and the road surface state physical quantities stored in the storage device.

19. The road surface state estimating apparatus according to claim 17, further comprising:

the road surface state estimating apparatus according to claim 1; and an updating device for updating the road surface state physical quantity that is stored in the storage device and corresponds to the road surface state estimated by the road surface state estimating apparatus, on the basis of the road surface state estimated by the road surface state estimating apparatus and at least one of saturation information, luminance information and hue information that was detected by the detector when the road surface state estimating apparatus estimated the road surface state.

20. A road surface state announcing apparatus comprising:

a current road surface state detector configured to detect a road surface state of a current road surface on which a vehicle mounted is running;

a forward road surface state detector configured to detect a road surface state of a forward road surface; and an announcing device configured to compare the road surface state of the current road surface detected by the current road surface state detector and the road surface state of the forward road surface detected by the forward road surface state detector, and for making an announcement about a post-variation road surface state if one of the road surface state of the current road surface and the road surface state of the forward road surface has varied.

21. The road surface state announcing apparatus according to claim 20, wherein the announcing device makes an announcement about a post-variation road surface state of the forward road surface if the road surface state of the current road surface has changed after the road surface state of the forward road surface changed from the road surface state of the current road surface.

22. A road surface state announcing apparatus comprising:
a current road surface state detector configured to detect a road surface state of a current road surface on which a vehicle is running;
a forward road surface state detector confianred to detect a road surface state of a forward road surface;
a synchronizer configured to synchronize a road surface state of a forward road surface detected by the forward road surface state detector with the road surface state of the current road surface detected by the current road surface state detector; and
an announcing device configured to make an announcement about a road surface state of the current road surface on the basis of the road surface state of the current road surface detected by the current road surface state detector and the road surface state of the forward road surface detected by the forward road surface state detector and synchronized by the synchronizer with the road surface state of the current road surface detected by the current road surface state detector.

23. A road surface friction state estimating apparatus comprising:
a road surface state detector configured to detect a road surface state of a road surface on which a vehicle in running;
a road surface friction state estimating device configured to estimate a road surface friction state as a friction state between the road surface and a tire of the vehicle on the basis of a wheel rotation speed, front-rear acceleration, and lateral acceleration; and
a final road surface friction state estimating device configured to estimate a final road surface friction state on the basis of the road surface state detected by the road surface state detector and the road surface friction state estimated by the road surface friction state estimating device.

24. The road surface friction state estimating apparatus according to claim 23, wherein road surface friction state ranges are set in advance so as to be correlated with a plurality of road surface states, respectively, the road surface friction state estimating apparatus further comprising:
a judging component configured to judge whether the road surface friction state detected by the road surface friction state estimating device falls within a road surface friction state range corresponding to the road surface state detected by the road surface state detector on the basis of the road surface friction state ranges corresponding to the respective road surface states, the road surface state detected by the road surface state detector, and the road surface friction state detected by the road surface friction state estimating device, wherein
the final road surface friction state estimating device configured to estimate a final road surface friction state on the basis of the road surface state detected by the road surface state detector and the road surface friction state estimated by the road surface friction state estimating device and judged to be within the road surface friction state range corresponding to the road surface state, if the judging component judges that the road surface friction state detected by the road surface friction state estimating device falls within the road surface friction state range corresponding to the road surface state detected by the road surface state detector.

25. A road surface state estimating apparatus comprising:
a tire-generated sound detector configured to detect a tire-generated sound that is generated from a tire while a vehicle is running;
a wheel rotation speed detector configured to detect a wheel rotation speed;
a storage device configured to store a relationships between feature quantities corresponding to tire-generated sound sources and a wheel rotation speed in such a manner that the sets of coefficients are correlated with a plurality of road surface states, respectively; and
an estimating device configured to estimate a road surface state on the basis of the tire-generated sound detected by the tire-generated sound detector, the wheel rotation speed detected by the wheel rotation speed detector, and the coefficients stored in the storage device,
wherein the calculator calculates at least one feature quantity corresponding to a road surface state and tire-generated sound source by calculating correlation values of a waveform of the tire-generated sound detected by the tire-generated sound detector and at least one fundamental waveform having a predetermined length.

26. The road surface state estimating apparatus according to claim 25, further comprising:
an updating device configured to update the relationship stored in the storage device on the basis of the tire-generated sound detected by the tire-generated sound detector and the wheel rotation speed detected by the wheel rotation speed detector, wherein
the estimating device estimates a road surface state on the basis of the tire-generated sound detected by the tire-generated sound detector, the wheel rotation speed detected by the wheel rotation speed detector, and the relationship stored in the storage device and updated by the updating device.

* * * * *